US011542988B2

(12) United States Patent
Oh

(10) Patent No.: US 11,542,988 B2
(45) Date of Patent: Jan. 3, 2023

(54) CONSTANT VELOCITY JOINT ASSEMBLY AND METHOD THEREOF

(71) Applicant: Dana Automotive Systems Group, LLC, Maumee, OH (US)

(72) Inventor: Seung Tark Oh, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 378 days.

(21) Appl. No.: 16/675,450

(22) Filed: Nov. 6, 2019

(65) Prior Publication Data
US 2021/0131501 A1    May 6, 2021

(51) Int. Cl.
F16D 3/227    (2006.01)

(52) U.S. Cl.
CPC .......... *F16D 3/227* (2013.01); *F16D 2300/06* (2013.01); *Y10S 464/906* (2013.01)

(58) Field of Classification Search
CPC ... F16D 3/227; F16D 2300/06; Y10S 464/906
USPC .................................................. 464/144, 146
See application file for complete search history.

(56) References Cited

U.S. PATENT DOCUMENTS

| 6,431,988 | B1 | 8/2002 | Tone |
| 6,468,164 | B2 | 10/2002 | Song |
| 6,497,622 | B1 | 12/2002 | Bilz |
| 6,506,122 | B2 | 1/2003 | Nakagawa |
| 7,419,433 | B2* | 9/2008 | Nakagawa ............. F16D 3/227 464/906 |
| 7,997,988 | B2 | 8/2011 | Wormsbaecher |
| 7,997,990 | B2 | 8/2011 | Hahn |
| 8,070,611 | B2 | 12/2011 | Wormsbaecher |
| 8,147,342 | B2 | 4/2012 | Hoshino |
| 8,317,630 | B1* | 11/2012 | Oh .......................... F16D 3/227 464/146 |
| 8,512,156 | B2 | 8/2013 | Kim |
| 2012/0010005 | A1 | 1/2012 | Fujio |

* cited by examiner

*Primary Examiner* — Greg Binda
(74) *Attorney, Agent, or Firm* — Marshall & Melhorn, LLC

(57) ABSTRACT

A joint assembly and method of utilizing the same. The joint assembly includes a first joint member drivingly connected to a second joint member by using one or more third joint members. At least a portion of a cage member is interposed between the first and second joint members. When the first joint member is plunged in a first direction, at least a portion of one or more first engagement portions of the first joint member are in direct contact with at least a portion of one or more first engagement portions of the cage member. When the first joint member is plunged in a second direction, opposite the first direction, at least a portion of one or more second engagement portions of the first joint member are in direct contact with at least a portion of one or more second engagement portions of the cage member.

8 Claims, 14 Drawing Sheets

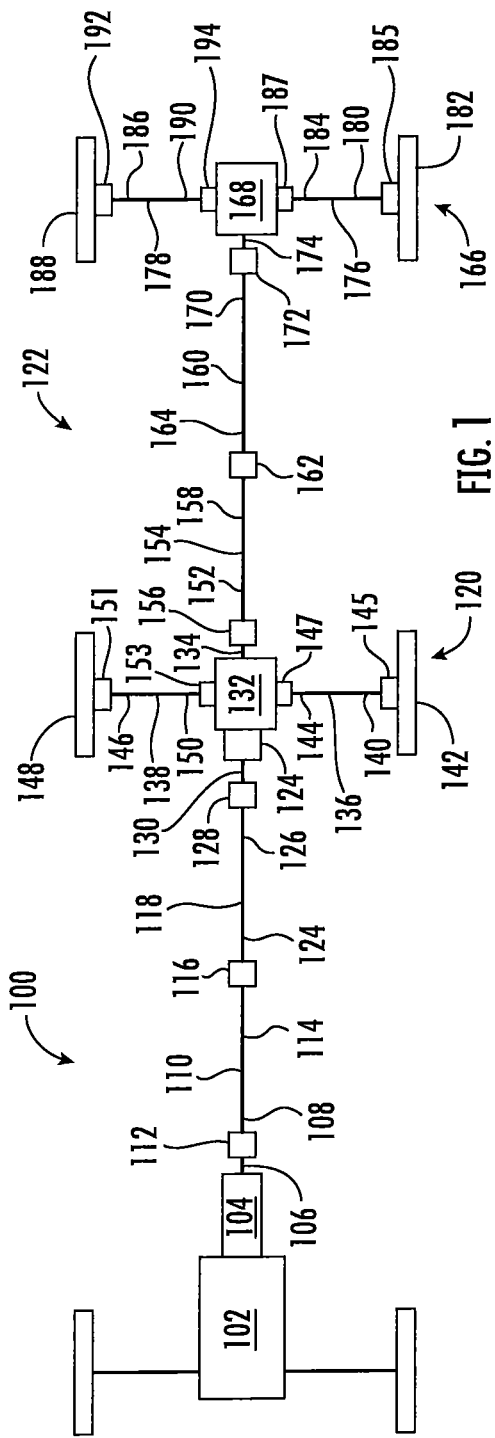
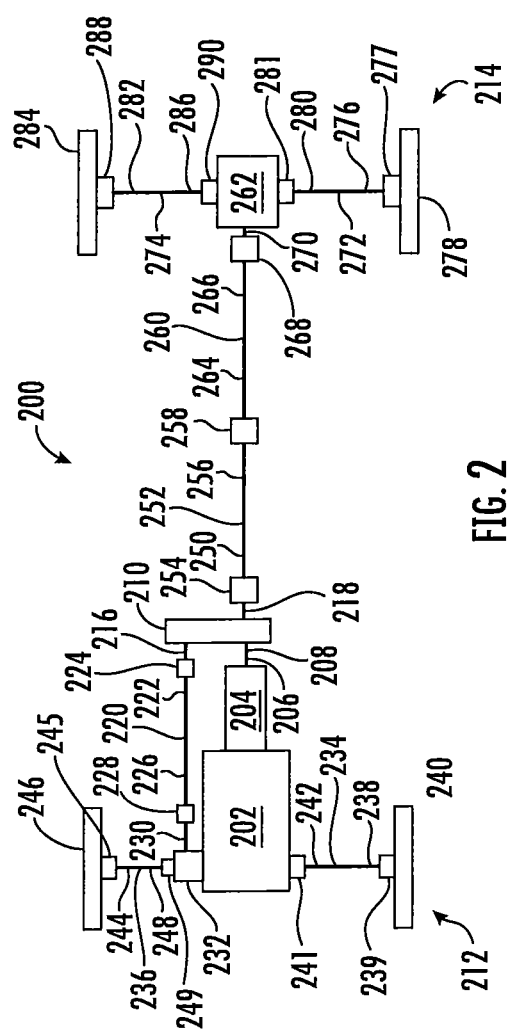
FIG. 1
FIG. 2

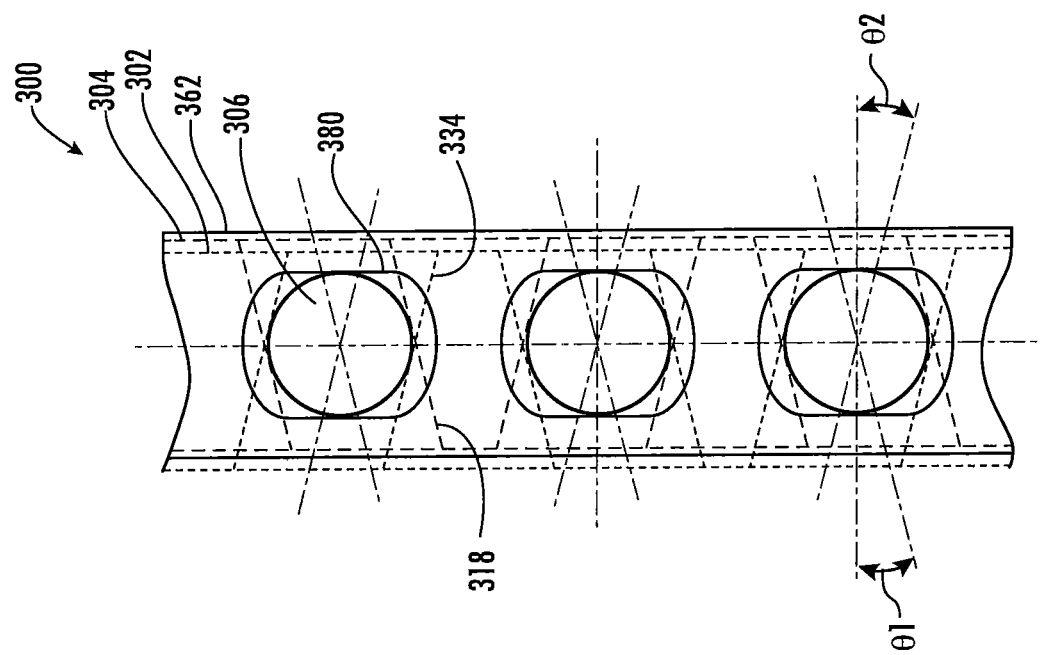
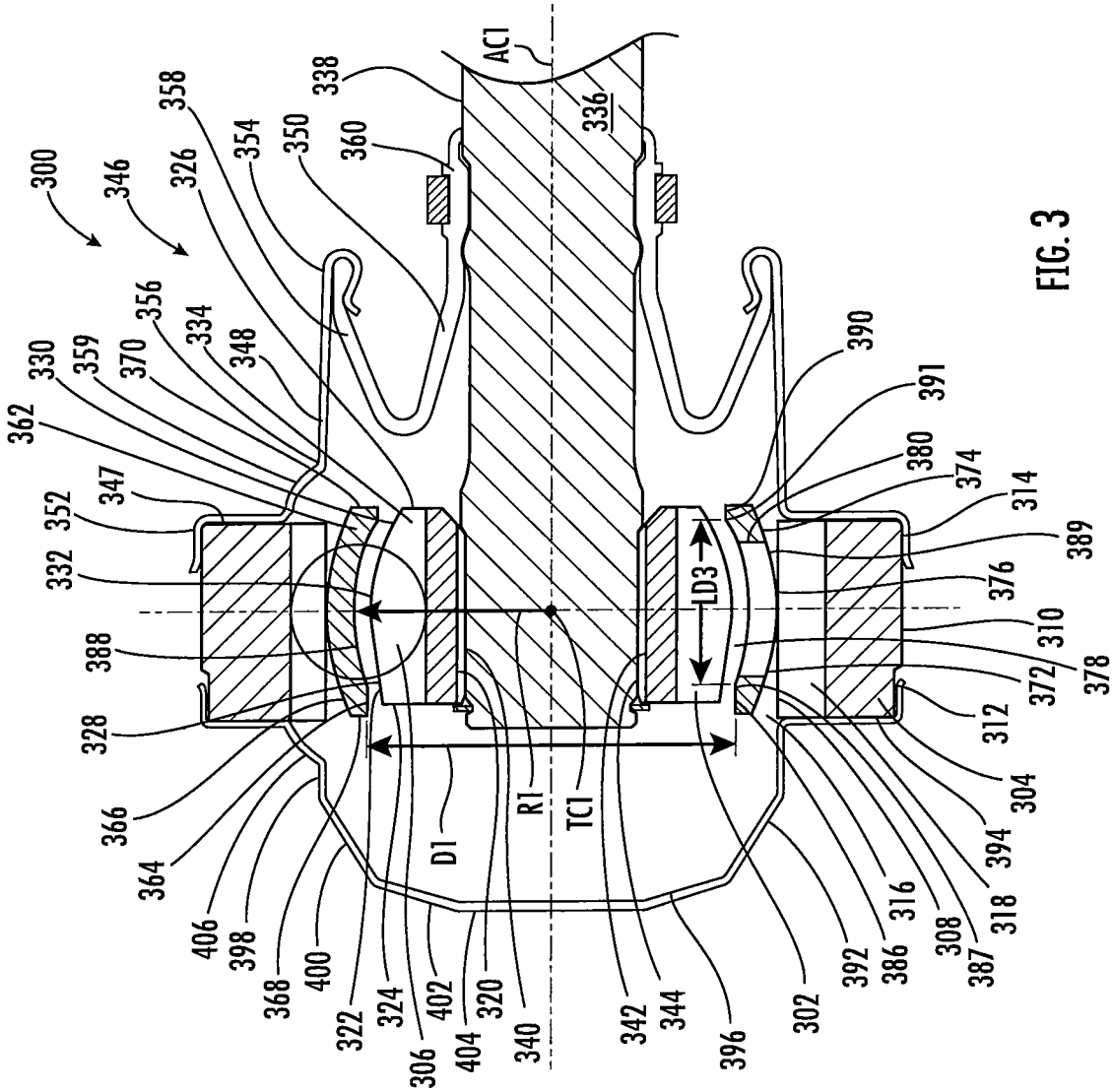

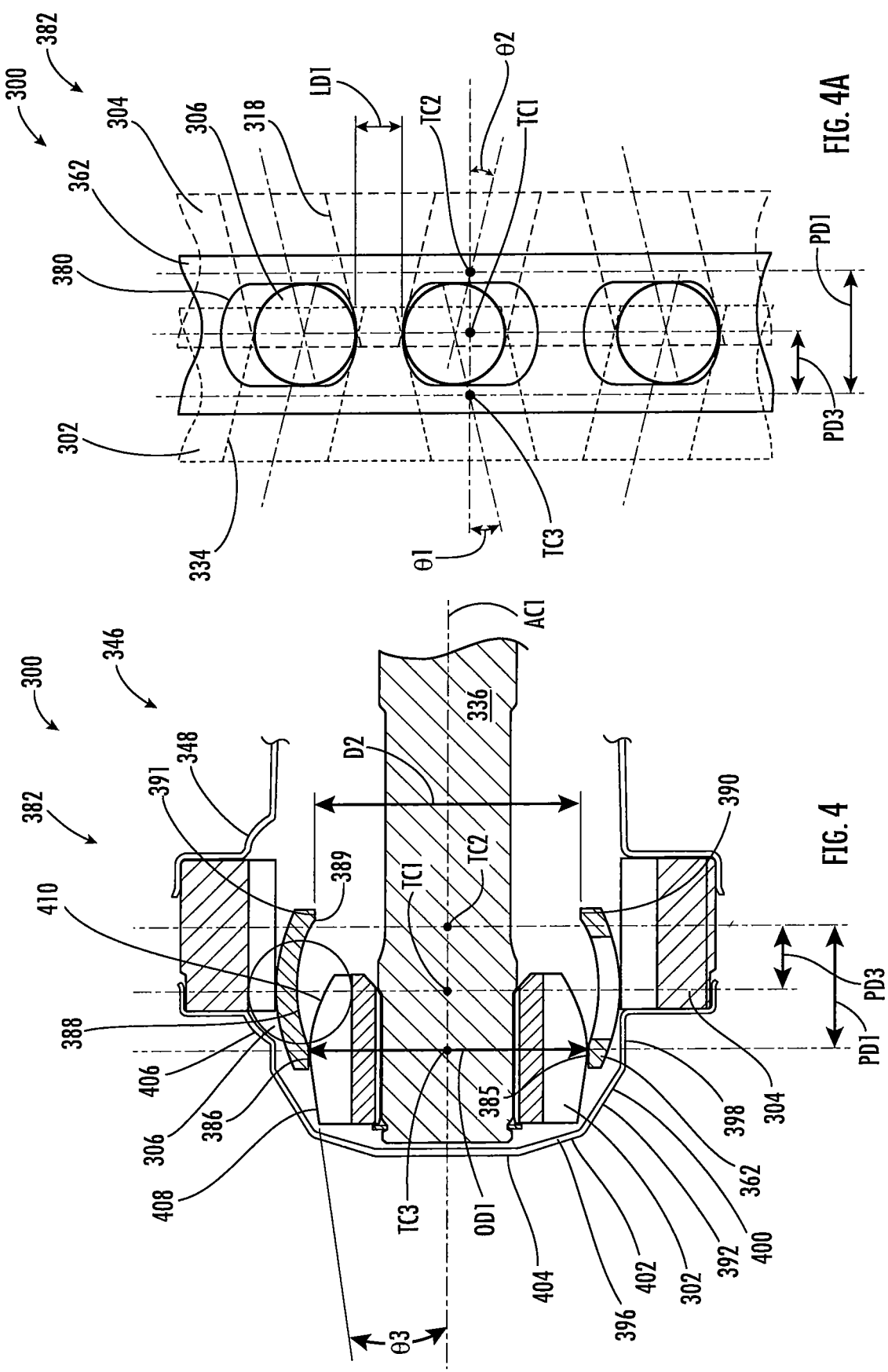

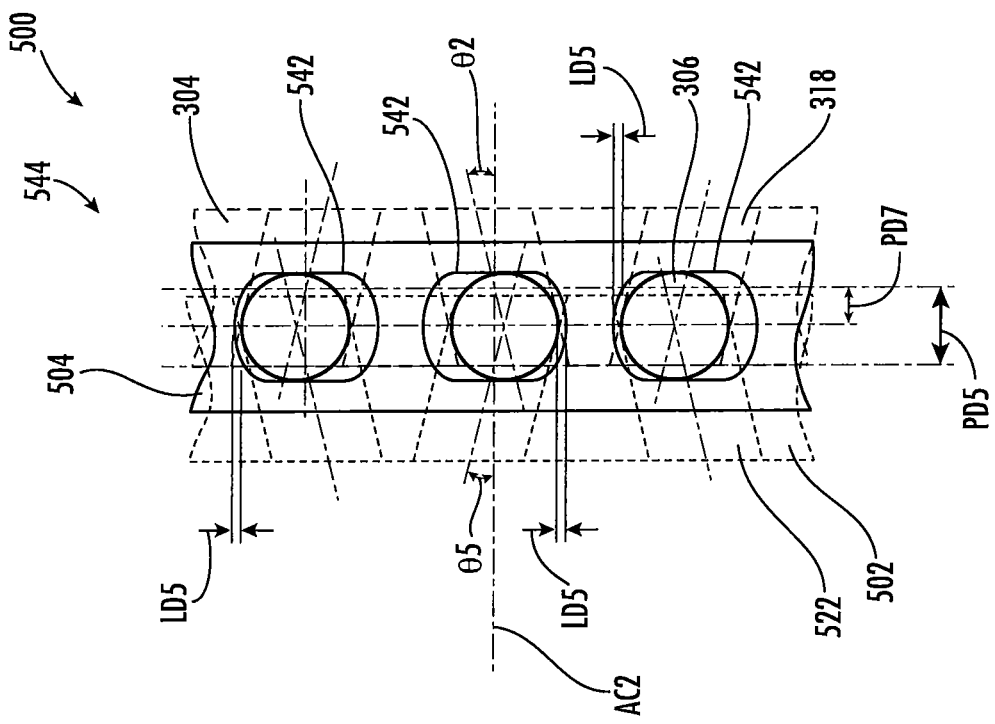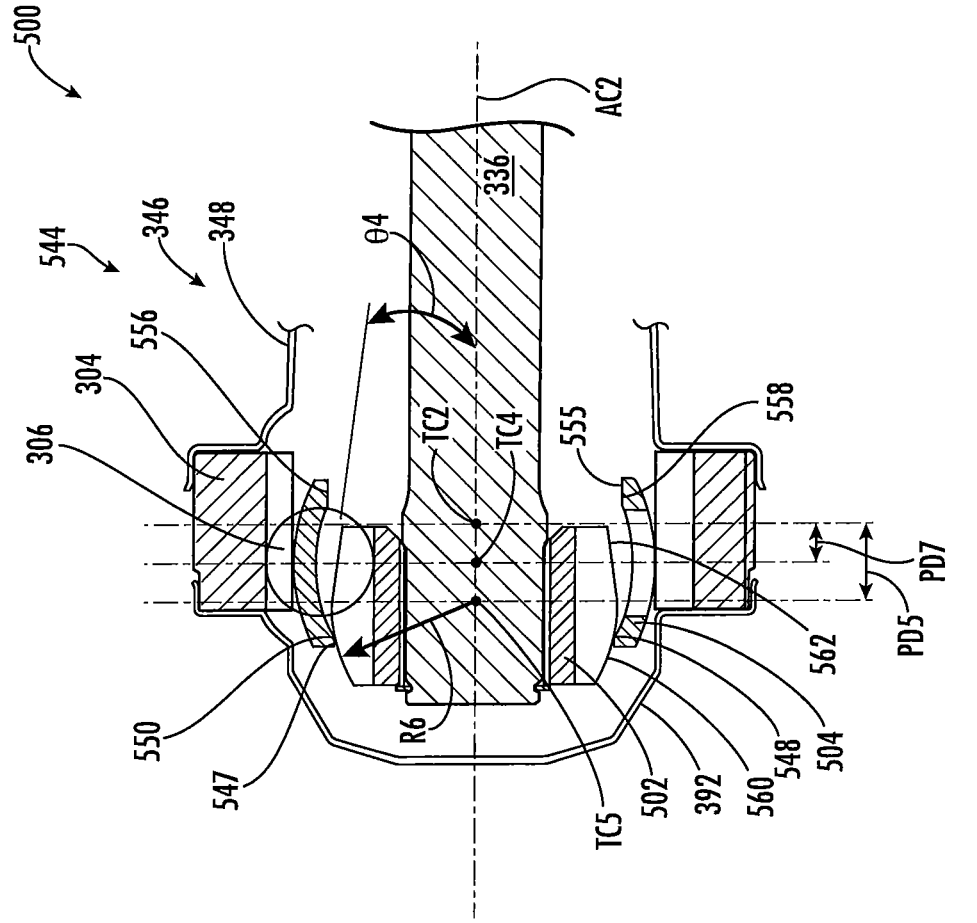

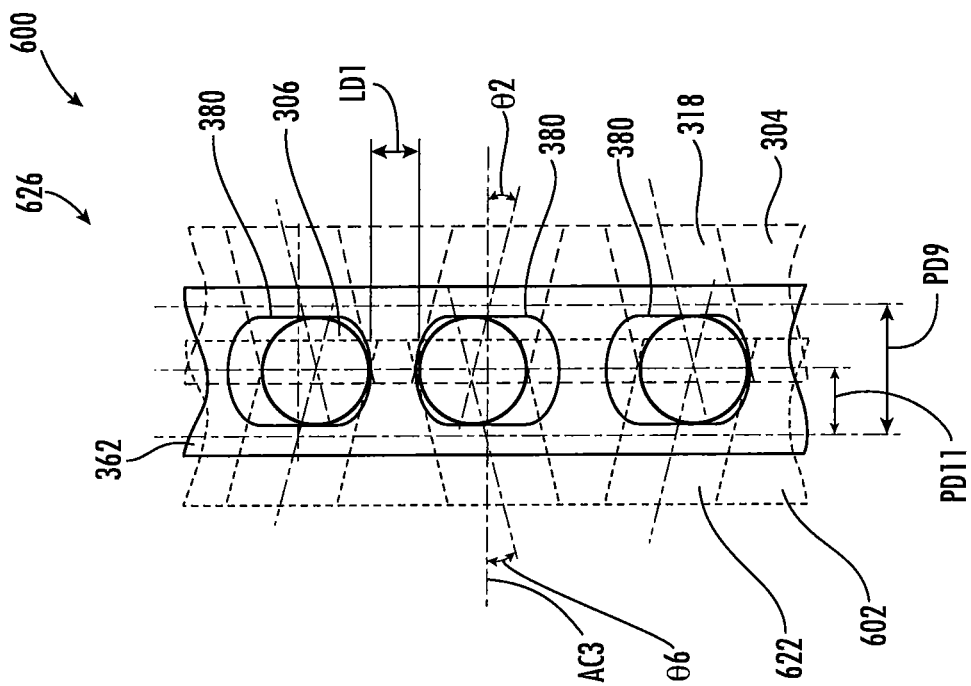
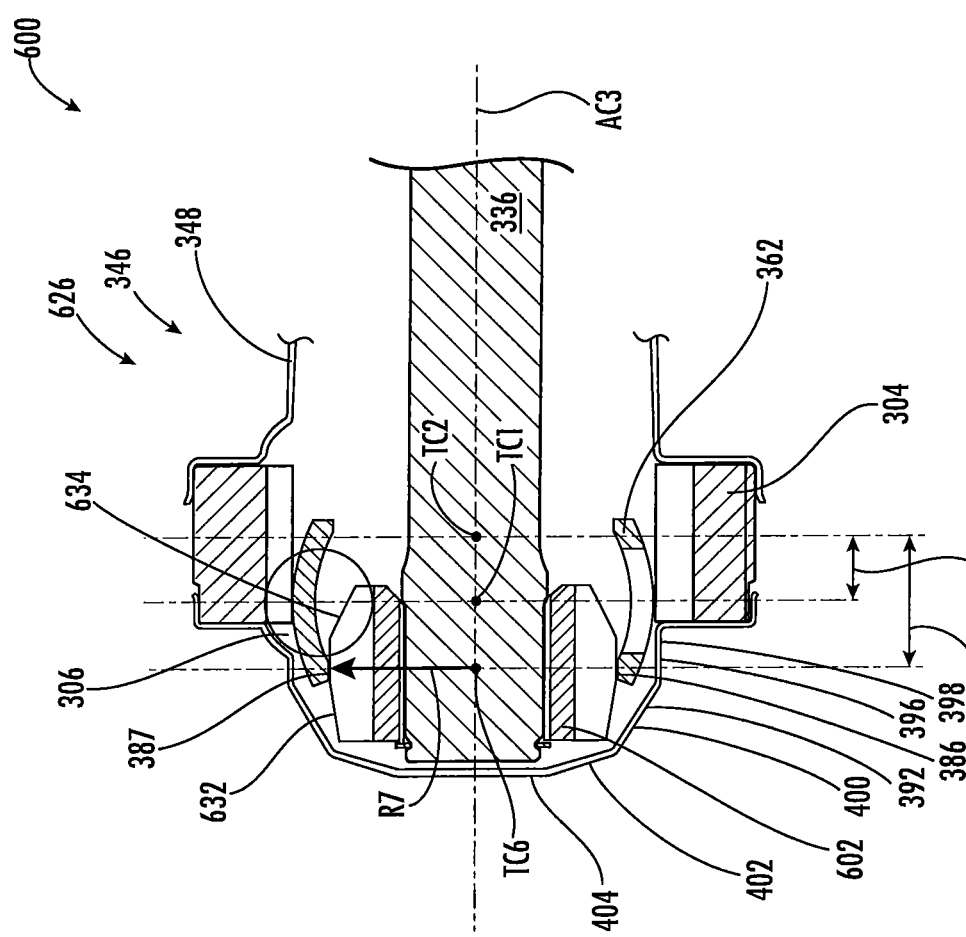
FIG. 10A
FIG. 10

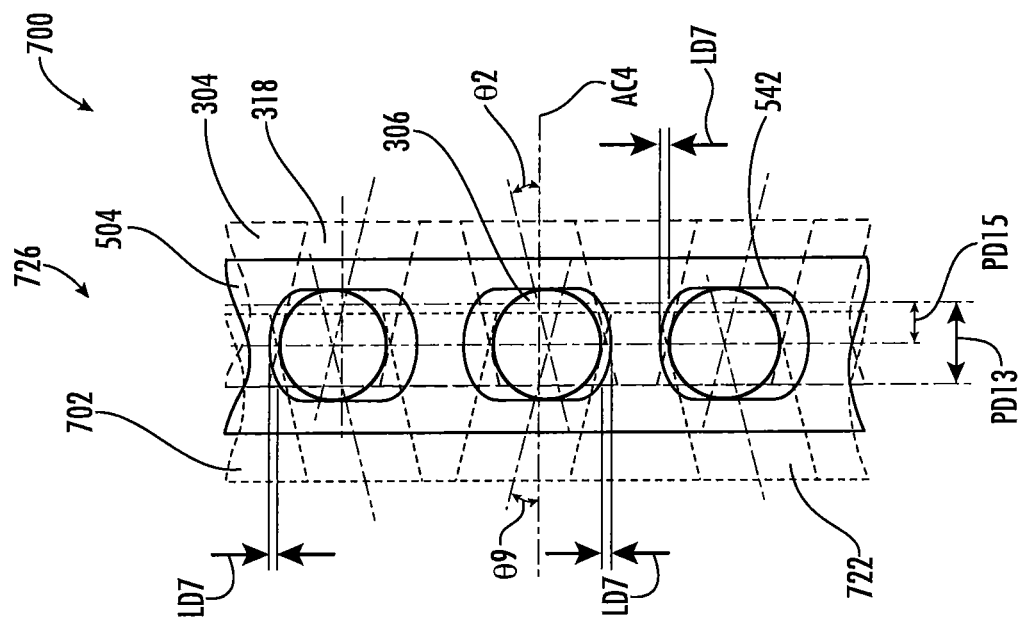
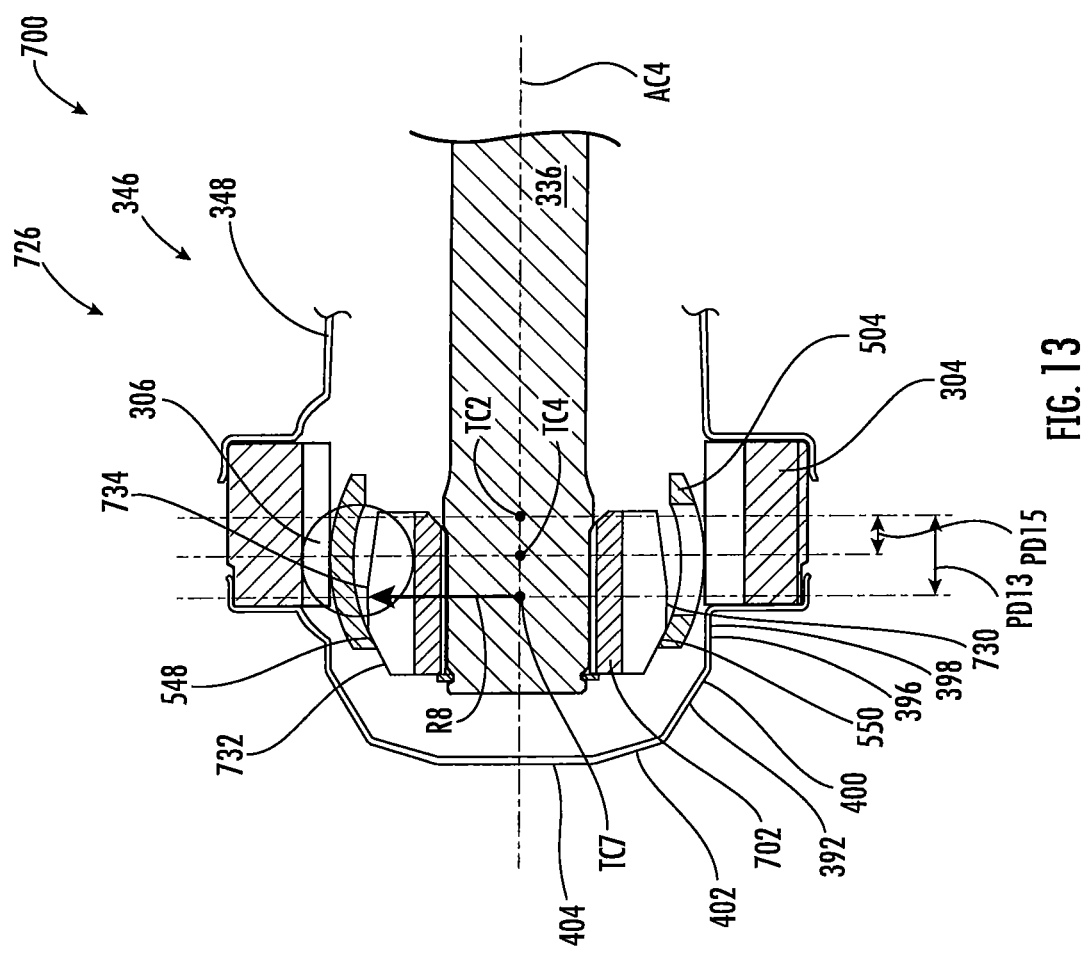

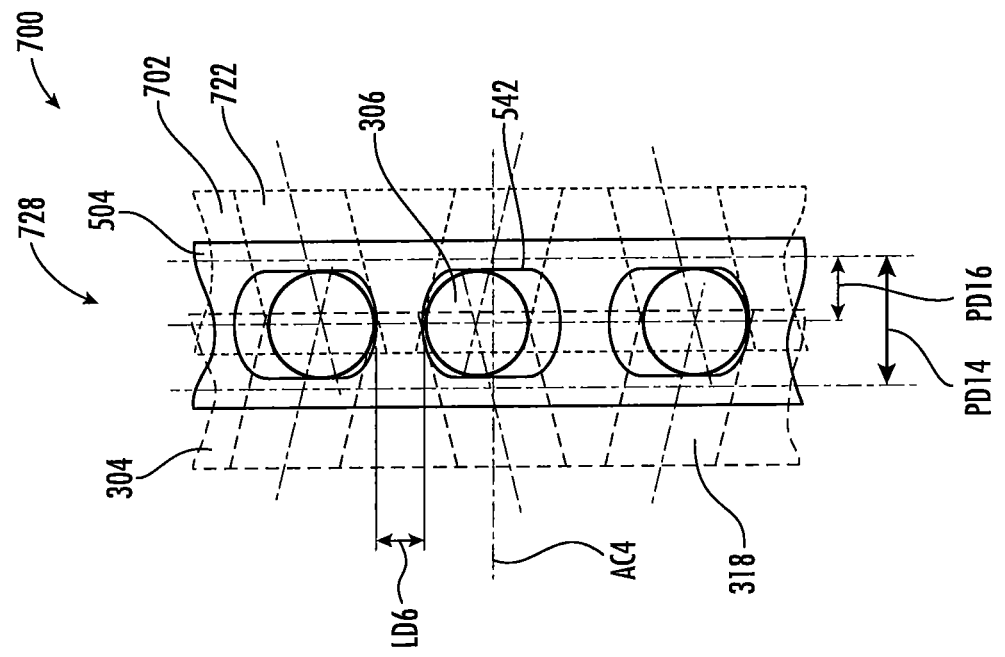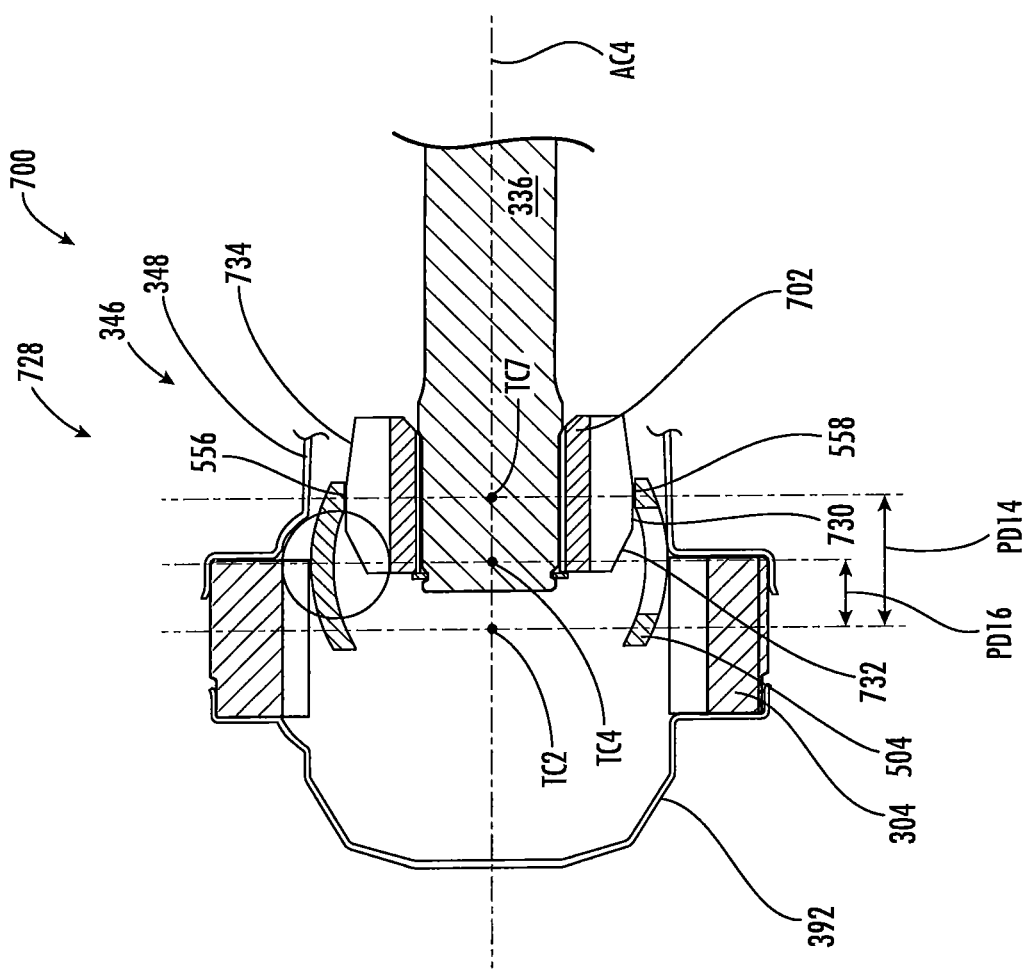

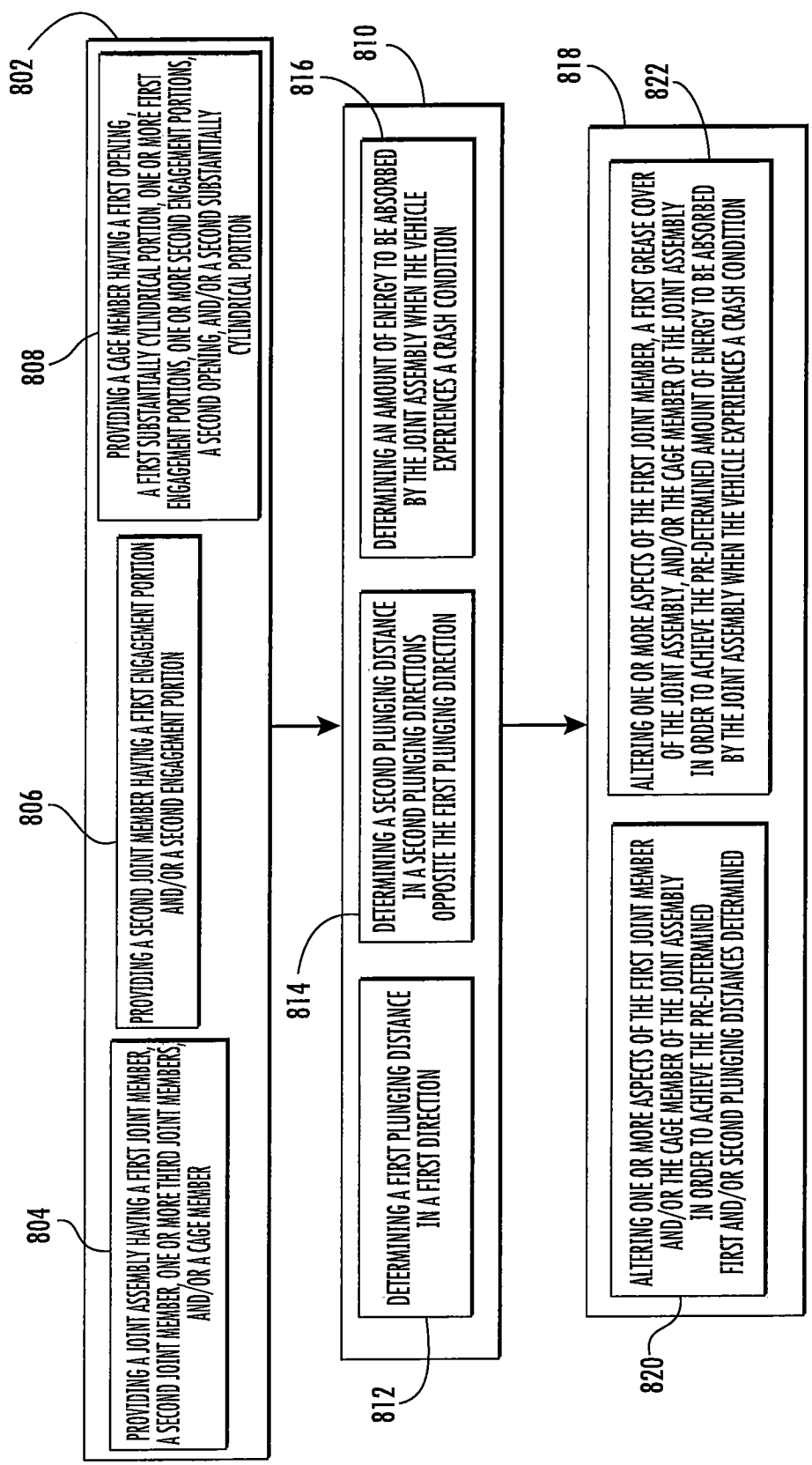

CONSTANT VELOCITY JOINT ASSEMBLY AND METHOD THEREOF

FIELD OF THE DISCLOSURE

The present disclosure relates to a constant velocity joint assembly for use in a motor vehicle.

BACKGROUND OF THE DISCLOSURE

Various constant velocity joint assemblies are known in the art. Conventional constant velocity joint assemblies, such as cross-groove plunging constant velocity joint assemblies, have a maximum plunging distance that is restricted by an interference between the plurality of balls and a plurality of windows in a cage. In order to increase the plunging distance, the plurality of windows in the cage need to increase in size which decreases the amount of material between each of the windows. By decreasing the amount of material between each of window in the cage, the overall strength, durability, and life of the cage and the constant velocity joint assembly as a whole is drastically reduced. As a result, in order to provide a constant velocity joint assembly with a larger plunging distance, the diameters of the various components of the constant velocity joint assembly needs to increase to provide a cage that can accommodate the increased plunging distance while at the same time having the desired strength, durability, and life. This results in a constant velocity joint assembly that is heavier, has an increased packaging size, and is more expensive to manufacture.

It would therefore be advantageous to develop a constant velocity joint assembly that is lighter, has an improved plunging distance, has an improved packaging size, has improved crash characteristics, has an improved overall amount of energy absorption, is more cost efficient, and is customizable thereby allowing a single constant velocity joint assembly to be used in a wide variety of applications.

SUMMARY OF THE DISCLOSURE

A joint assembly for use in a vehicle and method of utilizing the same. The joint assembly may include a first joint member that is drivingly connected to a second joint member by using one or more third joint members. At least a portion of a cage member may be interposed between the first second joint member and the second joint member of the joint assembly. When the first joint member is plunged in a first direction, at least a portion of one or more first engagement portions of the first joint member are may be in direct contact with at least a portion of one or more first engagement portions of the cage member. When the first joint member is plunged in a second direction, opposite the first direction, at least a portion of one or more second engagement portions of the first joint member are may be in direct contact with at least a portion of one or more second engagement portions of the cage member.

According to the previous aspects of the disclosure, the one or more first engagement portions of the first joint member are in direct contact with at least a portion of the one or more first engagement portions of the cage member, the first joint member has traveled a first plunging distance. When the one or more second engagement portions of the first joint member are in direct contact with at least a portion of the one or more second engagement portions of the cage member, the first joint member has traveled a second plunging distance. The first plunging distance and the second plunging distance may be measured from a theoretical center of the first joint member to a theoretical center of the second joint member.

According to any one of the previous aspects of the disclosure, the first plunging distance may be less than the second plunging distance.

According to any one of the previous aspects of the disclosure, the first plunging distance may be greater than the second plunging distance.

According to any one of the previous aspects of the disclosure, the joint assembly may further include a first grease cover. The first grease cover may have a first receiving portion having a size and shape to receive and/or retain at least a portion of the first joint member, the one or more third joint members, and/or the cage member therein when the first joint member has traveled the first plunging distance.

According to any one of the previous aspects of the disclosure, the one or more first engagement portions and/or the one or more second engagement portions of the first joint member may have a substantially conical or a substantially frusto-conical shape having an outer surface that extends toward the second joint member at an angle. The angle may extend relative to an axial centerline of the joint assembly.

According to any one of the previous aspects of the disclosure, the one or more first engagement portions may have a substantially conical or a substantially frusto-conical shape having an outer surface that extends toward the second joint member at a first angle relative to an axial centerline of the joint assembly. The one or more second engagement portions of the first joint member may have a substantially conical or a substantially frusto-conical shape having an outer surface that extends toward the second joint member at a second angle relative to the axial centerline of the joint assembly. The first angle of the one or more first engagement portions of the first joint member may be equal to or different from the second angle of the one or more second engagement portions of the first joint member.

According to any one of the previous aspects of the disclosure, the one or more first engagement portions and/or the one or more second engagement portions of the first joint member may have a substantially arcuate cross-sectional shape or profile defined by a radius extending from a theoretical center of the first joint member.

According to any one of the previous aspects of the disclosure, the first joint member may further include a substantially cylindrical portion interposed between the one or more first engagement portions of the first joint member and the one or more second engagement portions of the first joint member.

According to any one of the previous aspects of the disclosure, the first end portion of the inner surface of the cage member may have a first substantially cylindrical portion and/or a first opening defining the one or more first engagement portions of the cage member. The second substantially cylindrical portion and/or the first opening of the cage member may have a diameter that is less than or equal to an outer diameter of the one or more first engagement portions of the first joint member.

According to any one of the previous aspects of the disclosure, the second end portion of the inner surface of the cage member may have a second substantially cylindrical portion and/or a second opening defining the one or more second engagement portions of the cage member. The second substantially cylindrical portion and/or the second opening of the cage member may have a diameter that is less than or equal to an outer diameter of the one or more second engagement portions of the first joint member.

According to any one of the previous aspects of the disclosure, the first end portion of the inner surface of the cage member may have a first substantially cylindrical portion and/or a first opening defining the one or more first engagement portions of the cage member. The second end portion of the inner surface of the cage member may have a second substantially cylindrical portion and/or a second opening defining the one or more second engagement portions of the cage member. The first substantially cylindrical portion and/or the first opening of the cage member may have a diameter that is less than or equal to a diameter of the second substantially cylindrical portion and/or the second opening of the cage member.

According to any one of the previous aspects of the disclosure, the first end portion of the inner surface of the cage member may have a first substantially cylindrical portion and/or a first opening defining the one or more first engagement portions of the cage member. The second end portion of the inner surface of the cage member may have a second substantially cylindrical portion and/or a second opening defining the one or more second engagement portions of the cage member. The first substantially cylindrical portion and/or the first opening of the cage member may have a diameter that is greater than or equal to a diameter of the second substantially cylindrical portion and/or the second opening of the cage member.

According to any one of the previous aspects of the disclosure, the one or more first or second engagement portions of the first joint member may drive the cage member outward allowing the first joint member to translate outside the second joint member thereby allowing the joint assembly to absorb an amount of energy when in a crash condition.

According to any one of the previous aspects of the disclosure, the one or more first engagement portions of the cage member may be disposed a linear distance from the one or more second engagement portions of the cage member.

The present disclosure relates to a method of utilizing the joint assembly. The method includes providing a joint assembly having a first joint member, a second joint member, one or more third joint members, a cage member, and/or a first grease cover. The first joint member may have one or more first engagement portions and/or one or more second engagement portions and the cage member may have one or more first engagement portions and/or one or more second engagement portions. Determining a first plunging distance in a first direction and determining a second plunging distance in a second direction opposite the first direction. Altering one or more aspects of the first joint member and/or the cage member in order to achieve the first plunging distance determined and/or the second plunging distance determined.

According to the previous aspect of the disclosure, the step of altering one or more aspects of the first joint member and/or the cage member in order to achieve the first and/or second plunging distance determined may include altering. This step may include altering a linear distance between a first opening and/or a first substantially cylindrical portion of the cage member and a second opening and/or a second substantially cylindrical portion of the cage member. This step may further include altering the one or more first engagement portions of the cage member, the one or more second engagement portions of the cage member, a diameter of the first opening and/or the first substantially cylindrical portion of the cage member, a diameter of the second opening and/or the second substantially cylindrical portion of the cage member, a shape of the one or more first engagement portions of the first joint member, a location of the one or more first engagement portions of the first joint member, an outer diameter of the one or more first engagement portions of the first joint member, an angle defining the shape of the one or more first engagement portions of the first joint member, a radius defining the shape of the one or more first engagement portions of the first joint member, a shape of the one or more second engagement portions of the first joint member, a location of the one or more second engagement portions of the first joint member, an outer diameter of the one or more second engagement portions of the first joint member, an angle defining the shape of the one or more second engagement portions of the first joint member, and/or a radius defining the shape of the one or more second engagement portions of the first joint member.

According to any one of the previous aspects of the disclosure, the method may further include the step of determining an amount of energy to be absorbed by the joint assembly when in a crash condition. Additionally, the method may further include the step of altering one or more aspects of the first joint member, the first grease cover, and/or the cage member of the joint assembly in order to achieve the pre-determined amount of energy to be absorbed by the joint assembly when in the crash condition.

According to any one of the previous aspects of the disclosure, the step of altering one or more aspects of the first joint member, the first grease cover, and/or the cage member of the joint assembly in order to, achieve the pre-determined amount of energy to be absorbed when in the crash condition may include altering any of the following elements. The altering step may include altering a linear distance between a first opening and/or a first substantially cylindrical portion of the cage member and a second opening and/or a second substantially cylindrical portion of the cage member, the one or more first engagement portions of the cage member, the one or more second engagement portions of the cage This step may further include altering a diameter of the first opening and/or the first substantially cylindrical portion of the cage member, a diameter of the second opening and/or the second substantially cylindrical portion of the cage member, a shape of the one or more first engagement portions of the first joint member, a location of the one or more first engagement portions of the first joint member, an outer diameter of the one or more first engagement portions of the first joint member, an angle defining the shape of the one or more first engagement portions of the first joint member, a radius defining the shape of the one or more first engagement portions of the first joint member, a shape of the one or more second engagement portions of the first joint member, a location of the one or more second engagement portions of the first joint member, an outer diameter of the one or more second engagement portions of the first joint member, an angle defining the shape of the one or more second engagement portions of the first joint member, a radius defining the shape of the one or more second engagement portions of the first joint member, a shape of the first grease cover, a material of the first grease cover, and/or a way in which the first grease cover is attached to the second joint member of the joint assembly.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 1 is a schematic top-plan view of a vehicle having one or more joint assemblies and coupling assemblies according to an embodiment of the disclosure;

FIG. 2 is a schematic top-plan view of another vehicle having one or more joint assemblies and coupling assemblies according to an embodiment of the disclosure;

FIG. 3 is a cut away schematic side-view of a joint assembly according to an embodiment of the disclosure;

FIG. 3A is a cut away schematic side-view of a portion of the joint assembly illustrated in FIG. 3 of the disclosure;

FIG. 4 is a cut away schematic side-view of the joint assembly illustrated in FIGS. 3 and 3A, when the joint assembly has been extended a first plunging distance;

FIG. 4A is a cut away schematic side-view of a portion of the joint assembly illustrated in FIG. 4 of the disclosure when the joint assembly has been extended the first plunging distance;

FIG. 7 is a cut away schematic side-view of the joint assembly illustrated in FIG. 6 of the disclosure when the joint assembly has been extended a first plunging distance;

FIG. 7A is a cut-away schematic side-view of a portion of the joint assembly illustrated in FIGS. 6 and 7 when the joint assembly has been extended the first plunging distance;

FIG. 10 is a cut away schematic side-view of the joint assembly illustrated in FIG. 9 when the joint assembly has been extended a first plunging distance;

FIG. 10A is a cut-away schematic side-view of a portion of the joint assembly illustrated in FIGS. 9 and 10 when the joint assembly has been extended the first plunging distance;

FIG. 13 is a cut away schematic side-view of the joint assembly illustrated in FIG. 12 when the joint assembly has been extended a first plunging distance;

FIG. 13A is a cut-away schematic side-view of a portion of the joint assembly illustrated in FIGS. 12 and 13 when the joint assembly has been extended the first plunging distance;

FIG. 14 is a cut away schematic side-view of the joint assembly illustrated in FIGS. 9-13A when the joint assembly has been extended a second plunging distance;

FIG. 14A is a cut-away schematic side-view of a portion of the joint assembly illustrated in FIGS. 12-14 when the joint assembly has been extended the second plunging distance; and FIG. 15 is a flow chart illustrating the method of utilizing the joint assembly illustrated in FIGS. 3-14A of the disclosure.

DETAILED DESCRIPTION OF THE DISCLOSURE

Figure 5A:
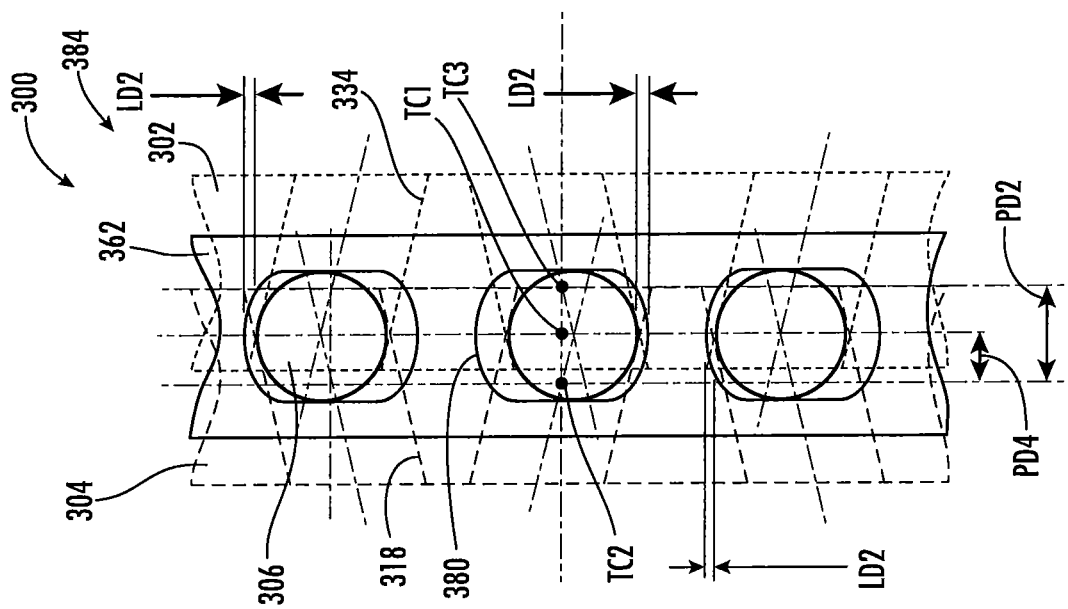
FIG. 5A is a cut away schematic side-view of a portion of the joint assembly illustrated in FIG. 5 of the disclosure when the joint assembly has been extended the second plunging distance.

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the joint assembly disclosed herein may be used in automotive, off-road vehicle, all-terrain vehicle, construction, structural, marine, aerospace, locomotive, military, machinery, robotic and/or consumer product applications. Additionally, as a non-limiting example, the joint assembly disclosed herein may also be used in passenger vehicle, electric vehicle, hybrid vehicle, commercial vehicle, autonomous vehicles, semi-autonomous vehicles and/or heavy vehicle applications.

FIG. 1 is a schematic top-plan view of a vehicle 100 having one or more rotating shafts that are balanced according to an embodiment of the disclosure. The vehicle 100 has an engine 102, which is drivingly connected to a transmission 104. A transmission output shaft 106 is drivingly connected to an end of the transmission 104 opposite the engine 102. The transmission 104 is a power management system which provides controlled application of the rotational power generated by the engine by means of a gear box.

A first end portion 108 of a first propeller shaft 110 may be drivingly connected to an end of the transmission output shaft 106 opposite the transmission 104 via a first joint assembly 112. As illustrated in FIG. 1 of the disclosure and as a non-limiting example, a second end portion 114 of the first propeller shaft 110 may be drivingly connected to a second joint assembly 116.

Drivingly connected to an end of the second joint assembly 116, opposite the first propeller shaft 110, is a second propeller shaft 118. The second propeller shaft 118 drivingly connects the transmission 104 to a forward tandem axle system 120 of a tandem axle system 122 having an inter-axle differential 124. As illustrated in FIG. 1 of the disclosure and as a non-limiting example, at least a portion of a first end portion 124 of the second propeller shaft 118 may be drivingly connected to an end of the second joint assembly 116 opposite the first propeller shaft 110.

At least a portion of a second end portion 126 of the second propeller shaft 118 may be drivingly connected to an end of a third joint assembly 128. Drivingly connected to an end of the third joint assembly 128, opposite the second propeller shaft 118, is an end of a forward tandem axle system input shaft 130. An end of the forward tandem axle system input shaft 130, opposite the second propeller shaft 118, is drivingly connected to at least a portion of the inter-axle differential 124 of the forward tandem axle system 120. As a non-limiting example, the forward tandem axle system input shaft 130 may be an inter-axle differential input shaft, a coupling shaft, stub shaft or an inter-axle differential pinion shaft. The inter-axle differential 124 is a device that divides the rotational power generated by the engine 104 between the axles in a vehicle 100. The rotational power is transmitted through the forward tandem axle system 120 as described in more detail below.

As illustrated in FIG. 1 of the disclosure and as a non-limiting example, the inter-axle differential 124 is drivingly connected to a forward tandem axle differential 132 and a forward tandem axle system output shaft 134. The forward tandem axle differential 132 is a set of gears that allows the outer drive wheel(s) of a wheeled vehicle to rotate at a faster rate than the inner drive wheel(s).

The forward tandem axle system 120 further includes a first forward tandem axle half shaft 136 and a second front tandem axle half shaft 138. The first forward tandem axle half shaft 136 extends substantially perpendicular to the forward tandem axle system input shaft 130. At least a portion of a first end portion 140 of the first forward tandem axle half shaft 136 may be drivingly connected to a first forward tandem axle wheel assembly 142 and at least a portion of a second end portion 144 of the first forward tandem axle half shaft 136 may be drivingly connected to an end of the forward tandem axle differential 132. As a non-limiting example, the second end portion 144 of the first forward tandem axle half shaft 136 may be drivingly connected to a forward tandem axle differential side gear, a separate stub shaft, a separate coupling shaft, a first forward tandem axle differential output shaft and/or a shaft that is formed as part of a forward tandem axle differential side gear.

According to an embodiment of the disclosure and as a non-limiting example, at least a portion of the first end portion 140 of the first forward tandem axle half shaft 136 may be drivingly connected to at least a portion of a fourth joint assembly 145. At least a portion of an end of the fourth joint assembly 145, opposite the first forward tandem axle half shaft 136, may be drivingly connected to at least a portion of the first forward tandem axle wheel assembly 142 of the vehicle 100.

In accordance with a further embodiment of the disclosure and as a non-limiting example, at least a portion of the second end portion 144 of the first forward tandem axle half shaft 136 may be drivingly connected to at least a portion of a fifth joint assembly 147. At least a portion of an end of the fifth joint assembly 147, opposite the first forward tandem axle half shaft 136, may be drivingly connected to at least a portion of the forward tandem axle differential 132 of the vehicle 100.

Extending substantially perpendicular to the forward tandem axle input shaft 130 is the second front tandem axle half shaft 138. At least a portion of a first end portion 146 of the second forward tandem axle half shaft 138 may be drivingly connected to a second forward tandem axle wheel assembly 148. At least a portion of a second end portion 150 of the second forward tandem axle half shaft 138 may be drivingly connected to an end of the forward tandem axle differential 132 opposite the first forward tandem axle half shaft 136. As a non-limiting example, the second end portion 150 of the second forward tandem axle half shaft 138 may be drivingly connected to a forward tandem axle differential side gear, a separate stub shaft, a separate coupling shaft, a second forward tandem axle differential output shaft and/or a shaft that is formed as part of a forward tandem axle differential side gear.

According to an embodiment of the disclosure and as a non-limiting example, at least a portion of the first end portion 146 of the second forward tandem axle half shaft 138 may be drivingly connected to at least a portion of a sixth joint assembly 151. At least a portion of an end of the sixth joint assembly 151, opposite the second forward tandem axle half shaft 138, may be drivingly connected to at least a portion of the second forward tandem axle wheel assembly 148 of the vehicle 100.

In accordance with a further embodiment of the disclosure and as a non-limiting example, at least a portion of the second end portion 510 of the second forward tandem axle half shaft 138 may be drivingly connected to at least a portion of a seventh joint assembly 153. At least a portion of an end of the seventh joint assembly 153, opposite the second forward tandem axle half shaft 138, may be drivingly connected to at least a portion of an end of the forward tandem axle differential 132 opposite the first forward tandem axle half shaft 136.

One end of the forward tandem axle system output shaft 134 is drivingly connected to a side of the inter-axle differential 124 opposite the second propeller shaft 118. An end of the forward tandem axle system output shaft 134, opposite the inter-axle differential 124, may be drivingly connected to at least a portion of a first end portion 152 of a third propeller shaft 154 via an eighth joint assembly 156. At least a portion of a second end portion 158 of the third propeller shaft 154 may be drivingly connected to a fourth propeller shaft 160 via a ninth joint assembly 162.

As illustrated in FIG. 1 of the disclosure and as a non-limiting example, at least a portion of a first end portion 164 of the fourth propeller shaft 160 may be drivingly connected to an end of the ninth joint assembly 162 opposite the third propeller shaft 154. The fourth propeller shaft 160 drivingly connects the inter-axle differential 124 to a rear tandem axle system 166 having a rear tandem axle differential 168.

Additionally, as illustrated in FIG. 1 of the disclosure and as a non-limiting example, at least a portion of a second end portion 170 of the fourth propeller shaft 160 may be drivingly connected to an end of a tenth joint assembly 172. Drivingly connected to an end of the tenth joint assembly 172, opposite the fourth propeller shaft 160 is an end of a rear tandem axle system input shaft 174. As a non-limiting example, the rear tandem axle input shaft 174 may be a rear tandem axle differential input shaft, a coupling shaft, stub shaft or a rear tandem axle differential pinion shaft. Drivingly connected to an end of the rear tandem axle input shaft 174, opposite the fourth propeller shaft 160, is the rear tandem axle differential 168. The rear tandem axle differential 168 is a set of gears that allows the outer drive wheel(s) of the wheeled vehicle to rotate at a faster rate that the inner drive wheel(s). The rotational power is transmitted through the rear tandem axle system 166 as described in more detail below.

The rear tandem axle system 166 further includes a first rear tandem axle half shaft 176 and a second rear tandem axle half shaft 178. The first rear tandem axle half shaft 176 extends substantially perpendicular to the rear tandem axle system input shaft 174. At least a portion of a first end portion 180 of the first rear tandem axle half shaft 176 may be drivingly connected to a first rear tandem axle wheel assembly 182 and at least a portion of a second end portion 184 of the first rear tandem axle half shaft 176 may be drivingly connected to an end of the rear tandem axle differential 168. As a non-limiting example, the second end portion 184 of the first rear tandem axle half shaft 176 may be drivingly connected to a rear tandem axle differential side gear, a separate stub shaft, a separate coupling shaft, a first rear tandem axle differential output shaft and/or a shaft that is formed as part of a rear tandem axle differential side gear.

According to an embodiment of the disclosure and as a non-limiting example, at least a portion of the first end portion 180 of the first rear tandem axle half shaft 176 may be drivingly connected to at least a portion of an eleventh joint assembly 185. At least a portion of an end of the eleventh joint assembly 185, opposite the first rear tandem axle half shaft 176, may be drivingly connected to at least a portion of the first rear tandem axle wheel assembly 182 of the vehicle 100.

In accordance with a further embodiment of the disclosure and as a non-limiting example, at least a portion of the second end portion 184 of the first rear tandem axle half shaft 176 may be drivingly connected to at least a portion of a twelfth joint assembly 187. At least a portion of an end of the twelfth joint assembly 187, opposite the first rear tandem axle half shaft 176, may be drivingly connected to at least a portion of the rear tandem axle differential 168 of the vehicle 100.

Extending substantially perpendicular to the rear tandem axle system input shaft 174 is the second forward tandem axle half shaft 178. At least a portion of a first end portion 186 of the second rear tandem axle half shaft 178 may be drivingly connected to a second rear tandem axle wheel assembly 188. Additionally, at least a portion of a second end portion 190 of the second rear tandem axle half shaft 178 may be drivingly connected to an end of the rear tandem axle differential 168 opposite the first rear tandem axle half shaft 176. As a non-limiting example, the second end portion 190 of the second rear tandem axle half shaft 178 may be drivingly connected to a rear tandem axle differential side gear, a separate stub shaft, a separate coupling shaft, a second rear tandem axle differential output shaft and/or a shaft that is formed as part of a rear tandem axle differential side gear.

According to an embodiment of the disclosure and as a non-limiting example, at least a portion of the first end portion 186 of the second rear tandem axle half shaft 178 may be drivingly connected to at least a portion of a thirteenth joint assembly 192. At least a portion of an end of the thirteenth joint assembly 192, opposite the second rear tandem axle half shaft 178, may be drivingly connected to at least a portion of the second rear tandem axle wheel assembly 188 of the vehicle 100.

In accordance with a further embodiment of the disclosure and as a non-limiting example, at least a portion of the second end portion 190 of the second rear tandem axle half shaft 178 may be drivingly connected to at least a portion of a fourteenth joint assembly 194. At least a portion of an end of the fourteenth joint assembly 194, opposite the second rear tandem axle half shaft 178, may be drivingly connected to at least a portion of the rear tandem axle differential 168 opposite the first rear tandem axle half shaft 176.

It is within the scope of this disclosure and as a non-limiting example that the first, second, third, fourth, fifth, sixth, seventh, eighth, ninth, tenth, eleventh, twelfth, thirteenth, and/or fourteenth joint assembly 112, 116, 128, 145, 147, 151, 153, 156, 162, 172, 185, 187, 192, and/or 194 may be a homokinetic coupling assembly, a constant velocity joint assembly, a CV joint assembly, a universal joint assembly, a Cardan joint assembly, a Spicer joint assembly, a Hooke's joint assembly and/or a universal coupling assembly. Additionally, it is within the scope of this disclosure and as a non-limiting example that at least a portion of the first, second, third, fourth, fifth, sixth, seventh, eighth, ninth, tenth, eleventh, twelfth, thirteenth, and/or fourteenth joint assembly 112, 116, 128, 145, 147, 151, 153, 156, 162, 172, 185, 187, 192, and/or 194 may be a plunging constant velocity joint assembly according to an embodiment of the disclosure.

FIG. 2 is a schematic top-plan view of another vehicle 200 having one or more rotating shafts that are balanced according to an embodiment of the disclosure. The vehicle 200 has an engine 202, which is drivingly connected to a transmission 204. A transmission output shaft 206 is then drivingly connected to an end of the transmission 204 opposite the engine 202. The transmission 204 is a power management system which provides controlled application of the rotational energy generated by the engine 202 by means of a gearbox.

The transmission output shaft 206 is drivingly connected to a transfer case input shaft 208 which in turn is drivingly connected to a transfer case 210. The transfer case 210 is used to transfer the rotational power from the transmission 204 to a front axle system 212 and a rear axle system 214 by utilizing a series of gears and drive shafts. The transfer case 210 further includes a first transfer case output 216 shaft and a second transfer case output shaft 218.

A first propeller shaft 220 extends from the first transfer case output shaft 216 toward the front axle system 212 of the vehicle 200. At least a portion of a first end portion 222 of the first propeller shaft 220 may be drivingly connected to an end of the first transfer case output shaft 216 opposite the transfer case 210 via a first joint assembly 224.

As illustrated in FIG. 2 of the disclosure and as a non-limiting example, at least a portion of a second end portion 226 of the first propeller shaft 220 may be drivingly connected to a second joint assembly 228. Drivingly connected to an end of the second joint assembly 228, opposite the first propeller shaft 220, is an end of a front axle system input shaft 230. As a non-limiting example, the front axle system input shaft 230 may be a front axle differential input shaft, a coupling shaft, stub shaft or a front axle differential pinion shaft. Drivingly connected to an end of the front axle system input shaft 230, opposite the first propeller shaft 220, is a front axle differential 232. The front axle differential 232 is a set of gears that allows the outer drive wheel(s) of the wheeled vehicle to rotate at a faster rate that the inner drive wheel(s). The rotational power is transmitted through the front axle system 212 as described in more detail below.

The front axle system 212 further includes a first front axle half shaft 234 and a second front axle half shaft 236. The first front axle half shaft 234 extends substantially perpendicular to the front axle system input shaft 230. At least a portion of a first end portion 238 of the first front axle half shaft 234 may be drivingly connected to a first front axle wheel assembly 240 and at least a portion of a second end portion 242 of the first front axle half shaft 234 may be drivingly connected to an end of the front axle differential 232. As a non-limiting example, the second end portion 242 of the first front axle half shaft 234 may be drivingly connected to a front axle differential side gear, a separate stub shaft, a separate coupling shaft, a first front axle differential output shaft and/or a shaft that is formed as part of a front axle differential side gear.

According to an embodiment of the disclosure and as a non-limiting example, at least a portion of the first end portion 238 of the first front axle half shaft 234 may be drivingly connected to at least a portion of a third joint assembly 239. At least a portion of an end of the third joint assembly 239, opposite the first front axle half shaft 234, may be drivingly connected to at least a portion of the first front axle wheel assembly 240 of the vehicle 200.

In accordance with a further embodiment of the disclosure and as a non-limiting example, at least a portion of the second end portion 242 of the first front axle half shaft 234 may be drivingly connected to at least a portion of a fourth joint assembly 241. At least a portion of an end of the fourth joint assembly 241, opposite the first front axle half shaft 234, may be drivingly connected to at least a portion of the front axle differential 232 of the vehicle 200.

Extending substantially perpendicular to the front axle system input shaft 230 is the second front axle half shaft 236. At least a portion of a first end portion 244 of the second front axle half shaft 236 may be drivingly connected to a second front axle wheel assembly 246. Additionally, at least a portion of a second end portion 248 of the second front axle half shaft 236 may be drivingly connected to an end of the front axle differential 232 opposite the first front axle half shaft 234. As a non-limiting example, the second end portion 248 of the second front axle half shaft 236 may be drivingly connected to a front axle differential side gear, a separate stub shaft, a separate coupling shaft, a second front axle differential output shaft and/or a shaft that is formed as part of a front axle differential side gear.

According to an embodiment of the disclosure and as a non-limiting example, at least a portion of the first end portion 244 of the second front axle half shaft 236 may be drivingly connected to at least a portion of a fifth joint assembly 245. At least a portion of an end of the fifth joint assembly 245, opposite the second front axle half shaft 236, may be drivingly connected to at least a portion of the second front axle wheel assembly 246 of the vehicle 200.

In accordance with a further embodiment of the disclosure and as a non-limiting example, at least a portion of the second end portion 248 of the second front axle half shaft 236 may be drivingly connected to at least a portion of a sixth joint assembly 249. At least a portion of an end of the sixth joint assembly 249, opposite the second front axle half shaft 236, may be drivingly connected to at least a portion of the front axle differential 232 opposite the first front axle half shaft 234.

An end of the second transfer case output shaft 218 is drivingly connected to an end of the transfer case 210 opposite the transfer case input shaft 208. As illustrated in FIG. 2 of the disclosure and as a non-limiting example, at least a portion of a first end portion 250 of a second propeller shaft 252 may be drivingly connected to an end of the second transfer case output shaft 218 opposite the transfer case 210 via a seventh joint assembly 254.

As best seen in FIG. 2 of the disclosure and as a non-limiting example, at least a portion of a second end portion 256 of the second propeller shaft 252 may be drivingly connected to an eighth joint assembly 258. Drivingly connected to an end of the eighth joint assembly 258, opposite the second propeller shaft 252, is a third propeller shaft 260. The third propeller shaft 260 drivingly connects the transfer case 210 to a rear axle differential 262 of the rear axle system 214. As illustrated in FIG. 2 of the disclosure and as a non-limiting example, at least a portion of a first end portion 264 of the third propeller shaft 260 may be drivingly connected to an end of the eighth joint assembly 258 opposite the second propeller shaft 252.

At least a portion of a second end portion 266 of the third propeller shaft 260 may be drivingly connected to an end of a ninth joint assembly 268. As a non-limiting example, the ninth joint assembly 268 may be a homokinetic coupling assembly, a constant velocity joint assembly, a CV joint assembly, a universal joint assembly, a Cardan joint assembly, a Spicer joint assembly, a Hooke's joint assembly or a universal coupling assembly.

Drivingly connected to an end of the ninth joint assembly 268, opposite the third propeller shaft 260, is an end of a rear axle system input shaft 270. An end of the rear axle system input shaft 270, opposite the third propeller shaft 260, is drivingly connected to the rear axle differential 262 of the rear axle system 214. As a non-limiting example, the rear axle system input shaft 270 may be a rear differential input shaft, a coupling shaft, stub shaft or a rear axle differential pinion shaft. The rear axle differential 262 is a set of gears that allows the outer drive wheel(s) of the wheeled vehicle to rotate at a faster rate that the inner drive wheel(s). The rotational power is transmitted through the rear axle system 214 as described in more detail below.

The rear axle system 214 further includes a first rear axle half shaft 272 and a second rear axle half shaft 274. The first rear axle half shaft 272 extends substantially perpendicular to the rear axle system input shaft 270. At least a portion of a first end portion 276 of the first rear axle half shaft 272 may be drivingly connected to a first rear axle wheel assembly 278 and at least a portion of a second end portion 280 of the first rear axle half shaft 272 may be drivingly connected to an end of the rear axle differential 262. As a non-limiting example, the second end portion 280 of the first rear axle half shaft 272 may be drivingly connected to a rear axle differential side gear, a separate stub shaft, a separate coupling shaft, a first rear axle differential output shaft and/or a shaft that is formed as part of a rear axle differential side gear.

According to an embodiment of the disclosure and as a non-limiting example, at least a portion of the first end portion 276 of the first rear axle half shaft 272 may be drivingly connected to at least a portion of a tenth joint assembly 277. At least a portion of an end of the tenth joint assembly 277, opposite the first rear axle half shaft 272, may be drivingly connected to at least a portion of the first rear axle wheel assembly 278 of the vehicle 200.

In accordance with a further embodiment of the disclosure and as a non-limiting example, at least a portion of the second end portion 280 of the first rear axle half shaft 272 may be drivingly connected to at least a portion of an eleventh joint assembly 281. At least a portion of an end of the eleventh joint assembly 281, opposite the first rear axle half shaft 272, may be drivingly connected to at least a portion of the rear axle differential 262 of the vehicle 200.

Extending substantially perpendicular to the rear axle system input shaft 270 is the second rear axle half shaft 274. At least a portion of a first end portion 282 of the second rear axle half shaft 274 may be drivingly connected to a second rear axle wheel assembly 284. Additionally, at least a portion of a second end portion 286 of the second rear axle half shaft 274 may be drivingly connected to an end of the rear axle differential 262 opposite the first rear axle half shaft 272. As a non-limiting example, the second end portion 286 of the second rear axle half shaft 274 may be drivingly connected to a rear axle differential side gear, a separate stub shaft, a separate coupling shaft, a second rear axle differential output shaft and/or a shaft that is formed as part of a rear axle differential side gear.

According to an embodiment of the disclosure and as a non-limiting example, at least a portion of the first end portion 282 of the second rear axle half shaft 274 may be drivingly connected to at least a portion of a twelfth joint assembly 288. At least a portion of an end of the twelfth joint assembly 288, opposite the second rear axle half shaft 274, may be drivingly connected to at least a portion of the second rear axle wheel assembly 284 of the vehicle 200.

In accordance with a further embodiment of the disclosure and as a non-limiting example, at least a portion of the second end portion 286 of the second rear axle half shaft 274 may be drivingly connected to at least a portion of a thirteenth joint assembly 290. At least a portion of an end of the thirteenth joint assembly 290, opposite the second rear axle half shaft 274, may be drivingly connected to at least a portion of the rear axle differential 262 opposite the first rear axle half shaft 272.

It is within the scope of this disclosure and as a non-limiting example that the first, second, third, fourth, fifth, sixth, seventh, eighth, ninth, tenth, eleventh, twelfth, and/or thirteenth joint assembly 224, 228, 239, 241, 245, 249, 254, 258, 268, 277, 281, 288, and/or 290 may be a homokinetic coupling assembly, a constant velocity joint assembly, a CV joint assembly, a universal joint assembly, a Cardan joint assembly, a Spicer joint assembly, a Hooke's joint assembly and/or a universal coupling assembly. Additionally, it is within the scope of this disclosure and as a non-limiting example that at least a portion of the first, second, third, fourth, fifth, sixth, seventh, eighth, ninth, tenth, eleventh, twelfth, and/or thirteenth joint assembly 224, 228, 239, 241, 245, 249, 254, 258, 268, 277, 281, 288, and/or 290 may be a plunging constant velocity joint assembly according to an embodiment of the disclosure.

FIGS. 3-5A provide a schematic side-view of a joint assembly 300 according to an embodiment of the disclosure. As best seen in FIG. 3 of the disclosure and as a non-limiting example, the joint assembly 300 may include a first joint member 302 that is drivingly connected to a second joint member 304 by one or more third joint members 306. It is within the scope of this disclosure and as a non-limiting example that the joint assembly 300 may be a homokinetic coupling assembly, a constant velocity joint assembly, a CV joint assembly, a universal joint assembly, a Cardan joint assembly, a Spicer joint assembly, a Hooke's joint assembly and/or a universal coupling assembly. In accordance with the embodiment where the joint assembly 300 is a constant velocity joint assembly, it is within the scope of this disclosure and as a non-limiting example that the joint assembly 300 may be a plunging constant velocity joint assembly, a plunging cross-groove constant velocity joint assembly, a plunging cross-groove hybrid constant velocity joint assembly, or a plunging double off-set constant velocity joint assembly.

The second joint member 304 of the joint assembly 300 may have an inner surface 308, an outer surface 310, a first end portion 312, and a second end portion 314. The inner surface 308 and the outer surface 310 of the second joint member 304 define a hollow portion 316 therein. Circumferentially extending along at least a portion of the inner surface 308 of the second joint member 304 is a plurality of second joint member grooves 318. The one or more second joint member grooves 318 in the second joint member 304 may be of a size and shape needed to receive and/or retain at least a portion of the one or more third joint members 306 therein. It is within the scope of this disclosure and as a non-limiting example that the second joint member 304 may be an outer race.

According to the embodiment illustrated in FIG. 4A of the disclosure and as a non-limiting example, one or more of the one or more second joint member grooves 318 may extend at an angle θ2. The angle θ2 of the one or more second joint member grooves 318 may extend relative to an axial centerline AC1 of the joint assembly 300.

Disposed within at least a portion of the hollow interior portion interior portion 316 of the second joint member 304 is the first joint member 302 of the joint assembly 300. As best seen in FIG. 3 of the disclosure and as a non-limiting example, the first joint member 302 may have an inner surface 320, an outer surface 322, a first end 324, a second end 326, a first end portion 328, a second end portion 330, and an intermediate portion 332, interposed between the first and second end portions 328 and 330. Circumferentially extending along at least a portion of the outer surface 322 of the first joint member 302 is a plurality of first joint member grooves 334. The plurality of first joint member grooves 334 in the first joint member 302 may be complementary to the plurality of second joint member grooves 318 in the second joint member 304. Additionally, the plurality of first joint member grooves 334 may be of a size and shape needed to receive and/or retain at least a portion of the one or more third joint members 306 therein. It is therefore to be understood that the one or more third joint members 306 may provide a driving connection between the first joint member 302 and the second joint member 304 of the joint assembly 300. As a non-limiting example, the first joint member 302 may be an inner race.

According to the embodiment illustrated in FIG. 4A of the disclosure and as a non-limiting example, one or more of the one or more first joint member grooves 334 may extend at an angle θ1. The angle θ1 of the one or more first joint member grooves 334 may extend relative to the axial centerline AC1 of the joint assembly 300. It is within the scope of this disclosure and as a non-limiting example that the one or more first joint member grooves 334 of the first joint member 302 may extend in an opposite direction from the one or more second joint member grooves 318 of the second joint member 304. By providing the joint assembly 300 with one or more first and second joint member grooves 334 and 318 that extend in opposite directions from each other, it aids in ensuring that the one or more third joint members 306 are retained in their ideal operating position at all times when the joint assembly 300 is in operation. As a non-limiting example, the angle θ2 of the one or more second joint member grooves 318 of the second joint member 304 may be substantially equal to the angle θ1 of the one or more first joint member grooves 334 of the first joint member 302.

A first shaft 336 may be drivingly connected to at least a portion of the first joint member 302 of the joint assembly 300. As best seen in FIG. 3 of the disclosure and as a non-limiting example, the first shaft 336 may have an outer surface 338, a first end portion 340, and a second end portion (not shown). It is within the scope of this disclosure and as a non-limiting example that the first shaft 336 may be a stub shaft, a pinion gear shaft, a transmission output shaft, a transfer case input shaft, a first transfer case output shaft, a second transfer case output shaft, a power transfer unit input shaft, a power transfer unit output shaft, a differential input shaft, a first differential output shaft, a second differential output shaft, a front differential input shaft, a first front axle differential output shaft, a second front axle differential output shaft, a first front axle half shaft, a second front axle half shaft, a rear differential input shaft, a first rear axle differential output shaft, a second rear axle differential output shaft, a first rear axle half shaft, a rear front axle half shaft, a forward tandem axle input shaft, an inter-axle differential input shaft, a first forward tandem axle differential output shaft, a second forward tandem axle differential output shaft, a first forward tandem axle half shaft, a second forward tandem axle half shaft, an inter-axle differential output shaft, a rear tandem axle differential input shaft, a first rear tandem axle differential output shaft, a second rear tandem axle differential output shaft, a first rear tandem axle half shaft, a second rear tandem axle half shaft, a drive shaft, a propeller shaft or a midship shaft.

In accordance with the embodiment illustrated in FIG. 3 of the disclosure and as a non-limiting example, a plurality of first shaft splines 342 may circumferentially extend along at least a portion of the first end portion 340 of the first shaft 336. At least a portion of the plurality of first shaft splines 342 may be complementary to and meshingly engaged with at least a portion of a plurality of first joint member splines 344 circumferentially extending along at least a portion of the inner surface 320 of the first joint member 302 of the joint assembly 300.

At least a portion of an end of a second shaft (not shown) may be drivingly connected to at least a portion of the second joint member 304 of the joint assembly 300. It is within the scope of this disclosure and as a non-limiting example that the second shaft (not shown) may be integrally connected to at least a portion of the second joint member 304 by using one or more welds, one or more adhesives, one or more mechanical fasteners, a spline connection and/or a threaded connection. As a non-limiting example, the second shaft (not shown) may be a stub shaft, a pinion gear shaft, a transmission output shaft, a transfer case input shaft, a first transfer case output shaft, a second transfer case output shaft, a power transfer unit input shaft, a power transfer unit output shaft, a differential input shaft, a first differential output shaft, a second differential output shaft, a front differential input shaft, a first front axle differential output shaft, a second front axle differential output shaft, a first front axle half shaft, a second front axle half shaft, a rear differential input shaft, a first rear axle differential output shaft, a second rear axle differential output shaft, a first rear axle half shaft, a rear front axle half shaft, a forward tandem axle input shaft, an inter-axle differential input shaft, a first forward tandem axle differential output shaft, a second forward tandem axle differential output shaft, a first forward tandem axle half shaft, a second forward tandem axle half shaft, an inter-axle differential output shaft, a rear tandem axle differential input shaft, a first rear tandem axle differential output shaft, a second rear tandem axle differential output shaft, a first rear tandem axle half shaft, a second rear tandem axle half shaft, a drive shaft, a propeller shaft or a midship shaft.

The joint assembly 300 may include a boot assembly 346. As best seen in FIG. 3 and as a non-limiting example, the boot assembly 346 may include a boot can 348 and/or a flexible boot 350. The boot assembly 346 may be used in order to seal a second end 347 of the second joint member 304. As a result, the boot assembly 346 may be used in order to aid in preventing an amount of dirt, debris, and/or moisture from entering into the joint assembly 300. Additionally, the boot assembly 346 may be used in order to aid in retaining an amount of lubricant (not shown) within the joint assembly 300. According to the embodiment where the boot assembly 346 includes the boot can 348, the boot can 348 may have a first end portion 352, a second end portion 354, and an intermediate portion 356 interposed between the first and second end portions 352 and 354. At least a portion of the first end portion 352 of the boot can 348 may be connected to and/or sealingly engaged with at least a portion of the second end portion 314 of the second joint member 304. Additionally, at least a portion of the second end portion 354 of the boot can 348 may be connected to and/or sealingly engaged with at least a portion of a first end portion 358 of the flexible boot 350 of the boot assembly 346. Furthermore, at least a portion of a second end portion 360 of the flexible boot 350 may be connected to and/or sealingly engaged with at least a portion of the outer surface 338 of the first shaft 336 of the joint assembly 300.

The boot can 348 may include one or more receiving portions 359. As best seen in FIG. 3 and as a non-limiting example, the one or more receiving portions 359 of the boot can 348 may be of a size and shape to receive and/or retain at least a portion of the one or more third joint members 306 therein. When the joint assembly 300 is in operation, articulated to a pre-determined angle, and/or plunged a pre-determined distance, at least a portion of one or more of the one or more third joint members 306 may be received and/or retained within at least a portion of one or more of the one or more receiving portions 359 of the boot can 348. This aids in preventing the one or more third joint members 306 from becoming drivingly disconnected from the first and/or second joint members 302 and/or 304 when the joint assembly 300 is in operation, articulated to a pre-determined angle, and/or plunged a pre-determined distance. As a result, the one or more receiving portions 359 of the boot can 348 aid in increasing the maximum articulation angle of the joint assembly 300 and aid in increasing the overall life, durability, and functionality of the joint assembly 300.

In accordance with the embodiment where the boot assembly 346 does not include the use of the boot can 348, at least a portion of the first end portion 358 of the flexible boot 350 may be connected to and/or sealingly connected to at least a portion of the second end portion 314 of the second joint member 304. According to this embodiment of the disclosure and as a non-limiting example, at least a portion of the second end portion 360 of the flexible boot 346 may be connected to and/or sealingly engaged with at least a portion of the outer surface 338 of the first shaft 336 of the joint assembly 300.

At least a portion of a cage member 362 may be interposed between the first joint member 302 and the second joint member 304 of the joint assembly 300. The cage member 362 may be used in order to ensure that the one or more third joint members 306 are retained in their ideal optimal operating position at all times while the joint assembly 300 is in operation. As best seen in FIG. 3 and as a non-limiting example, the cage member 362 may have an inner surface 364, an outer surface 366, a first end 368, a second end 370, a first end portion 372, a second end portion 374 and an intermediate portion 376 interposed between the first and second end portions 372 and 374. The inner surface 364 and the outer surface 366 of the cage member 362 may define a hollow portion 378 therein. The hollow portion 378 of the cage member 362 may be of a size and shape to receive and/or retain at least a portion of the first joint member 302 therein when the joint assembly 300 is in operation.

One or more cage windows 380 may extend from the inner surface 364 to the outer surface 366 of the cage member 362. The one or more cage windows 380 in the cage member 362 may be of a size and shape to receive and/or retain at least a portion of one or more of the one or more third joint members 306 therein. When the joint assembly 300 has been extended to a first position 382 illustrated in FIGS. 4 and 4A, at least a portion of the one or more third joint members 306 may be in direct contact with at least a portion of an end of the one or more cage windows 380 in the cage member 362. Additionally, when the joint assembly 300 has been extended to a second position 384 illustrated in FIGS. 5 and 5A, at least a portion of the one or more third joint members 306 may or may not be in direct contact with at least a portion of an opposite end of the one or more cage windows 380. In accordance with the embodiment where the one or more third joint members 306 are not in contact with the opposite end of the one or more cage windows 380, an outer surface of the one or more third joint members 306 may be disposed a linear distance LD2 from the opposite end of the one or more cage windows 380. This may aid in reducing the overall amount of forces and stress on the cage member 362 when the joint assembly 300 is in the second position 384 thereby aiding in increasing the overall life and durability of the cage member 362 and the joint assembly 300.

The one or more cage windows 380 in the cage member 362 may be disposed a linear distance LD1 from each other. As best seen in FIG. 4A and as a non-limiting example, the linear distance LD1 may be measured from an end of one of the one or more cage windows 380 to an adjacent end of another of the one or more cage windows 380 in the cage member 362. The linear distance LD1 between the one or more cage windows 380 in the cage member 362 may be a pre-determined length needed in order to ensure that the amount of material between the one or more cage windows 380 is enough to improve the overall life and durability of the cage member 362. Additionally, the linear distance LD1 may be a pre-determined length needed to provide the one or more third joint members 306 with an amount of movement needed within the one or more cage windows 380 to selectively translate the joint assembly 300 between the first position 382 and the second position 384.

As best seen in FIGS. 3 and 4 of the disclosure and as a non-limiting example, the inner surface 364 of the first end portion 372 of the cage member 362 may include one or more first engagement portions 385. The one or more first engagement portions 385 of the cage member 362 may be substantially cylindrical in shape providing the cage member 362 with a first substantially cylindrical portion 386. Additionally, the first substantially cylindrical portion 386 of the cage member 362 may define a first opening 387 within the cage member 362 of the joint assembly 300. The first substantially cylindrical portion 386 and/or the first opening 387 of the cage member 362 may have a diameter D1. It is within the scope of this disclosure and as a non-limiting example that the diameter D1 of the first substantially cylindrical portion 386 of the cage member 362 may be substantially equal to or less than an outer diameter OD1 of the first joint member 302 of the joint assembly 300.

The intermediate portion 376 of the inner surface 364 of the cage member 362 may include a substantially arcuate 388. As a non-limiting example, the substantially arcuate portion 388 of the cage member 362 may be defined by a radius R1 from a theoretical center TC1 of the cage member 362 along the axial centerline AC1 of the joint assembly 300.

Additionally, the intermediate portion 376 of the outer surface 366 of the cage member 362 may include a substantially arcuate portion 389. As a non-limiting example, the substantially arcuate portion 389 of the cage member 362 may be defined by a radius R2 from the theoretical center TC1 of the cage member 362 along the axial centerline AC1 of the joint assembly 300. It is within the scope of this disclosure and as a non-limiting example that the radius R2 may be larger than the radius R2 of the cage member 362.

According to the embodiment illustrated in FIG. 4 and as a non-limiting example, the second end portion 374 of the inner surface 364 of the cage member 362 may include one or more second engagement portions 389. The one or more second engagement portions 389 of the cage member 362 may be substantially cylindrical in shape and may provide the cage member 362 with a second substantially cylindrical portion 390. The second substantially cylindrical portion 390 of the cage member 362 may define a second opening 391 in the cage member 362. The second substantially cylindrical portion 390 and/or the second opening 550 of the cage member 362 may have a diameter D2. It is within the scope of this disclosure and as a non-limiting example that the diameter D2 of the second substantially cylindrical portion 390 and/or second opening 391 may be less than or substantially equal to the diameter D1 of the first substantially cylindrical portion 386 and/or first opening 387 of the cage member 362. Additionally, it is within the scope of this disclosure and as a non-limiting example that the diameter D2 of the second substantially cylindrical portion 386 and/or second opening 387 of the cage member 362 may be substantially equal to or less than the outer diameter OD1 of the first joint member 302.

As best seen in FIG. 3 and as a non-limiting example, the one or more first engagement portions 385, the first substantially cylindrical portion 386, and/or first opening 387 may be disposed a pre-determined linear distance LD3 from the one or more second engagement portions 389, the second substantially cylindrical portion 390, and/or second opening 391 of the cage member 363 of the joint assembly 300.

At least a portion of a first grease cover 392 may be connected to at least a portion of the first end portion 312 of the second joint member 302. The first grease cover 392 may be used in order to seal off a first end 394 of the second joint member 304 and retain an amount of lubricant (not shown) within the joint assembly 300. Additionally, the first grease cover 392 may be used in order to aid in preventing the migration of an amount of dirt, debris, and/or moisture into the joint assembly 300. It is within the scope of this disclosure and as a non-limiting example that the first grease cover 392 may be made of a metallic material, a composite material, a plastic material, a rubber material, and/or a polymeric material.

As best seen in FIG. 3 of the disclosure and as a non-limiting example, the first grease cover 392 may include one or more first receiving portions 396 therein. The one or more first receiving portions 396 of the first grease cover 392 may be of a size and shape to receive and/or retain at least a portion of the first shaft 336, the first joint member 302, the cage member 362, and/or the one or more third joint members 306 therein. In accordance with the embodiment illustrated in FIG. 4 and as a non-limiting example, when the joint assembly 300 is in the first position 382, at least a portion of the first shaft 336, the first joint member 302, the cage member 362, and/or the one or more third joint members 306 may be disposed within at least a portion of the one or more first receiving portions 396 in the first grease cover 392. As a result, the one or more first receiving portions 396 may of a pre-determined size and/or shape needed to allowing the joint assembly 300 to achieve a pre-determined first plunging distance PD1 needed to transition the joint assembly 300 to the first position 382 illustrated in FIGS. 4 and 4A. The first plunging distance PD1 may be measured from a theoretical center TC2 of the second joint member 304 to a theoretical center TC3 of the first joint member 302.

When the joint assembly 300 is in the first position 382 illustrated in FIGS. 4 and 4A, the first shaft 336 and the first joint member 302 may travel the first plunging distance PD1 and the cage member 362 and/or the one or more third joint members 306 may have traveled a third plunging distance PD3. The first plunging distance PD1 may be measured from the theoretical center TC3 of the first joint member 302 to the theoretical center TC2 of the second joint member 304. Additionally, the third plunging distance PD3 may be measured from the theoretical center TC2 of the second joint member 304 to the theoretical center TC1 of the cage member 362. It is within the scope of this disclosure and as a non-limiting example that the third plunging distance PD3 may be less than the first plunging distance PD1 of the joint assembly 300. As a non-limiting example, the third plunging distance PD3 may be approximately half of the first plunging distance PD1 of the joint assembly 300.

Figure 5:
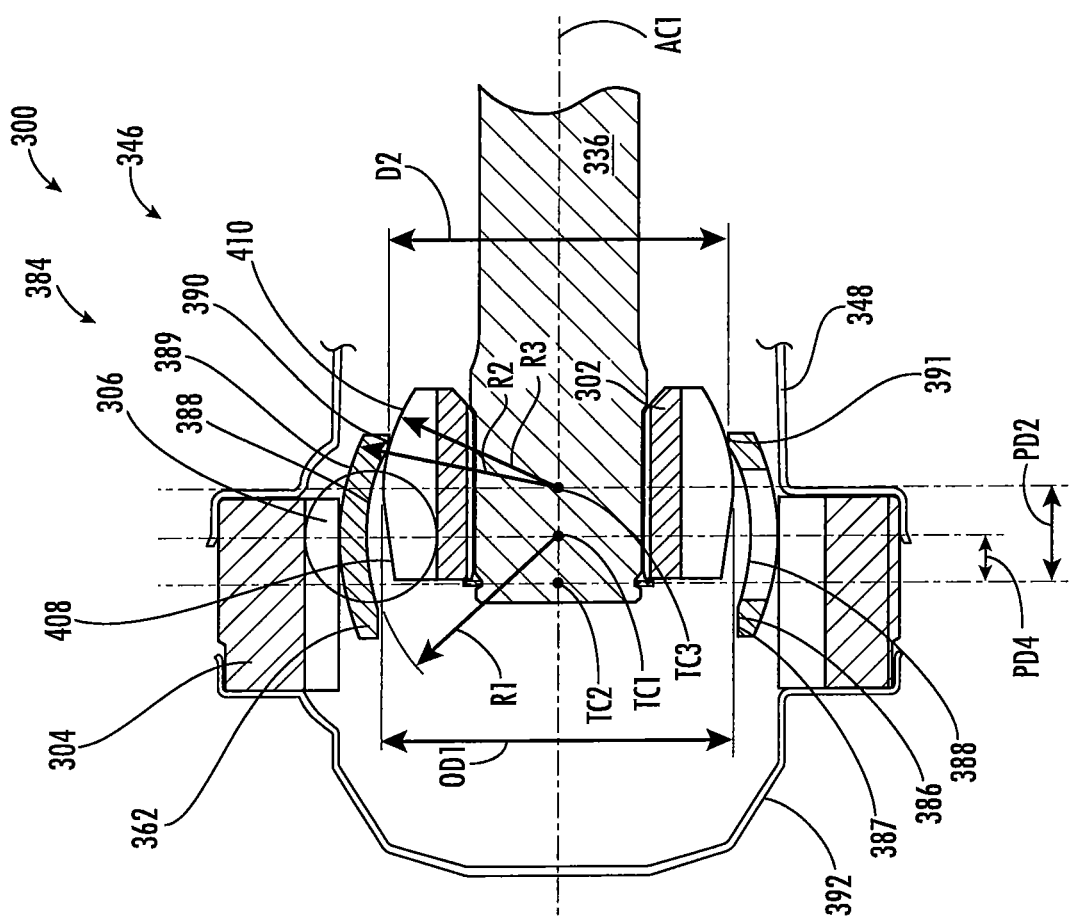
FIG. 5 is a cut away schematic side-view of the joint assembly illustrated in FIGS. 3-4A, when the joint assembly has been extended a second plunging distance.

When the joint assembly 300 is in the second position 384 illustrated in FIGS. 5 and 5A, the first shaft 336 and the first joint member 302 may travel a second plunging distance PD2 and the cage member 362 and/or the one or more third joint members 306 may have traveled a fourth plunging distance PD4. The second plunging distance PD2 may be measured from the theoretical center TC3 of the first joint member 302 to the theoretical center TC2 of the second joint member 304. Additionally, the fourth plunging distance PD4 may be measured from the theoretical center TC2 of the second joint member 304 to the theoretical center TC1 of the cage member 362. It is within the scope of this disclosure and as a non-limiting example that the second plunging distance PD2 may be less than the first plunging distance PD1 thereby providing the joint assembly 300 with a first maximum plunging distance PD1 in the first direction 382 that is different from a second maximum plunging distance PD2 in the second direction 384. Additionally, it is within the scope of this disclosure and as a non-limiting example that the fourth plunging distance PD4 may be less than the first plunging distance PD1, the second plunging distance PD2, and/or the third plunging distance PD3 of the joint assembly 300. As a non-limiting example, the fourth plunging distance PD4 may be approximately half of the second plunging distance PD2 of the joint assembly 300.

In accordance with the embodiment illustrated in FIG. 3 and as a non-limiting example, the one or more first receiving portions 396 of the first grease cap 392 may have a cross-sectional profile or shape defined by a substantially cylindrical portion 398, a first decreasing diameter portion 400, a third decreasing diameter portion 402, and/or a wall portion 404. The substantially cylindrical portion 398 of the one or more first receiving portions 396 of the first grease cover 392 may extend outward and away from the first end 394 of the second joint member 304. When the joint assembly 300 is in the first position 382 illustrated in FIG. 4 and as a non-limiting example, at least a portion of the first shaft 336, the first joint member 302, the one or more third joint members 306, and/or the cage member 362 may be disposed within the substantially cylindrical portion 398 of the one or more first receiving portions 396 of the first grease cover 392. It is within the scope of this disclosure and as a non-limiting example that the substantially cylindrical portion 398 of the one or more first receiving portions 396 of the first grease cover 392 may have a diameter that is substantially equal to or larger than an outermost diameter of the cage member 362.

The first decreasing diameter portion 400 of the first grease cover 392 may extend outward and away from the second joint member 304 from an end of the substantially cylindrical portion 389 opposite the second joint member 304. When the joint assembly 300 is in the first position 382 illustrated in FIGS. 4 and 4A and as a non-limiting example, at least a portion of the first shaft 336, the first joint member 302, and/or the cage member 362 may be disposed within the first decreasing diameter portion 400 of the one or more first receiving portions 396 of the first grease cover 392. It is within the scope of this disclosure and as a non-limiting example that the first decreasing diameter portion 400 of the one or more first receiving portions 396 of the first grease cover 392 may decrease as the first decreasing diameter portion 400 extends away from the second joint member 304.

The second decreasing diameter portion 402 of the first grease cover 392 may extend outward and away from the second joint member 304 from an end of the first decreasing diameter portion 400 opposite the substantially cylindrical portion 398 of the one or more first receiving portions 396 of the first grease cover 392. When the joint assembly 300 is in the first position 382 illustrated in FIGS. 4 and 4A and as a non-limiting example, at least a portion of the first shaft 336 and/or the first joint member 302 may be disposed within the second decreasing diameter portion 402 of the one or more first receiving portions 396 of the first grease cover 392. It is within the scope of this disclosure and as a non-limiting example that the second decreasing diameter portion 402 of the one or more first receiving portions 396 of the first grease cover 392 may decrease as the second decreasing diameter portion 402 extends away from the second joint member 304.

As best seen in FIGS. 3 and 4 of the disclosure and as a non-limiting example, the second decreasing diameter portion 402 may terminate in the wall portion 404 of the one or more first receiving portions 396 of the first grease cover 392. As a result, the wall portion 404 of the one or more receiving portions 396 of the first grease cover 392 may be disposed on an end of the second decreasing diameter portion 402 opposite the first decreasing diameter portion 400 of the one or more receiving portions 396 of the first grease cover 392.

In accordance with the embodiment illustrated in FIG. 3 of the disclosure and as a non-limiting example, the first grease cap 392 may include one or more second receiving portions 406 extending outward away from the second joint member 304. The one or more second receiving portions 406 of the first grease cap 392 may be of a size and shape to receive and/or retain at least a portion of the one or more third joint members 306 therein. When the joint assembly 300 is in operation, articulated to a pre-determined angle, and/or plunged a pre-determined distance, at least a portion of one or more of the one or more third joint members 306 may be received and/or retained within at least a portion of one or more of the One or more second receiving portions 406 of the first grease cap 392. This aids in preventing the one or more third joint members 306 from becoming drivingly disconnected from the first and/or second joint members 302 and/or 304 when the joint assembly 300 is in operation, articulated to a pre-determined angle, and/or plunged a pre-determined distance. As a result, the one or more second receiving portions 406 of the first grease cap 392 aid in increasing the maximum articulation angle of the joint assembly 300 and aid in increasing the overall life, durability, and functionality of the joint assembly 300.

According to the embodiment illustrated in FIG. 3 of the disclosure and as a non-limiting example, the first end portion 328 of the outer surface 322 of the first joint member 302 is one or more first engagement portions 408. The one or more first engagement portions 408 of the first joint member 302 may provide a first reaction surface between the first joint member 302 and the cage member 362 when the joint assembly 300 is in the first position 382 illustrated in FIGS. 4 and 4A of the disclosure. As a result, when the joint assembly 300 is in the first position 382, at least a portion of the one or more first engagement portions 408 of the first joint member 302 may be in direct contact with at least a portion of the first substantially cylindrical portion 386 and/or first opening 387 of the cage member 362. The interaction between the first joint member 302 and the cage member 362 provides a positive stop, which aids in preventing the joint assembly 300 from translating or plunging beyond the pre-determined first plunging distance PD1. This aids in preventing the first shaft 336 and/or the first joint member 302 from translating or plunging to a point where the one or more third joint members 306 no longer provide a driving connection between the first joint member 302 and the second joint member 304 of the joint assembly 300. It is within the scope of this disclosure and as a non-limiting example, that the one or more first engagement portions 408 may have a substantially conical shape, a substantially frusto-conical shape, a substantially linear cross-sectional profile or shape, a substantially arcuate cross-sectional profile or shape, and/or a substantially polygonal cross-sectional profile or shape.

In accordance with the embodiment illustrated in FIG. 4 and as a non-limiting example, the one or more first engagement portions 408 of the first joint member 302 may have a substantially conical shape, a substantially frusto-conical shape, or a substantially linear cross-sectional profile or shape extending from the first end 324 of the first joint member 302 toward the intermediate portion 332 of the first joint member 302. As best seen in FIG. 4 and as a non-limiting example, the one or more first engagement portions 408 of the first joint member 302 may extend outward from the first joint member 302 toward the second joint member 304 at an angle θ3 relative to the axial centerline AC1 of the joint assembly 300. As a result, an outer diameter OD1 of the first joint member 302 at the one or more first engagement portions 408 may increase at a substantially constant rate as the one or more first engagement portions 408 extends from the first end 324 of the first joint member 302 toward the intermediate portion 332 of the first joint member 302.

The second end portion 374 of the outer surface 366 of the first joint member 302 may include one or more second engagement portions 410. The one or more second engagement portions 410 of the first joint member 302 may provide a second reaction surface between the first joint member 302 and the cage member 362 when the joint assembly 300 is in the second position 384 illustrated in FIGS. 5 and 5A of the disclosure. As a result, when the joint assembly 300 is in the second position 384, at least a portion of the one or more second engagement portions 410 of the first joint member 302 may be in direct contact with at least a portion of the second substantially cylindrical portion 390 and/or second opening 391 of the cage member 362. The interaction between the first joint member 302 and the cage member 362 provides a positive stop which aids in preventing the joint assembly 300 from translating or plunging beyond the pre-determined second plunging distance PD2. This aids in preventing the first shaft 336 and/or the first joint member 302 from translating or plunging to a point where the one or more third joint members 306 no longer provide a driving connection between the first joint member 302 and the second joint member 304 of the joint assembly 300. It is within the scope of this disclosure and as a non-limiting example, that the one or more second engagement portions 410 may have a substantially conical shape, a substantially frusto-conical shape, a substantially linear cross-sectional profile or shape, a substantially arcuate cross-sectional profile or shape, and/or a substantially polygonal cross-sectional profile or shape.

In accordance with the embodiment illustrated in FIG. 5 and as a non-limiting example, the one or more second engagement portions 410 of the first joint member 302 may have a substantially arcuate cross-sectional profile or shape extending from the second end 326 of the first joint member 302 toward the intermediate portion 332 of the first joint member 302. As best seen in FIG. 5 and as a non-limiting example, the one or more second engagement portions 410 of the first joint member 302 may extend outward from the first joint member 302 toward the second joint member 304 and the cross-sectional profile or shape of the one or more second engagement portions 410 may be defined by a radius R3. The radius R3 defining the cross-sectional profile or shape of the one or more second engagement portions 410 may extend from the theoretical center TC3 of the first joint member 302. As a result, the outer diameter OD1 of the first joint member 302 at the one or more second engagement portions 410 may increase at a variable rate as the one or more second engagement portions 410 extends from the second end 326 of the first joint member 302 toward the intermediate portion 332 of the first joint member 302.

By altering the linear distance LD3, the one or more first engagement portions 385 of the cage member 362, the one or more second engagement portions 389 of the cage member 362, the diameter D1 of the first substantially cylindrical portion 386 and/or first opening 387 of the cage member 362, and/or the diameter D2 of the second substantially cylindrical portion 390 and/or second opening 391 of the cage member 362, the first and/or second plunging distances PD1 and/or PD2 may be selectively altered. Additionally, by altering the shape of the one or more first engagement portions 408, the location of the one or more first engagement portions 408, the outermost diameter of the one or more first engagement portions 408, the shape of the one or more second engagement portions 410, the location of the one or more second engagement portions 410, and/or the outermost diameter of the one or more second engagement portions 410 of the first joint member 302, the first and/or second plunging distances PD1 and/or PD2 may be selectively altered. As a result, one or more of the above-identified elements of the first joint member 302 and/or the cage member 362 may be selectively altered in order to achieve a pre-determined desired first plunging distance PD1 and/or a pre-determined desired second plunging distance PD2 for the joint assembly 300. This aids in providing a single joint assembly 300 that is more versatile, customizable and is able to be utilized in a wider array of applications.

According to the embodiment illustrated in FIGS. 4-5A and as a non-limiting example, the joint assembly 300 may have a first maximum plunging distance PD1 in the first direction 382 that is larger than a second maximum plunging distance PD2 in the second direction 384. In accordance with this embodiment of the disclosure and as a non-limiting example, the first direction 382 may be an installation direction and the second direction 382 may be a vehicle suspension movement direction. As a result, the joint assembly 300 illustrated in FIGS. 3-5A may be utilized in a vehicle (not shown) requiring a large shaft installation tolerance in a slide-in direction but has a smaller amount of overall vehicle suspension movement when in operation. It is within the scope of this disclosure and as a non-limiting example that the second plunging distance PD2 may be approximately half of the first plunging distance PD1 of the joint assembly 300.

In accordance with an embodiment of the disclosure and as a non-limiting example, the first and/or second plunging distance PD1 and/or PD2 may be a distance needed to allow the joint assembly 300 to absorb a pre-determined amount of energy and/or to allow the joint assembly 300 to plunge a first and/or second pre-determined plunging distance PD1 and/or PD2 when the vehicle (not shown) experiences a crash condition. It is within the scope of this disclosure and as a non-limiting example that the first and/or second pre-determined plunging distance PD1 and/or PD2 may be an amount of plunging distance required for the joint assembly 300 when the vehicle (not shown) experiences a crash condition. This allows the first shaft 336 and/or the first joint member 302 to travel a pre-determined distance during a crash condition without causing damage to one or more of the components of parts of the joint assembly 300.

By altering the linear distance LD3, the one or more first engagement portions 385 of the cage member 362, the one or more second engagement portions 389 of the cage member 362, the diameter D1 of the first substantially cylindrical portion 386 and/or first opening 387 of the cage member 362, and/or the diameter D2 of the second substantially cylindrical portion 390 and/or second opening 391 of the cage member 362, the first and/or second plunging distances PD1 and/or PD2 may be selectively altered allowing joint assembly 300 to achieve the desired plunging distances when the vehicle (not shown) experiences a crash condition. Additionally, by altering the shape of the one or more first engagement portions 408, the location of the one or more first engagement portions 408, the outermost diameter of the one or more first engagement portions 408, the shape of the one or more second engagement portions 410, the location of the one or more second engagement portions 410, and/or the outermost diameter of the one or more second engagement portions 410 of the first joint member 302, the first and/or second plunging distances PD1 and/or PD2 may be selectively altered allowing joint assembly 300 to achieve the desired plunging distances when the vehicle (not shown) experiences a crash condition. One or more of the above-identified elements of the first joint member 302 and/or the cage member 362 may be selectively altered in order to achieve a pre-determined desired first and/or second plunging distances PD1 and/or PD2 for the joint assembly 300. This aids in providing a single joint assembly 300 having customizable and improved overall safety and crash characteristics.

In accordance with an alternative embodiment of the disclosure and as a non-limiting example, the interaction between the first joint member 302 and the cage member 362 may be customized in order to allow the joint assembly 300 to absorb a pre-determined amount of energy when the vehicle (not shown) experiences a crash condition. When the vehicle (not shown) experiences a crash condition, the first shaft 336 and the first joint member 302 may translate the first and/or second plunging distance PD1 and/or PD2 until the one or more first or second engagement portions 408 or 410 of the first joint member 302 come into direct contact with the first substantially cylindrical portion 386, the first opening 387, the second substantially cylindrical portion 390 and/or the second opening 391 of the cage member 362. Once in contact, the first joint member 302 may drive the first substantially cylindrical portion 386 and/or first opening 387 of the cage member 362 or the second substantially cylindrical portion 390 and/or second opening 391 of the cage member 362 outward allowing the joint assembly 300 to collapse a pre-determined amount. Additionally, once the cage member 362 has been driven outward an amount needed to allow the first joint member 302 to translate beyond the cage member 362, the first shaft 336 and/or the first joint member 302 may be driven into direct contact with the first grease cover 392. As a result, it is therefore to be understood that the interaction between the first joint member 302, the cage member 362, and/or the first grease cover 392 allows the joint assembly 300 to absorb a pre-determined amount of energy when the vehicle (not shown) experiences a crash condition.

By altering the shape of the first grease cover 392, the material of the first grease cover 392, the linear distance LD3, the one or more first engagement portions 385 of the cage member 362, the one or more second engagement portions 389 of the cage member 362, the diameter D1 of the first substantially cylindrical portion 386 and/or first opening 387 of the cage member 362, and/or the diameter D2 of the second substantially cylindrical portion 390 and/or second opening 391 of the cage member 362, the amount of energy absorbed by the joint assembly 300 when the vehicle (not shown) experiences a crash condition may be selectively altered. Additionally, by altering the shape of the one or more first engagement portions 408, the location of the one or more first engagement portions 408, the contact point between the cage member 362 and the first joint member 302 along the one or more first engagement portions 408, the outermost diameter of the one or more first engagement portions 408, the shape of the one or more second engagement portions 410, the location of the one or more second engagement portions 410, the contact point between the cage member 362 and the first joint member 302 along the one or more second engagement portions 410, and/or the outermost diameter of the one or more second engagement portions 410 of the first joint member 302, the amount of energy absorbed by the joint assembly 300 when the vehicle (not shown) experiences a crash condition may be selectively altered. One or more of the above-identified elements of the first joint member 302, the cage member 362, and/or the first grease cover 392 may be selectively altered in order to allow the joint assembly 300 to absorb a pre-determined desired amount of force when the vehicle (not shown) experiences a crash condition. This aids in providing a single joint assembly 300 having customizable and improved overall safety and crash characteristics.

By providing the joint assembly 300 with a first joint member 302 and a cage member 362 as described and illustrated herein, the joint assembly 300 is more versatile and is able to be used in a wider array of applications by providing a different or customized first joint member 302, cage member 362, and/or first grease cover 392 needed to achieve the desired pre-determined first and/or second plunging distances PD1 and/or PD2. Additionally, by providing the joint assembly 300 with a first joint member 302 and a cage member 362 as described and illustrated herein, the joint assembly 300 is lighter, is customizable, has improved plunging distances, has an improved packaging size, has improved crash characteristics, has an improved overall amount of energy absorption, is more cost efficient and has an improved overall life and durability.

FIGS. 6-8A provide a schematic side-view of a joint assembly 500 according to an alternative embodiment of the disclosure. The joint assembly 500 illustrated in FIGS. 6-8A is the same as the joint assembly 300 illustrated in FIGS. 3-5A, except where specifically noted below. In accordance with the embodiment illustrated in FIGS. 6-8A of the disclosure and as a non-limiting example, the joint assembly 500 may include the first shaft 336, a first joint member 502, the second joint member 304, the one or more third joint members 306, a cage member 504, the first grease cover 392, and/or the boot assembly 346. It is within the scope of this disclosure and as a non-limiting example that the joint assembly 500 may be a homokinetic coupling assembly, a constant velocity joint assembly, a CV joint assembly, a universal joint assembly, a Cardan joint assembly, a Spicer joint assembly, a Hooke's joint assembly and/or a universal coupling assembly. In accordance with the embodiment where the joint assembly 500 is a constant velocity joint assembly, it is within the scope of this disclosure and as a non-limiting example that the joint assembly 500 may be a plunging constant velocity joint assembly, a plunging cross-groove constant velocity joint assembly, a plunging cross-groove hybrid constant velocity joint assembly, or a plunging double off-set constant velocity joint assembly.

Figure 6:
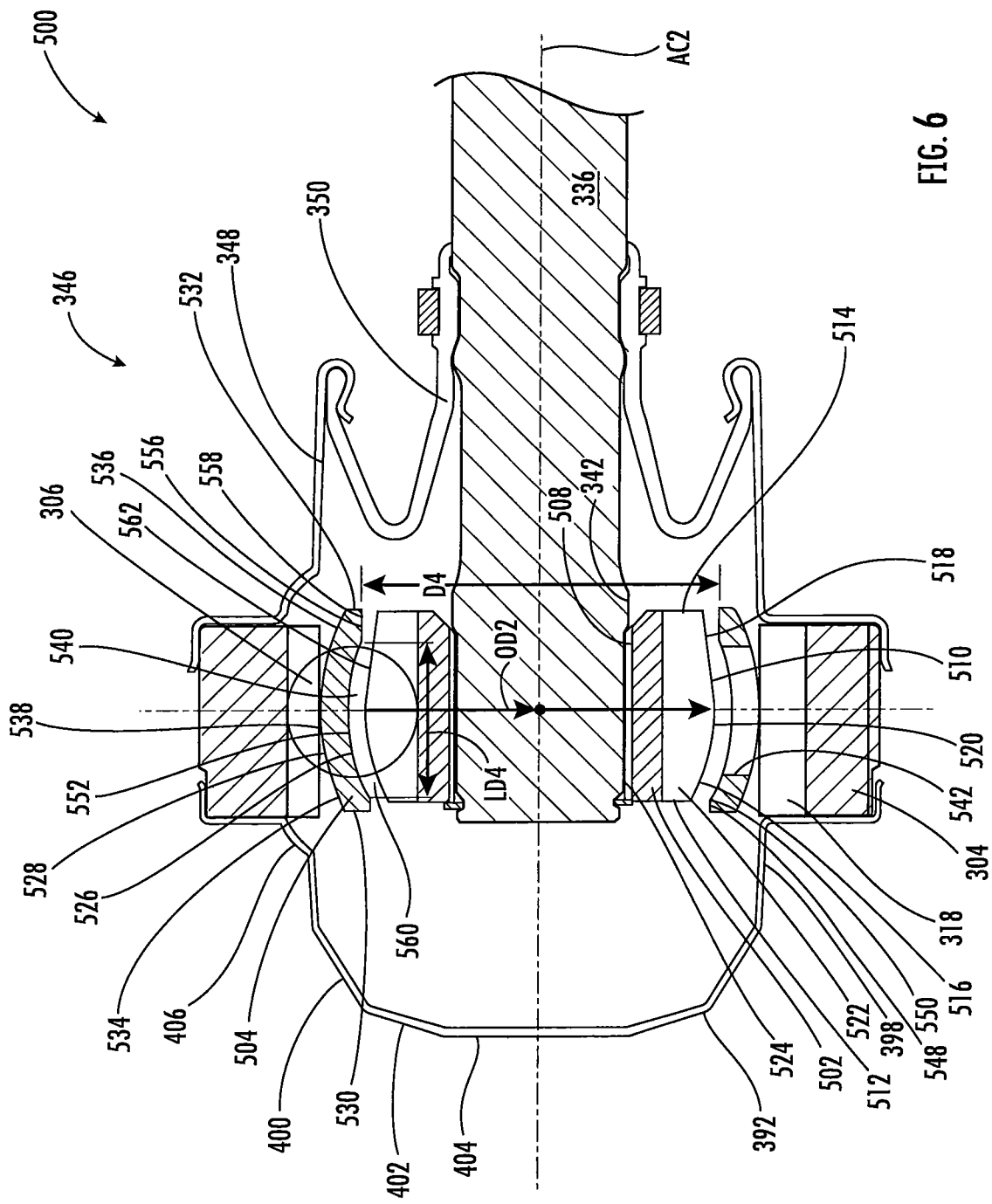
FIG. 6 is a cut away schematic side-view of the joint assembly illustrated in FIGS. 3-5A according to an alternative embodiment of the disclosure.

As best seen in FIG. 6 and as a non-limiting example, the first joint member 502 may have an inner surface 508, an outer surface 510, a first end 512, a second end 514, a first end portion 516, a second end portion 518, and an intermediate portion 520 interposed between the first and second end portions 516 and 518. Circumferentially extending along at least a portion of the outer surface 510 of the first joint member 502 is a plurality of first joint member grooves 522. The plurality of first joint member grooves 522 in the first joint member 502 may be complementary to the plurality of second joint member grooves 318 in the second joint member 304. Additionally, the plurality of first joint member grooves 522 may be of a size and shape needed to receive and/or retain at least a portion of the one or more third joint members 306 therein. It is therefore to be understood that the one or more third joint members 306 may provide a driving connection between the first joint member 502 and the second joint member 304 of the joint assembly 300. As a non-limiting example, the first joint member 502 may be an inner race.

In accordance with the embodiment illustrated in FIG. 7A of the disclosure and as a non-limiting example, one or more of the one or more first joint member grooves 522 may extend at an angle θ5. The angle θ5 of the one or more first joint member grooves 522 may extend relative to the axial centerline AC2 of the joint assembly 500. It is within the scope of this disclosure and as a non-limiting example that the one or more first joint member grooves 522 of the first joint member 502 may extend in an opposite direction from the one or more second joint member grooves 318 of the second joint member 304 of the joint assembly 500. By providing the joint assembly 500 with one or more first and second joint member grooves 522 and 318 that extend in opposite directions from each other, it aids in ensuring that the one or more third joint members 306 are retained in their ideal operating position at all times when the joint assembly 500 is in operation. As a non-limiting example, the angle θ2 of the one or more second joint member grooves 318 of the second joint member 304 may be substantially equal to the angle θ5 of the one or more first joint member grooves 522 of the first joint member 502.

A plurality of first joint member splines 524 may circumferentially extend along at least a portion of the inner surface 508 of the first joint member 502. The plurality of first joint member splines 524 may be complementary to and meshingly engaged with at least a portion of the plurality of first shaft splines 342 on the outer surface 338 of the first shaft 336. As a result, of the meshing engagement between the plurality of first joint member splines 524 and the plurality of first shaft splines 342, the first shaft 336 is drivingly connected to the first joint member 502 allowing an amount of rotational power to be transferred therebetween.

At least a portion of the cage member 504 may be interposed between the first joint member 502 and the second joint member 304 of the joint assembly 500. The cage member 504 may be used in order to ensure that the one or more third joint members 306 are retained in their ideal optimal operating position at all times while the joint assembly 500 is in operation. As best seen in FIG. 6 and as a non-limiting example, the cage member 504 may have an inner surface 526, an outer surface 528, a first end 530, a second end 532, a first end portion 534, a second end portion 536, and an intermediate portion 538 interposed between the first and second end portions 534 and 536. The inner surface 526 and the outer surface 528 of the cage member 504 may define a hollow portion 540 therein. The hollow portion 540 of the cage member 504 may be of a size and shape to receive and/or retain at least a portion of the first joint member 302 therein when the joint assembly 500 is in operation.

One or more cage windows 542 may extend from the inner surface 526 to the outer surface 528 of the cage member 504. The one or more cage windows 542 in the cage member 504 may be of a size and shape to receive and/or retain at least a portion of one or more of the one or more third joint members 306 therein. When the joint assembly 500 has been extended to a first position 544 illustrated in FIG. 7A, at least a portion of the one or more third joint members 306 may or may not be in direct contact with at least a portion of an end of the one or more cage windows 542 in the cage member 504. In accordance with the embodiment where the one or more third joint members 306 are not in contact with the end of the one or more cage windows 542, an outer surface of the one or more third joint members 306 may be disposed a linear distance LD5 from the end of the one or more cage windows 542. This may aid in reducing the overall amount of forces and stress on the cage member 504 when the joint assembly 500 is in the first position 544 thereby aiding in increasing the overall life and durability of the cage member 504 and the joint assembly 500. When the joint assembly 500 has been extended to a second position 546 illustrated in FIG. 8A, at least a portion of the one or more third joint members 306 may be in direct contact with at least a portion of an opposite end of the one or more cage windows 542 in the cage member 504.

The one or more cage windows 542 in the cage member 504 may be disposed a linear distance LD6 from each other. As a non-limiting example, the linear distance LD6 may be measured from an end of one of the one or more cage windows 542 to an adjacent end of another of the one or more cage windows 542 in the cage member 504. The linear distance LD6 between the one or more cage windows 542 in the cage member 504 may be a pre-determined length needed in order to ensure that the amount of material between the one or more cage windows 542 is enough to improve the overall life and durability of the cage member 504. Additionally, the linear distance LD6 may be a pre-determined length needed to provide the one or more third joint members 306 with an amount of movement needed within the one or more cage windows 542 to selectively translate the joint assembly 500 between the first position 544 and the second position 546.

As best seen in FIGS. 6-8A of the disclosure and as a non-limiting example, the inner surface 526 of the first end portion 534 of the cage member 504 may include one or more first engagement portions 547. The one or more first engagement portions 547 of the cage member 504 may be substantially cylindrical in shape providing the cage member 362 with a first substantially cylindrical portion 548. The first substantially cylindrical portion 548 of the cage member 504 may define a first opening 550 in the cage member 504. The first substantially cylindrical portion 548 and/or the first opening 550 of the cage member 504 may have a diameter D3. It is within the scope of this disclosure and as a non-limiting example that the diameter D3 of the first substantially cylindrical portion 548 and/or first opening 550 of the cage member 504 may be substantially equal to or less than an outer diameter OD2 of the first joint member 502 of the joint assembly 500.

The intermediate portion 538 of the inner surface 526 of the cage member 504 may include a substantially arcuate 552. As a non-limiting example, the substantially arcuate portion 552 of the cage member 504 may be defined by a radius R4 from a theoretical center TC4 of the cage member 504 along an axial centerline AC2 of the joint assembly 500.

Additionally, the intermediate portion 538 of the outer surface 528 of the cage member 504 may include a substantially arcuate portion 554. As a non-limiting example, the substantially arcuate portion 554 of the cage member 504 may be defined by a radius R5 from the theoretical center TC4 of the cage member 504 along the axial centerline AC2 of the joint assembly 500. It is within the scope of this disclosure and as a non-limiting example that the radius R5 may be larger than the radius R4 of the cage member 504.

According to the embodiment illustrated in FIG. 6 and as a non-limiting example, the second end portion 536 of the inner surface 526 of the cage member 504 may include one or more second engagement portions 555. The one or more first engagement portions 555 of the cage member 504 may be substantially cylindrical in shape providing the cage member 504 with a second substantially cylindrical portion 556. The second substantially cylindrical portion 556 of the cage member 504 may define a second opening 558 in the cage member 504. The second substantially cylindrical portion 556 and/or the second opening 558 of the cage member 504 may have a diameter D4. It is within the scope of this disclosure and as a non-limiting example that the diameter D4 of the second substantially cylindrical portion 556 and/or second opening 558 may be greater than or substantially equal to the diameter D3 of the first substantially cylindrical portion 548 and/or first opening 550 of the cage member 504. Additionally, it is within the scope of this disclosure and as a non-limiting example that the diameter D4 of the second substantially cylindrical portion 556 and/or second opening 558 of the cage member 504 may be substantially equal to or less than the outer diameter OD2 of the first joint member 502.

As best seen in FIG. 6 and as a non-limiting example, the one or more first engagement portions 547, the first substantially cylindrical portion 548 and/or first opening 550 may be disposed a pre-determined linear distance LD4 from the one or more second engagement portions 555, the second substantially cylindrical portion 556 and/or second opening 558 of the cage member 504 of the joint assembly 500.

At least a portion of the first grease cover 392 may be connected to at least a portion of the first end portion 312 of the second joint member 302 of the joint assembly 500. The first grease cover 392 may be used in order to seal off a first end 394 of the second joint member 304 and retain an amount of lubricant (not shown) within the joint assembly 500. Additionally, the first grease cover 392 may be used in order to aid in preventing the migration of an amount of dirt, debris, and/or moisture into the joint assembly 500.

When the joint assembly 500 is in the first position 544 illustrated in FIGS. 7 and 7A, the first shaft 336 and the first joint member 502 may travel a first plunging distance PD5 and the cage member 504 and/or the one or more third joint members 306 may have traveled a third plunging distance PD7. The first plunging distance PD5 may be measured from the theoretical center TC5 of the first joint member 502 to the theoretical center TC2 of the second joint member 304 of the joint assembly 500. Additionally, the third plunging distance PD7 may be measured from the theoretical center TC2 of the second joint member 304 to the theoretical center TC4 of the cage member 504. It is within the scope of this disclosure and as a non-limiting example that the third plunging distance PD7 may be less than the first plunging distance PD5 of the joint assembly 500. As a non-limiting example, the third plunging distance PD7 may be approximately half of the first plunging distance PD5 of the joint assembly 500.

Figure 9:
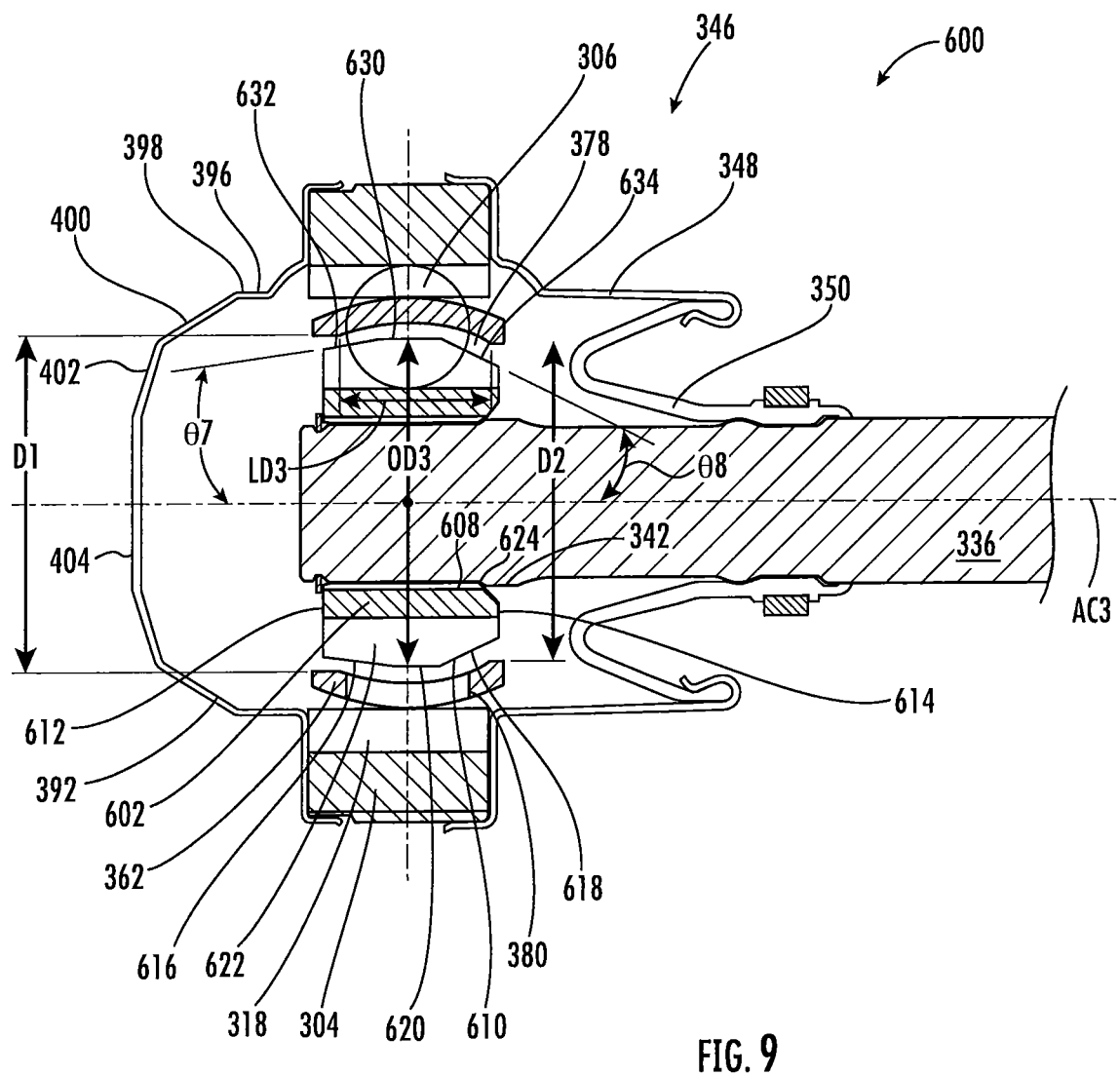
FIG. 9 is a cut away schematic side-view of the joint assembly illustrated in FIGS. 3-8A according to another embodiment of the disclosure.

When the joint assembly 500 is in the second position 546 illustrated in FIGS. 9 and 9A, the first shaft 336 and the first joint member 502 may travel a second plunging distance PD6 and the cage member 504 and/or the one or more third joint members 306 may have traveled a fourth plunging distance PD8. The second plunging distance PD6 may be measured from the theoretical center TC5 of the first joint member 502 to the theoretical center TC2 of the second joint member 304. Additionally, the fourth plunging distance PD8 may be measured from the theoretical center TC2 of the second joint member 304 to the theoretical center TC4 of the cage member 504 of the joint assembly 500. It is within the scope of this disclosure and as a non-limiting example that the second plunging distance PD6 may be greater than the first plunging distance PD5 thereby providing the joint assembly 500 with a first maximum plunging distance PD5 in the first direction 544 that is different from a second maximum plunging distance PD6 in the second direction 546. Additionally, it is within the scope of this disclosure and as a non-limiting example that the third plunging distance PD7 may be less than the first plunging distance PD5, the second plunging distance PD6, and/or the fourth plunging distance PD8 of the joint assembly 500. As a non-limiting example, the fourth plunging distance PD8 may be approximately half of the second plunging distance PD6 of the joint assembly 500.

As best seen in FIG. 7 and as a non-limiting example, when the joint assembly 500 is in the first position 544, at least a portion of the first shaft 336, the first joint member 502, the one or more third joint members 306, and/or the cage member 504 may be disposed within the substantially cylindrical portion 398 of the one or more first receiving portions 396 of the first grease cover 392. Additionally, as best seen in FIG. 7 and as a non-limiting example, when the joint assembly 500 is in the first position 544, at least a portion of the first shaft 336 and/or the first joint member 502 may or may not be disposed within the second decreasing diameter portion 402 of the one or more first receiving portions 396 of the first grease cover 392.

In accordance with the embodiment where the first shaft 336 and/or the first joint member 502 are not disposed within the second decreasing diameter portion 402 of the first grease cover 392 when the joint assembly 500 is in the first position 544, the first grease cover 392 may not include the second decreasing diameter portion 402. As a result, it is within the scope of this disclosure and as a non-limiting example that the wall portion 404 of the first grease cover 392 may be disposed at an end of the first decreasing diameter portion 400 opposite the second joint member 304 of the joint assembly 500. This aids in providing a first grease cover 392 that is more compact, easier the manufacturer, more cost efficient, and lighter which in turn aids in providing a joint assembly 500 that is more compact, easier the manufacturer, more cost efficient, and lighter.

According to the embodiment illustrated in FIGS. 6-8A of the disclosure and as a non-limiting example, the first end portion 516 of the outer surface 510 of the first joint member 502 may have one or more first engagement portions 560. The one or more first engagement portions 560 of the first joint member 502 may provide a first reaction surface between the first joint member 502 and the cage member 504 when the joint assembly 500 is in the first position 544 illustrated in FIG. 7 of the disclosure. As a result, when the joint assembly 500 is in the first position 544, at least a portion of the one or more first engagement portions 560 of the first joint member 502 may be in direct contact with at least a portion of the first substantially cylindrical portion 548 and/or first opening 550 of the cage member 504. The interaction between the first joint member 502 and the cage member 504 provides a positive stop, which aids in preventing the joint assembly 500 from translating or plunging beyond the pre-determined first plunging distance PD5. This aids in preventing the first shaft 336 and/or the first joint member 502 from translating or plunging to a point where the one or more third joint members 306 no longer provide a driving connection between the first joint member 502 and the second joint member 304 of the joint assembly 500. It is within the scope of this disclosure and as a non-limiting example, that the one or more first engagement portions 506 may have a substantially conical shape, a substantially frusto-conical shape, a substantially linear cross-sectional profile or shape, a substantially arcuate cross-sectional profile or shape, and/or a substantially polygonal cross-sectional profile or shape.

In accordance with the embodiment illustrated in FIGS. 6-8A and as a non-limiting example, the one or more first engagement portions 560 of the first joint member 502 may have a substantially arcuate cross-sectional profile or shape extending from the first end 512 of the first joint member 502 toward the intermediate portion 520 of the first joint member 502. As best seen in FIG. 7 and as a non-limiting example, the one or more first engagement portions 560 of the first joint member 502 may extend outward from the first joint member 502 toward the second joint member 304 and the cross-sectional profile or shape of the one or more first engagement portions 560 may be defined by a radius R6. The radius R6 defining the cross-sectional profile or shape of the one or more first engagement portions 560 may extend from the theoretical center TC5 of the first joint member 502. As a result, the outer diameter OD2 of the first joint member 502 at the one or more first engagement portions 560 may increase at a variable rate as the one or more first engagement portions 560 extends from the first end 512 of the first joint member 502 toward the intermediate portion 520 of the first joint member 502.

The second end portion 518 of the outer surface 510 of the first joint member 502 may include one or more second engagement portions 562. The one or more second engagement portions 562 of the first joint member 502 may provide a second reaction surface between the first joint member 502 and the cage member 504 when the joint assembly 500 is in the second position 546 illustrated in FIG. 8 of the disclosure. As a result, when the joint assembly 500 is in the second position 546, at least a portion of the one or more second engagement portions 562 of the first joint member 502 may be in direct contact with at least a portion of the second substantially cylindrical portion 556 and/or second opening 558 of the cage member 504. The interaction between the first joint member 502 and the cage member 504 provides a positive stop, which aids in preventing the joint assembly 500 from translating or plunging beyond the pre-determined second plunging distance PD6. This aids in preventing the first shaft 336 and/or the first joint member 502 from translating or plunging to a point where the one or more third joint members 306 no longer provide a driving connection between the first joint member 502 and the second joint member 304 of the joint assembly 500. It is within the scope of this disclosure and as a non-limiting example, that the one or more second engagement portions 562 may have a substantially conical shape, a substantially frusto-conical shape, a substantially linear cross-sectional profile or shape, a substantially arcuate cross-sectional profile or shape, and/or a substantially polygonal cross-sectional profile or shape.

Figure 8A:
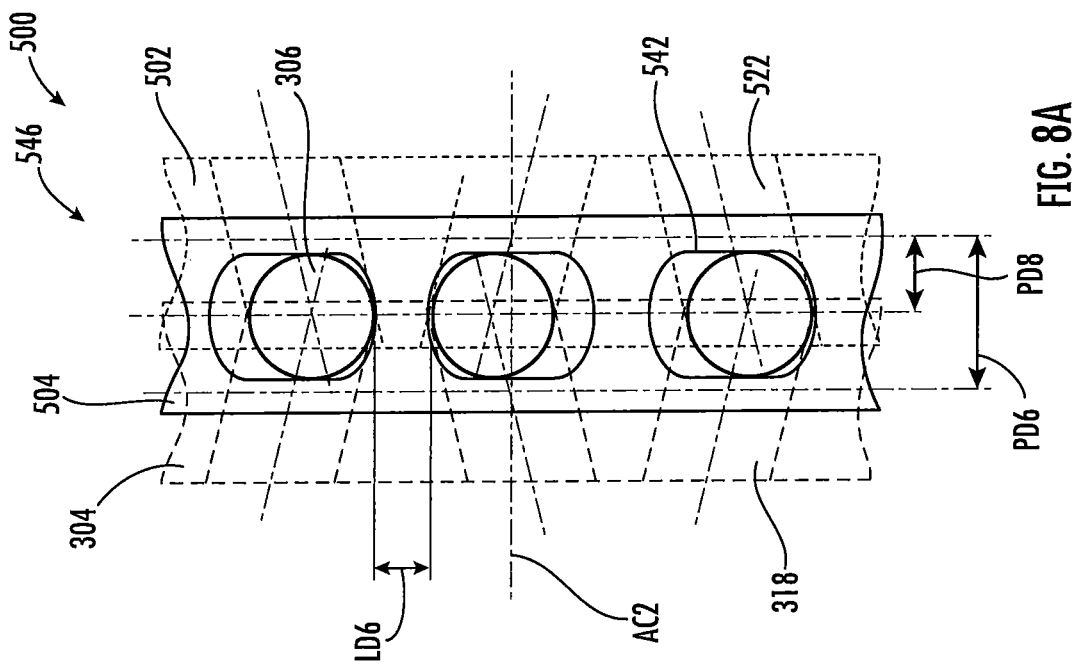
FIG. 8A is a cut-away schematic side-view of a portion of the joint assembly illustrated in FIGS. 6-8 when the joint assembly has been extended the second plunging distance.
Figure 8:
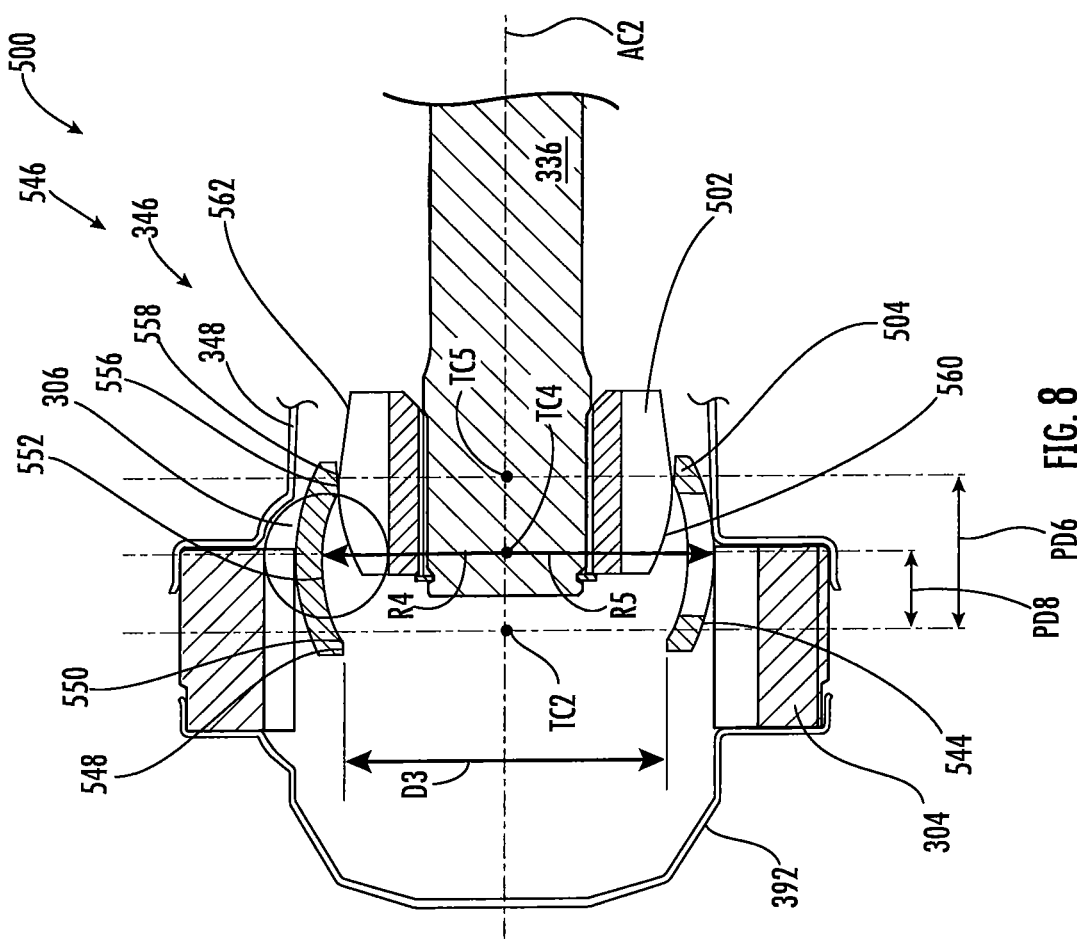
FIG. 8 is a cut away schematic side-view of the joint assembly illustrated in FIGS. 6-7A when the joint assembly has been extended a second plunging distance.

In accordance with the embodiment illustrated in FIGS. 6-8A and as a non-limiting example, the one or more second engagement portions 562 of the first joint member 502 may have a substantially conical shape, a substantially frusto-conical shape, or a substantially linear cross-sectional profile or shape extending from the second end 514 of the first joint member 502 toward the intermediate portion 520 of the first joint member 502. As best seen in FIG. 8 and as a non-limiting example, the one or more second engagement portions 562 of the first joint member 502 may extend outward from the first joint member 502 toward the second joint member 304 at an angle θ4 relative to the axial centerline AC2 of the joint assembly 500. As a result, the outer diameter OD2 of the first joint member 502 at the one or more second engagement portions 562 may increase at a substantially constant rate as the one or more second engagement portions 562 extends from the second end 514 of the first joint member 502 toward the intermediate portion 520 of the first joint member 502.

By altering the linear distance LD4, the one or more first engagement portions 547 of the cage member 504, the one or more second engagement portions 555 of the cage member 504, the diameter D3 of the first substantially cylindrical portion 548 and/or first opening 550 of the cage member 504, and/or the diameter D4 of the second substantially cylindrical portion 556 and/or second opening 558 of the cage member 504, the first and/or second plunging distances PD5 and/or PD6 may be selectively altered. Additionally, by altering the shape of the one or more first engagement portions 560, the location of the one or more first engagement portions 560, the outermost diameter of the one or more first engagement portions 560, the shape of the one or more second engagement portions 562, the location of the one or more second engagement portions 562, and/or the outermost diameter of the one or more second engagement portions 562 of the first joint member 502, the first and/or second plunging distances PD5 and/or PD6 may be selectively altered. As a result, one or more of the above-identified elements of the first joint member 502 and/or the cage member 504 may be selectively altered in order to achieve a pre-determined desired first plunging distance PD5 and/or a pre-determined desired second plunging distance PD6 for the joint assembly 500. This aids in providing a single joint assembly 500 that is more versatile, customizable and is able to be utilized in a wider array of applications.

According to the embodiment illustrated in FIGS. 7-8A and as a non-limiting example, the joint assembly 500 may have a first maximum plunging distance PD5 in the first direction 544 that is less than a second maximum plunging distance PD6 in the second direction 546. In accordance with this embodiment of the disclosure and as a non-limiting example, the first direction 544 may be an installation direction and the second direction 546 may be a vehicle suspension movement direction. As a result, the joint assembly 500 illustrated in FIGS. 7-8A may be utilized in a vehicle (not shown) requiring a large shaft installation tolerance in a slide-out direction but has a smaller amount of overall vehicle suspension movement when in operation. It is within the scope of this disclosure and as a non-limiting example that the second plunging distance PD6 may be approximately half of the first plunging distance PD5 of the joint assembly 500.

In accordance with an embodiment of the disclosure and as a non-limiting example, the first and/or second plunging distance PD5 and/or PD6 may be a distance needed to allow the joint assembly 500 to absorb a pre-determined amount of energy and/or to allow the joint assembly 500 to plunge a first and/or second pre-determined plunging distance PD5 and/or PD6 when the vehicle (not shown) experiences a crash condition. It is within the scope of this disclosure and as a non-limiting example that the first and/or second pre-determined plunging distance PD5 and/or PD6 may be an amount of plunging distance required for the joint assembly 500 when the vehicle (not shown) experiences a crash condition. This allows the first shaft 336 and/or the first joint member 502 to travel a pre-determined distance during a crash condition without causing damage to one or more of the components of parts of the joint assembly 500.

By altering the linear distance LD4, the one or more first engagement portions 547 of the cage member 504, the one or more second engagement portions 555 of the cage member 504, the diameter D3 of the first substantially cylindrical portion 548 and/or first opening 550 of the cage member 504, and/or the diameter D4 of the second substantially cylindrical portion 556 and/or second opening 558 of the cage member 504, the first and/or second plunging distances PD5 and/or PD6 may be selectively altered allowing joint assembly 500 to achieve the desired plunging distances when the vehicle (not shown) experiences a crash condition. Additionally, by altering the shape of the one or more first engagement portions 560, the location of the one or more first engagement portions 560, the outermost diameter of the one or more first engagement portions 560, the shape of the one or more second engagement portions 562, the location of the one or more second engagement portions 562, and/or the outermost diameter of the one or more second engagement portions 562 of the first joint member 502, the first and/or second plunging distances PD5 and/or PD6 may be selectively altered allowing joint assembly 500 to achieve the desired plunging distances when the vehicle (not shown) experiences a crash condition. One or more of the above-identified elements of the first joint member 502 and/or the cage member 504 may be selectively altered in order to achieve a pre-determined desired first and/or second plunging distances PD5 and/or PD6 for the joint assembly 500. This aids in providing a single joint assembly 500 having customizable and improved overall safety and crash characteristics.

In accordance with an alternative embodiment of the disclosure and as a non-limiting example, the interaction between the first joint member 502 and the cage member 504 may be customized in order to allow the joint assembly 500 to absorb a pre-determined amount of energy when the vehicle (not shown) experiences a crash condition. When the vehicle (not shown) experiences a crash condition, the first shaft 336 and the first joint member 502 may translate the first and/or second plunging distance PD5 and/or PD6 until the one or more first or second engagement portions 560 or 562 of the first joint member 502 come into direct contact with the first substantially cylindrical portion 548, the first opening 550, the second substantially cylindrical portion 556, or the second opening 558 of the cage member 504. Once in contact, the first joint member 502 may drive the first substantially cylindrical portion 548 and/or first opening 550 of the cage member 504 or the second substantially cylindrical portion 556 and/or second opening 558 of the cage member 504 outward allowing the joint assembly 500 to collapse a pre-determined amount. Additionally, once the cage member 504 has been driven outward an amount needed to allow the first joint member 502 to translate beyond the cage member 504, the first shaft 336 and/or the first joint member 502 may be driven into direct contact with the first grease cover 392. As a result, it is therefore to be understood that the interaction between the first joint member 502, the cage member 504, and/or the first grease cover 392 allows the joint assembly 500 to absorb a pre-determined amount of energy when the vehicle (not shown) experiences a crash condition.

By altering the shape of the first grease cover 392, the material of the first grease cover 392, the linear distance LD4, the one or more first engagement portions 547 of the cage member 504, the one or more second engagement portions 555 of the cage member 504, the diameter D3 of the first substantially cylindrical portion 548 and/or first opening 550 of the cage member 504, and/or the diameter D4 of the second substantially cylindrical portion 556 and/or second opening 558 of the cage member 504, the amount of energy absorbed by the joint assembly 500 when the vehicle (not shown) experiences a crash condition may be selectively altered. Additionally, by altering the shape of the one or more first engagement portions 560, the location of the one or more first engagement portions 560, the contact point between the cage member 504 and the first joint member 502 along the one or more first engagement portions 560, the outermost diameter of the one or more first engagement portions 560, the shape of the one or more second engagement portions 562, the location of the one or more second engagement portions 562, the contact point between the cage member 504 and the first joint member 502 along the one or more second engagement portions 562, and/or the outermost diameter of the one or more second engagement portions 562 of the first joint member 502, the amount of energy absorbed by the joint assembly 500 when the vehicle (not shown) experiences a crash condition may be selectively altered. One or more of the above-identified elements of the first joint member 502, the cage member 504, and/or the first grease cover 392 may be selectively altered in order to allow the joint assembly 500 to absorb a pre-determined desired amount of force when the vehicle (not shown) experiences a crash condition. This aids in providing a single joint assembly 500 having customizable and improved overall safety and crash characteristics.

By providing the joint assembly 500 with a first joint member 502 and a cage member 504 as described and illustrated herein, the joint assembly 500 is more versatile and is able to be used in a wider array of applications by providing a different or customized first joint member 502, cage member 504, and/or first grease cover 392 needed to achieve the desired pre-determined first and/or second plunging distances PD5 and/or PD6. Additionally, by providing the joint assembly 500 with a first joint member 502 and a cage member 504 as described and illustrated herein, the joint assembly 500 is lighter, is customizable, has improved plunging distances, has an improved packaging size, has improved crash characteristics, has an improved overall amount of energy absorption, is more cost efficient and has an improved overall life and durability.

FIGS. 9-11A provide a schematic side-view of a joint assembly 600 according to an alternative embodiment of the disclosure. The joint assembly 600 illustrated in FIGS. 9-11A is the same as the joint assemblies 300 and 500 illustrated in FIGS. 3-8A, except where specifically noted below. In accordance with the embodiment illustrated in FIGS. 9-11A of the disclosure and as a non-limiting example, the joint assembly 600 may include the first shaft 336, a first joint member 602, the second joint member 304, the one or more third joint members 306, the cage member 362, the first grease cover 392, and/or the boot assembly 346. It is within the scope of this disclosure and as a non-limiting example that the joint assembly 600 may be a homokinetic coupling assembly, a constant velocity joint assembly, a CV joint assembly, a universal joint assembly, a Cardan joint assembly, a Spicer joint assembly, a Hooke's joint assembly and/or a universal coupling assembly. In accordance with the embodiment where the joint assembly 600 is a constant velocity joint assembly, it is within the scope of this disclosure and as a non-limiting example that the joint assembly 600 may be a plunging constant velocity joint assembly, a plunging cross-groove constant velocity joint assembly, a plunging cross-groove hybrid constant velocity joint assembly, or a plunging double off-set constant velocity joint assembly.

As best seen in FIG. 9 and as a non-limiting example, the first joint member 602 may have an inner surface 608, an outer surface 610, a first end 612, a second end 614, a first end portion 616, a second end portion 618, and an intermediate portion 620 interposed between the first and second end portions 616 and 618. Circumferentially extending along at least a portion of the outer surface 610 of the first joint member 602 is a plurality of first joint member grooves 622. The plurality of first joint member grooves 622 in the first joint member 602 may be complementary to the plurality of second joint member grooves 318 in the second joint member 304. Additionally, the plurality of first joint member grooves 622 may be of a size and shape needed to receive and/or retain at least a portion of the one or more third joint members 306 therein. It is therefore to be understood that the one or more third joint members 306 may provide a driving connection between the first joint member 602 and the second joint member 304 of the joint assembly 600. As a non-limiting example, the first joint member 602 may be an inner race.

In accordance with the embodiment illustrated in FIG. 10A of the disclosure and as a non-limiting example, one or more of the one or more first joint member grooves 622 may extend at an angle θ6. The angle θ6 of the one or more first joint member grooves 622 may extend relative to the axial centerline AC3 of the joint assembly 600. It is within the scope of this disclosure and as a non-limiting example that the one or more first joint member grooves 622 of the first joint member 602 may extend in an opposite direction from the one or more second joint member grooves 318 of the second joint member 304 of the joint assembly 600. By providing the joint assembly 600 with one or more first and second joint member grooves 622 and 318 that extend in opposite directions from each other, it aids in ensuring that the one or more third joint members 306 are retained in their ideal operating position at all times when the joint assembly 600 is in operation. As a non-limiting example, the angle θ2 of the one or more second joint member grooves 318 of the second joint member 304 may be substantially equal to the angle θ6 of the one or more first joint member grooves 622 of the first joint member 602.

A plurality of first joint member splines 624 may circumferentially extend along at least a portion of the inner surface 608 of the first joint member 602. The plurality of first joint member splines 624 may be complementary to and meshingly engaged with at least a portion of the plurality of first shaft splines 342 on the outer surface 338 of the first shaft 336. As a result, of the meshing engagement between the plurality of first joint member splines 624 and the plurality of first shaft splines 342, the first shaft 336 is drivingly connected to the first joint member 602 allowing an amount of rotational power to be transferred therebetween.

At least a portion of the cage member 362 may be interposed between the first joint member 602 and the second joint member 304 of the joint assembly 600. The cage member 362 may be used in order to ensure that the one or more third joint members 306 are retained in their ideal optimal operating position at all times while the joint assembly 600 is in operation. As best seen in FIG. 9 and as a non-limiting example, the hollow portion 378 of the cage member 362 may be of a size and shape needed to receive and/or retain at least a portion of the first joint member 602 therein when the joint assembly 600 is in operation.

When the joint assembly 600 has been extended to a first position 626 illustrated in FIGS. 10 and 10A, at least a portion of the one or more third joint members 306 may be in direct contact with at least a portion of an end of the one or more cage windows 380 in the cage member 362. Additionally, when the joint assembly 600 has been extended to a second position 628 illustrated in FIGS. 11 and 11A, at least a portion of the one or more third joint members 306 may or may not be in direct contact with at least a portion of an opposite end of the one or more cage windows 380. In accordance with the embodiment where the one or more third joint members 306 are not in contact with the opposite end of the one or more cage windows 380, an outer surface of the one or more third joint members 306 may be disposed the linear distance LD2 from the opposite end of the one or more cage windows 380. This may aid in reducing the overall amount of forces and stress on the cage member 362 when the joint assembly 600 is in the second position 628 thereby aiding in increasing the overall life and durability of the cage member 362 and the joint assembly 600.

The one or more cage windows 380 in the cage member 362 of the joint assembly 600 may be disposed the linear distance LD1 from each other. As best seen in FIG. 10A and as a non-limiting example, the linear distance LD1 may be measured from an end of one of the one or more cage windows 380 to an adjacent end of another of the one or more cage windows 380 in the cage member 362. The linear distance LD1 may be a pre-determined length needed to provide the one or more third joint members 306 with an amount of movement needed within the one or more cage windows 380 to selectively translate the joint assembly 600 between the first position 626 and the second position 628.

As best seen in FIG. 9 of the disclosure and as a non-limiting example, the first substantially cylindrical portion 386 and/or the first opening 387 of the cage member 362 has the diameter D1 and the first joint member 602 may have an outer diameter OD3. It is within the scope of this disclosure and as a non-limiting example that the diameter D1 of the first substantially cylindrical portion 386 and/or the first opening 387 of the cage member 362 may be substantially equal to or less than the outer diameter OD3 of the first joint member 602 of the joint assembly 600.

At least a portion of the first grease cover 392 may be connected to at least a portion of the first end portion 312 of the second joint member 302 of the joint assembly 600. The first grease cover 392 may be used in order to seal off a first end 394 of the second joint member 304 and retain an amount of lubricant (not shown) within the joint assembly 600. Additionally, the first grease cover 392 may be used in order to aid in preventing the migration of an amount of dirt, debris, and/or moisture into the joint assembly 600.

When the joint assembly 600 is in the first position 626 illustrated in FIGS. 10 and 10A, the first shaft 336 and the first joint member 602 may travel a first plunging distance PD9 and the cage member 362 and/or the one or more third joint members 306 may have traveled a third plunging distance PD11. The first plunging distance PD9 may be measured from the theoretical center TC6 of the first joint member 602 to the theoretical center TC2 of the second joint member 304 of the joint assembly 600. Additionally, the third plunging distance PD11 may be measured from the theoretical center TC2 of the second joint member 304 to the theoretical center TC1 of the cage member 362. It is within the scope of this disclosure and as a non-limiting example that the third plunging distance PD11 may be less than the first plunging distance PD9 of the joint assembly 600. As a non-limiting example, the third plunging distance PD11 may be approximately half of the first plunging distance PD9 of the joint assembly 600.

Figure 11A:
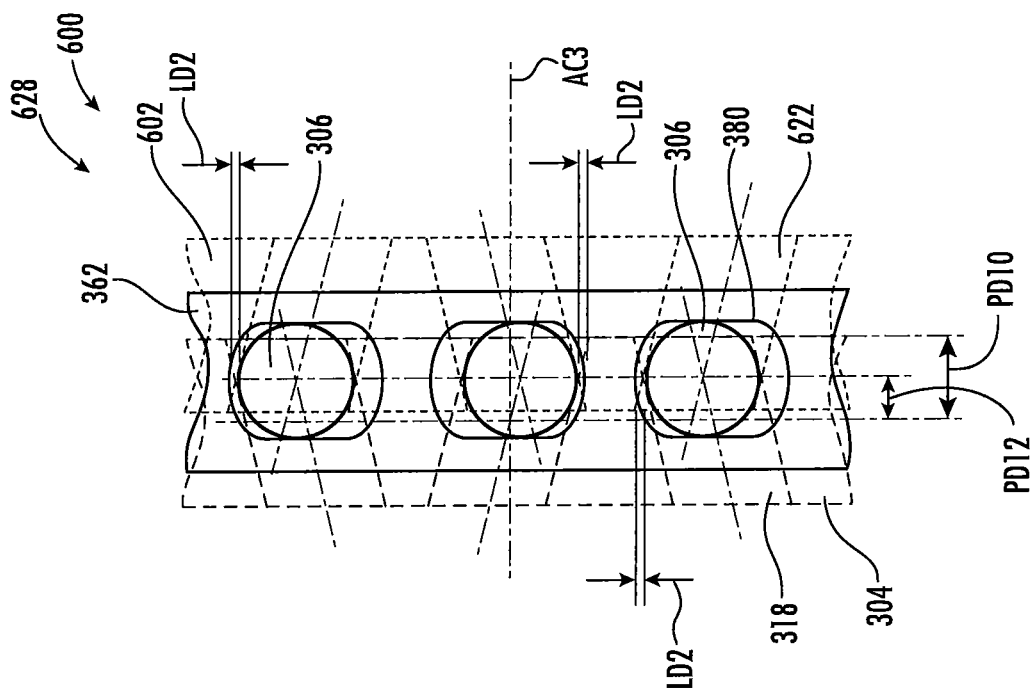
FIG. 11A is a cut-away schematic side-view of a portion of the joint assembly illustrated in FIGS. 9-11 when the joint assembly has been extended the second plunging distance.
Figure 11:
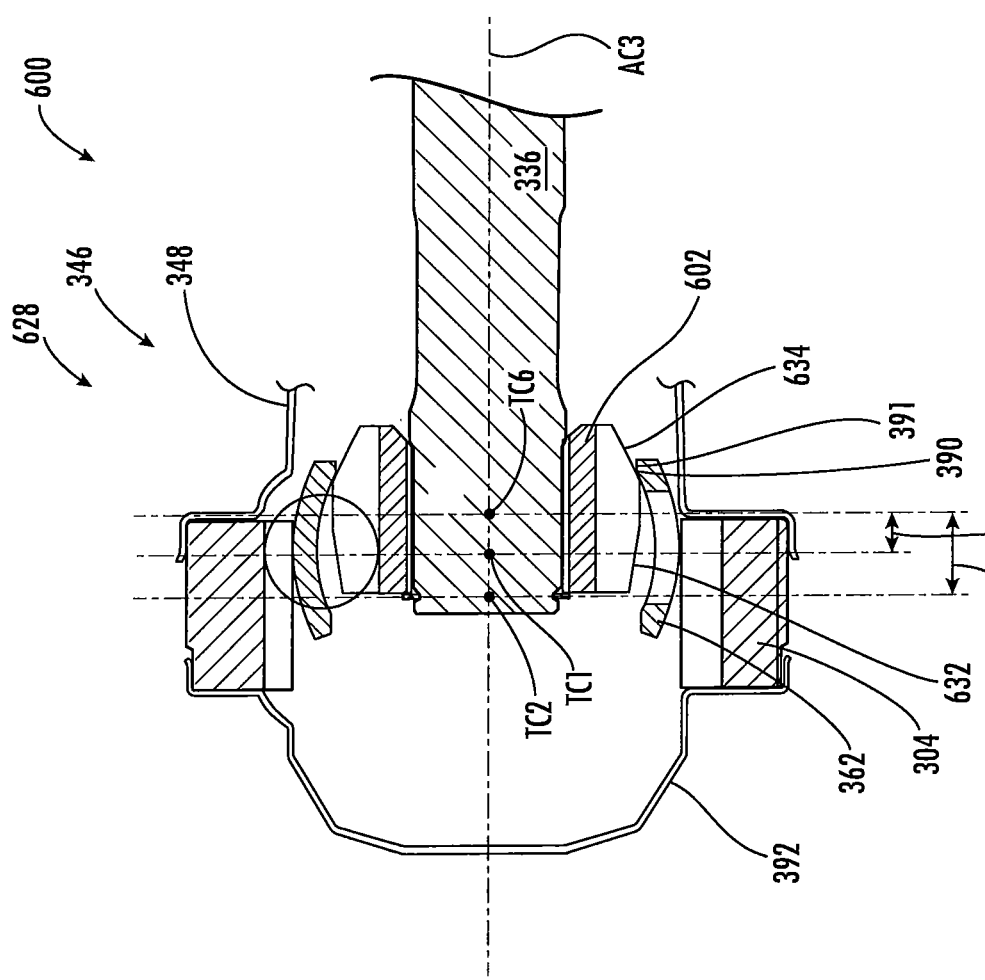
FIG. 11 is a cut away schematic side-view of the joint assembly illustrated in FIGS. 9-10A when the joint assembly has been extended a second plunging distance.

When the joint assembly 600 is in the second position 628 illustrated in FIGS. 11 and 11A, the first shaft 336 and the first joint member 602 may travel a second plunging distance PD10 and the cage member 362 and/or the one or more third joint members 306 may have traveled a fourth plunging distance PD12. The second plunging distance PD10 may be measured from the theoretical center TC6 of the first joint member 602 to the theoretical center TC2 of the second joint member 304. Additionally, the fourth plunging distance PD12 may be measured from the theoretical center TC2 of the second joint member 304 to the theoretical center TC1 of the cage member 362 of the joint assembly 600. It is within the scope of this disclosure and as a non-limiting example that the second plunging distance PD10 may be less than the first plunging distance PD9 thereby providing the joint assembly 600 with a first maximum plunging distance PD9 in the first direction 626 that is different from a second maximum plunging distance PD10 in the second direction 628. Additionally, it is within the scope of this disclosure and as a non-limiting example that the fourth plunging distance PD12 may be less than the first plunging distance PD9, the second plunging distance PD10, and/or the third plunging distance PD11 of the joint assembly 600. As a non-limiting example, the fourth plunging distance PD12 may be approximately half of the second plunging distance PD10 of the joint assembly 600.

As best seen in FIG. 10 and as a non-limiting example, when the joint assembly 600 is in the first position 626, at least a portion of the first shaft 336, the first joint member 602, the one or more third joint members 306, and/or the cage member 362 may be disposed within the substantially cylindrical portion 398 of the one or more first receiving portions 396 of the first grease cover 392. Additionally, as best seen in FIG. 10 and as a non-limiting example, when the joint assembly 600 is in the first position 626, at least a portion of the first shaft 336 and/or the first joint member 602 may be disposed within the second decreasing diameter portion 402 of the one or more first receiving portions 396 of the first grease cover 392.

According to the embodiment illustrated in FIGS. 9-11A of the disclosure and as a non-limiting example, the first end portion 616 of the outer surface 610 of the first joint member 602 may have one or more first engagement portions 632. The one or more first engagement portions 632 of the first joint member 602 may provide a first reaction surface between the first joint member 602 and the cage member 362 when the joint assembly 600 is in the first position 626 illustrated in FIG. 10 of the disclosure. As a result, when the joint assembly 600 is in the first position 626, at least a portion of the one or more first engagement portions 632 of the first joint member 602 may be in direct contact with at least a portion of the first substantially cylindrical portion 386 and/or first opening 387 of the cage member 362. The interaction between the first joint member 602 and the cage member 362 provides a positive stop, which aids in preventing the joint assembly 600 from translating or plunging beyond the pre-determined first plunging distance PD9. This aids in preventing the first shaft 336 and/or the first joint member 602 from translating or plunging to a point where the one or more third joint members 306 no longer provide a driving connection between the first joint member 602 and the second joint member 304 of the joint assembly 600. It is within the scope of this disclosure and as a non-limiting example, that the one or more first engagement portions 632 may have a substantially conical shape, a substantially frusto-conical shape, a substantially linear cross-sectional profile or shape, a substantially arcuate cross-sectional profile or shape, and/or a substantially polygonal cross-sectional profile or shape.

In accordance with the embodiment illustrated in FIGS. 9-11A and as a non-limiting example, the one or more first engagement portions 632 of the first joint member 602 may have a substantially conical shape, a substantially frusto-conical shape, or a substantially linear cross-sectional profile or shape extending from the first end 612 of the first joint member 602 toward the intermediate portion 620 of the first joint member 602. As best seen in FIG. 9 and as a non-limiting example, the one or more first engagement portions 632 of the first joint member 602 may extend outward from the first joint member 602 toward the second joint member 304 at an angle θ7 relative to the axial centerline AC3 of the joint assembly 600. As a result, the outer diameter OD3 of the first joint member 602 at the one or more first engagement portions 632 may increase at a substantially constant rate as the one or more first engagement portions 632 extends from the first end 614 of the first joint member 602 toward the intermediate portion 620 of the first joint member 602.

The second end portion 618 of the outer surface 610 of the first joint member 602 may include one or more second engagement portions 634. The one or more second engagement portions 634 of the first joint member 602 may provide a second reaction surface between the first joint member 602 and the cage member 362 when the joint assembly 600 is in the second position 628 illustrated in FIG. 11 of the disclosure. As a result, when the joint assembly 600 is in the second position 628, at least a portion of the one or more second engagement portions 634 of the first joint member 602 may be in direct contact with at least a portion of the second substantially cylindrical portion 390 and/or second opening 391 of the cage member 362. The interaction between the first joint member 602 and the cage member 362 provides a positive stop, which aids in preventing the joint assembly 600 from translating or plunging beyond the pre-determined second plunging distance PD10. This aids in preventing the first shaft 336 and/or the first joint member 602 from translating or plunging to a point where the one or more third joint members 306 no longer provide a driving connection between the first joint member 602 and the second joint member 304 of the joint assembly 600. It is within the scope of this disclosure and as a non-limiting example, that the one or more second engagement portions 634 may have a substantially conical shape, a substantially frusto-conical shape, a substantially linear cross-sectional profile or shape, a substantially arcuate cross-sectional profile or shape, and/or a substantially polygonal cross-sectional profile or shape.

In accordance with the embodiment illustrated in FIGS. 9-11A and as a non-limiting example, the one or more second engagement portions 634 of the first joint member 602 may have a substantially linear cross-sectional profile or shape extending from the second end 614 of the first joint member 602 toward the intermediate portion 620 of the first joint member 602. As best seen in FIG. 9 and as a non-limiting example, the one or more second engagement portions 634 of the first joint member 602 may extend outward from the first joint member 602 toward the second joint member 304 at an angle θ8 relative to the axial centerline AC3 of the joint assembly 600. As a result, the outer diameter OD3 of the first joint member 602 at the one or more second engagement portions 634 may increase at a substantially constant rate as the one or more second engagement portions 634 extends from the second end 616 of the first joint member 602 toward the intermediate portion 620 of the first joint member 602. It is within the scope of this disclosure and as a non-limiting example that the angle θ8 of the one or more second engagement portions 634 may be substantially equal to or greater than the angle θ7 of the one or more first engagement portions 632 of the first joint member 602.

According to an embodiment of the disclosure and as a non-limiting example, the intermediate portion 620 of the outer surface 610 of the first joint member 602 may include a substantially cylindrical portion 630. As best seen in FIGS. 9-11A and as a non-limiting example, the substantially cylindrical portion 630 may be interposed between the one or more first engagement portions 632 and the one or more second engagement portions 634 of the first joint member 602. It is within the scope of this disclosure and as a non-limiting example that the substantially cylindrical portion 630 of the first joint member 602 may be defined by a radius R7 from the theoretical center TC6 of the first joint member 602 defining an outermost diameter of the first joint member 602.

By altering the linear distance LD3, the one or more first engagement portions 385 of the cage member 362, the one or more second engagement portions 389 of the cage member 362, the diameter D1 of the first substantially cylindrical portion 386 and/or first opening 387 of the cage member 362, and/or the diameter D2 of the second substantially cylindrical portion 390 and/or second opening 391 of the cage member 362, the first and/or second plunging distances PD9 and/or PD10 may be selectively altered. Additionally, by altering the shape of the one or more first engagement portions 632, the location of the one or more first engagement portions 632, the outermost diameter of the one or more first engagement portions 632, the shape of the one or more second engagement portions 634, the location of the one or more second engagement portions 634, and/or the outermost diameter of the one or more second engagement portions 634 of the first joint member 602, the first and/or second plunging distances PD9 and/or PD10 may be selectively altered. As a result, one or more of the above-identified elements of the first joint member 602 and/or the cage member 362 may be selectively altered in order to achieve a pre-determined desired first plunging distance PD9 and/or a pre-determined desired second plunging distance PD10 for the joint assembly 600. This aids in providing a single joint assembly 600 that is more versatile, customizable and is able to be utilized in a wider array of applications.

According to the embodiment illustrated in FIGS. 9-11A and as a non-limiting example, the joint assembly 600 may have a first maximum plunging distance PD9 in the first direction 626 that is greater than a second maximum plunging distance PD10 in the second direction 628. In accordance with this embodiment of the disclosure and as a non-limiting example, the first direction 626 may be an installation direction and the second direction 628 may be a vehicle suspension movement direction. As a result, the joint assembly 600 illustrated in FIGS. 9-11A may be utilized in a vehicle (not shown) requiring a large shaft installation tolerance in a slide-in direction but has a smaller amount of overall vehicle suspension movement when in operation. It is within the scope of this disclosure and as a non-limiting example that the second plunging distance PD10 may be approximately half of the first plunging distance PD9 of the joint assembly 600.

In accordance with an embodiment of the disclosure and as a non-limiting example, the first and/or second plunging distance PD9 and/or PD10 may be a distance needed to allow the joint assembly 600 to absorb a pre-determined amount of energy and/or to allow the joint assembly 600 to plunge a first and/or second pre-determined distance PD9 and/or PD10 when the vehicle (not shown) experiences a crash condition. It is within the scope of this disclosure and as a non-limiting example that the first and/or second pre-determined plunging distance PD9 and/or PD10 may be an amount of plunging distance required for the joint assembly 600 when the vehicle (not shown) experiences a crash condition. This allows the first shaft 336 and/or the first joint member 602 to travel a pre-determined distance during a crash condition without causing damage to one or more of the components of parts of the joint assembly 600.

By altering the linear distance LD3, the one or more first engagement portions 385 of the cage member 362, the one or more second engagement portions 389 of the cage member 362, the diameter D1 of the first substantially cylindrical portion 386 and/or first opening 387 of the cage member 362, and/or the diameter D2 of the second substantially cylindrical portion 390 and/or second opening 391 of the cage member 362, the first and/or second plunging distances PD9 and/or PD11 may be selectively altered allowing joint assembly 600 to achieve the desired plunging distances when the vehicle (not shown) experiences a crash condition. Additionally, by altering the shape of the one or more first engagement portions 632, the location of the one or more first engagement portions 632, the outermost diameter of the one or more first engagement portions 632, the shape of the one or more second engagement portions 634, the location of the one or more second engagement portions 634, and/or the outermost diameter of the one or more second engagement portions 634 of the first joint member 602, the first and/or second plunging distances PD9 and/or PD10 may be selectively altered allowing joint assembly 600 to achieve the desired plunging distances when the vehicle (not shown) experiences a crash condition. One or more of the above-identified elements of the first joint member 602 and/or the cage member 362 may be selectively altered in order to achieve a pre-determined desired first and/or second plunging distances PD9 and/or PD10 for the joint assembly 600. This aids in providing a single joint assembly 600 having customizable and improved overall safety and crash characteristics.

In accordance with an alternative embodiment of the disclosure and as a non-limiting example, the interaction between the first joint member 602 and the cage member 362 may be customized in order to allow the joint assembly 600 to absorb a pre-determined amount of energy when the vehicle (not shown) experiences a crash condition. When the vehicle (not shown) experiences a crash condition, the first shaft 336 and the first joint member 602 may translate the first and/or second plunging distance PD9 and/or PD10 until the one or more first or second engagement portions 632 or 634 of the first joint member 602 come into direct contact with the first substantially cylindrical portion 386, the first opening 387, the second substantially cylindrical portion 390, or the second opening 391 of the cage member 361. Once in contact, the first joint member 602 may drive the first substantially cylindrical portion 386 and/or first opening 387 of the cage member 362 or the second substantially cylindrical portion 390 and/or second opening 391 of the cage member 362 outward allowing the joint assembly 600 to collapse a pre-determined amount. Additionally, once the cage member 362 has been driven outward an amount needed to allow the first joint member 602 to translate beyond the cage member 362, the first shaft 336 and/or the first joint member 602 may be driven into direct contact with the first grease cover 392. As a result, it is therefore to be understood that the interaction between the first joint member 602, the cage member 362, and/or the first grease cover 392 allows the joint assembly 600 to absorb a pre-determined amount of energy when the vehicle (not shown) experiences a crash condition.

By altering the shape of the first grease cover 392, the material of the first grease cover 392, the linear distance LD3, the one or more first engagement portions 385 of the cage member 362, the one or more second engagement portions 389 of the cage member 362, the diameter D1 of the first substantially cylindrical portion 386 and/or first opening 387 of the cage member 362, and/or the diameter D2 of the second substantially cylindrical portion 390 and/or second opening 391 of the cage member 362, the amount of energy absorbed by the joint assembly 600 when the vehicle (not shown) experiences a crash condition may be selectively altered. Additionally, by altering the shape of the one or more first engagement portions 632, the location of the one or more first engagement portions 632, the contact point between the cage member 362 and the first joint member 602 along the one or more first engagement portions 632, the outermost diameter of the one or more first engagement portions 632, the shape of the one or more second engagement portions 634, the location of the one or more second engagement portions 634, the contact point between the cage member 362 and the first joint member 602 along the one or more second engagement portions 634, and/or the outermost diameter of the one or more second engagement portions 634 of the first joint member 602, the amount of energy absorbed by the joint assembly 600 when the vehicle (not shown) experiences a crash condition may be selectively altered. One or more of the above-identified elements of the first joint member 602, the cage member 362, and/or the first grease cover 392 may be selectively altered in order to allow the joint assembly 600 to absorb a pre-determined desired amount of force when the vehicle (not shown) experiences a crash condition. This aids in providing a single joint assembly 600 having customizable and improved overall safety and crash characteristics.

By providing the joint assembly 600 with a first joint member 602 and a cage member 362 as described and illustrated herein, the joint assembly 600 is more versatile and is able to be used in a wider array of applications by providing a different or customized first joint member 602, cage member 362, and/or first grease cover 392 needed to achieve the desired pre-determined first and/or second plunging distances PD9 and/or PD10. Additionally, by providing the joint assembly 600 with a first joint member 602 and a cage member 362 as described and illustrated herein, the joint assembly 600 is lighter, is customizable, has improved plunging distances, has an improved packaging size, has improved crash characteristics, has an improved overall amount of energy absorption, is more cost efficient and has an improved overall life and durability.

FIGS. 12-14A provide a schematic side-view of a joint assembly 700 according to an alternative embodiment of the disclosure. The joint assembly 700 illustrated in FIGS. 12-14A is the same as the joint assemblies 300, 500, and 600 illustrated in FIGS. 3-11A, except where specifically noted below. In accordance with the embodiment illustrated in FIGS. 12-14A of the disclosure and as a non-limiting example, the joint assembly 700 may include the first shaft 336, a first joint member 702, the second joint member 304, the one or more third joint members 306, the cage member 504, the first grease cover 392, and/or the boot assembly 346. It is within the scope of this disclosure and as a non-limiting example that the joint assembly 700 may be a homokinetic coupling assembly, a constant velocity joint assembly, a CV joint assembly, a universal joint assembly, a Cardan joint assembly, a Spicer joint assembly, a Hooke's joint assembly and/or a universal coupling assembly. In accordance with the embodiment where the joint assembly 700 is a constant velocity joint assembly, it is within the scope of this disclosure and as a non-limiting example that the joint assembly 700 may be a plunging constant velocity joint assembly, a plunging cross-groove constant velocity joint assembly, a plunging cross-groove hybrid constant velocity joint assembly, or a plunging double off-set constant velocity joint assembly.

Figure 12:
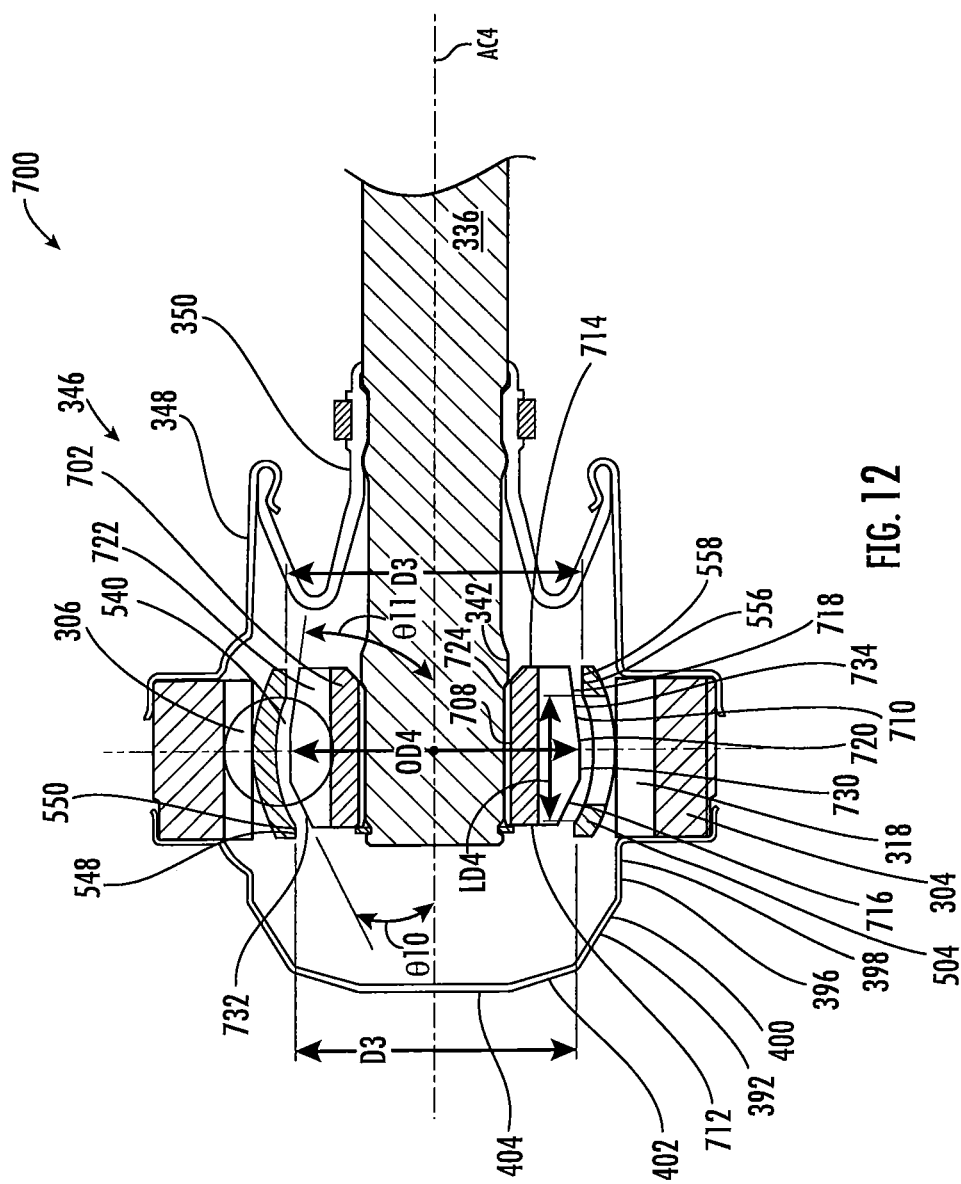
FIG. 12 is a cut away schematic side-view of the joint assembly illustrated in FIGS. 3-11A according to yet another embodiment of the disclosure.

As best seen in FIG. 12 and as a non-limiting example, the first joint member 702 may have an inner surface 708, an outer surface 710, a first end 712, a second end 714, a first end portion 716, a second end portion 718, and an intermediate portion 720 interposed between the first and second end portions 716 and 718. Circumferentially extending along at least a portion of the outer surface 710 of the first joint member 702 is a plurality of first joint member grooves 722. The plurality of first joint member grooves 722 in the first joint member 702 may be complementary to the plurality of second joint member grooves 318 in the second joint member 304. Additionally, the plurality of first joint member grooves 722 may be of a size and shape needed to receive and/or retain at least a portion of the one or more third joint members 306 therein. It is therefore to be understood that the one or more third joint members 306 may provide a driving connection between the first joint member 702 and the second joint member 304 of the joint assembly 700. As a non-limiting example, the first joint member 702 may be an inner race.

In accordance with the embodiment illustrated in FIG. 13A of the disclosure and as a non-limiting example, one or more of the one or more first joint member grooves 722 may extend at an angle θ9. The angle θ9 of the one or more first joint member grooves 722 may extend relative to the axial centerline AC4 of the joint assembly 700. It is within the scope of this disclosure and as a non-limiting example that the one or more first joint member grooves 722 of the first joint member 702 may extend in an opposite direction from the one or more second joint member grooves 318 of the second joint member 304 of the joint assembly 700. By providing the joint assembly 700 with one or more first and second joint member grooves 722 and 318 that extend in opposite directions from each other, it aids in ensuring that the one or more third joint members 306 are retained in their ideal operating position at all times when the joint assembly 700 is in operation. As a non-limiting example, the angle θ2 of the one or more second joint member grooves 318 of the second joint member 304 may be substantially equal to the angle θ9 of the one or more first joint member grooves 722 of the first joint member 702.

A plurality of first joint member splines 724 may circumferentially extend along at least a portion of the inner surface 708 of the first joint member 702. The plurality of first joint member splines 724 may be complementary to and meshingly engaged with at least a portion of the plurality of first shaft splines 342 on the outer surface 338 of the first shaft 336. As a result, of the meshing engagement between the plurality of first joint member splines 724 and the plurality of first shaft splines 342, the first shaft 336 is drivingly connected to the first joint member 702 allowing an amount of rotational power to be transferred therebetween.

At least a portion of the cage member 504 may be interposed between the first joint member 702 and the second joint member 304 of the joint assembly 700. The cage member 504 may be used in order to ensure that the one or more third joint members 306 are retained in their ideal optimal operating position at all times while the joint assembly 700 is in operation. As best seen in FIG. 12 and as a non-limiting example, the hollow portion 540 of the cage member 504 may be of a size and shape needed to receive and/or retain at least a portion of the first joint member 702 therein when the joint assembly 700 is in operation.

When the joint assembly 700 has been extended to a first position 726 illustrated in FIGS. 13 and 13A, at least a portion of the one or more third joint members 306 may or may not be in direct contact with at least a portion of an end of the one or more cage windows 542 in the cage member 504. In accordance with the embodiment where the one or more third joint members 306 are not in contact with the end of the one or more cage windows 542, an outer surface of the one or more third joint members 306 may be disposed a linear distance LD7 from the end of the one or more cage windows 542. This may aid in reducing the overall amount of forces and stress on the cage member 504 when the joint assembly 700 is in the first position 726 thereby aiding in increasing the overall life and durability of the cage member 504 and the joint assembly 700. When the joint assembly 700 has been extended to a second position 728 illustrated in FIGS. 14 and 14A, at least a portion of the one or more third joint members 306 may be in direct contact with at least a portion of an opposite end of the one or more cage windows 542 in the cage member 504.

The one or more cage windows 542 in the cage member 504 of the joint assembly 700 may be disposed the linear distance LD6 from each other. As best seen in FIG. 14A and as a non-limiting example, the linear distance LD6 may be measured from an end of one of the one or more cage windows 542 to an adjacent end of another of the one or more cage windows 542 in the cage member 504. The linear distance LD6 may be a pre-determined length needed to provide the one or more third joint members 306 with an amount of movement needed within the one or more cage windows 542 to selectively translate the joint assembly 700 between the first position 726 and the second position 728.

As best seen in FIG. 12 of the disclosure and as a non-limiting example, the first substantially cylindrical portion 548 and/or the first opening 550 of the cage member 504 has the diameter D3 and the first joint member 702 may have an outer diameter OD4. It is within the scope of this disclosure and as a non-limiting example that the diameter D3 of the first substantially cylindrical portion 548 and/or the first opening 550 of the cage member 504 may be substantially equal to or less than the outer diameter OD4 of the first joint member 702 of the joint assembly 700.

At least a portion of the first grease cover 392 may be connected to at least a portion of the first end portion 312 of the second joint member 302 of the joint assembly 700. The first grease cover 392 may be used in order to seal off a first end 394 of the second joint member 304 and retain an amount of lubricant (not shown) within the joint assembly 700. Additionally, the first grease cover 392 may be used in order to aid in preventing the migration of an amount of dirt, debris, and/or moisture into the joint assembly 700.

When the joint assembly 700 is in the first position 726 illustrated in FIGS. 13 and 13A, the first shaft 336 and the first joint member 702 may travel a first plunging distance PD13 and the cage member 504 and/or the one or more third joint members 306 may have traveled a third plunging distance PD15. The first plunging distance PD13 may be measured from the theoretical center TC7 of the first joint member 702 to the theoretical center TC2 of the second joint member 304 of the joint assembly 700. Additionally, the third plunging distance PD15 may be measured from the theoretical center TC2 of the second joint member 304 to the theoretical center TC4 of the cage member 504. It is within the scope of this disclosure and as a non-limiting example that the third plunging distance PD15 may be less than the first plunging distance PD13 of the joint assembly 700. As a non-limiting example, the third plunging distance PD15 may be approximately half of the first plunging distance PD13 of the joint assembly 700.

When the joint assembly 700 is in the second position 728 illustrated in FIGS. 14 and 14A, the first shaft 336 and the first joint member 702 may travel a second plunging distance PD14 and the cage member 504 and/or the one or more third joint members 306 may have traveled a fourth plunging distance PD16. The second plunging distance PD14 may be measured from the theoretical center TC7 of the first joint member 702 to the theoretical center TC2 of the second joint member 304. Additionally, the fourth plunging distance PD16 may be measured from the theoretical center TC2 of the second joint member 304 to the theoretical center TC4 of the cage member 504 of the joint assembly 700. It is within the scope of this disclosure and as a non-limiting example that the second plunging distance PD14 may be greater than the first plunging distance PD13 thereby providing the joint assembly 700 with a first maximum plunging distance PD13 in the first direction 726 that is different from a second maximum plunging distance PD14 in the second direction 728. Additionally, it is within the scope of this disclosure and as a non-limiting example that the third plunging distance PD15 may be less than the first plunging distance PD13, the second plunging distance PD14, and/or the fourth plunging distance PD16 of the joint assembly 700. As a non-limiting example, the fourth plunging distance PD16 may be approximately half of the second plunging distance PD14 of the joint assembly 700.

As best seen in FIG. 13 and as a non-limiting example, when the joint assembly 700 is in the first position 726, at least a portion of the first shaft 336, the first joint member 702, the one or more third joint members 306, and/or the cage member 504 may be disposed within the substantially cylindrical portion 398 of the one or more first receiving portions 396 of the first grease cover 392. Additionally, as best seen in FIG. 13 and as a non-limiting example, when the joint assembly 700 is in the first position 726, at least a portion of the first shaft 336 and/or the first joint member 702 may or may not be disposed within the second decreasing diameter portion 402 of the one or more first receiving portions 396 of the first grease cover 392.

In accordance with the embodiment where the first shaft 336 and/or the first joint member 702 are not disposed within the second decreasing diameter portion 402 of the first grease cover 392 when the joint assembly 700 is in the first position 726, the first grease cover 392 may not include the second decreasing diameter portion 402. As a result, it is within the scope of this disclosure and as a non-limiting example that the wall portion 404 of the first grease cover 392 may be disposed at an end of the first decreasing diameter portion 400 opposite the second joint member 304 of the joint assembly 700. This aids in providing a first grease cover 392 that is more compact, easier the manufacturer, more cost efficient, and lighter which in turn aids in providing a joint assembly 700 that is more compact, easier the manufacturer, more cost efficient, and lighter.

According to the embodiment illustrated in FIGS. 12-14A of the disclosure and as a non-limiting example, the first end portion 716 of the outer surface 710 of the first joint member 702 may have one or more first engagement portions 732. The one or more first engagement portions 732 of the first joint member 702 may provide a first reaction surface between the first joint member 702 and the cage member 504 when the joint assembly 700 is in the first position 726 illustrated in FIG. 13 of the disclosure. As a result, when the joint assembly 700 is in the first position 726, at least a portion of the one or more first engagement portions 732 of the first joint member 702 may be in direct contact with at least a portion of the first substantially cylindrical portion 548 and/or first opening 550 of the cage member 504. The interaction between the first joint member 702 and the cage member 504 provides a positive stop, which aids in preventing the joint assembly 700 from translating or plunging beyond the pre-determined first plunging distance PD13. This aids in preventing the first shaft 336 and/or the first joint member 702 from translating or plunging to a point where the one or more third joint members 306 no longer provide a driving connection between the first joint member 702 and the second joint member 304 of the joint assembly 700. It is within the scope of this disclosure and as a non-limiting example, that the one or more first engagement portions 732 may have a substantially conical shape, a substantially frusto-conical shape, a substantially linear cross-sectional profile or shape, a substantially arcuate cross-sectional profile or shape, and/or a substantially polygonal cross-sectional profile or shape.

As illustrated in FIGS. 12-14A and as a non-limiting example, the one or more first engagement portions 732 of the first joint member 702 may have a substantially conical shape, a substantially frusto-conical shape, or a substantially linear cross-sectional profile or shape extending from the first end 712 of the first joint member 702 toward the intermediate portion 620 of the first joint member 702. As best seen in FIG. 12 and as a non-limiting example, the one or more first engagement portions 732 of the first joint member 702 may extend outward from the first joint member 702 toward the second joint member 304 at an angle θ10 relative to the axial centerline AC4 of the joint assembly 700. As a result, the outer diameter OD4 of the first joint member 702 at the one or more first engagement portions 732 may increase at a substantially constant rate as the one or more first engagement portions 732 extends from the first end 714 of the first joint member 702 toward the intermediate portion 720 of the first joint member 702.

The second end portion 718 of the outer surface 710 of the first joint member 702 may include one or more second engagement portions 734. The one or more second engagement portions 734 of the first joint member 702 may provide a second reaction surface between the first joint member 702 and the cage member 504 when the joint assembly 700 is in the second position 728 illustrated in FIG. 14 of the disclosure. As a result, when the joint assembly 700 is in the second position 728, at least a portion of the one or more second engagement portions 734 of the first joint member 702 may be in direct contact with at least a portion of the second substantially cylindrical portion 556 and/or second opening 558 of the cage member 504. The interaction between the first joint member 702 and the cage member 504 provides a positive stop, which aids in preventing the joint assembly 700 from translating or plunging beyond the pre-determined second plunging distance PD14. This aids in preventing the first shaft 336 and/or the first joint member 702 from translating or plunging to a point where the one or more third joint members 306 no longer provide a driving connection between the first joint member 702 and the second joint member 304 of the joint assembly 700. It is within the scope of this disclosure and as a non-limiting example, that the one or more second engagement portions 734 may have a substantially conical shape, a substantially frusto-conical shape, a substantially linear cross-sectional profile or shape, a substantially arcuate cross-sectional profile or shape, and/or a substantially polygonal cross-sectional profile or shape.

In accordance with the embodiment illustrated in FIGS. 12-14A and as a non-limiting example, the one or more second engagement portions 734 of the first joint member 702 may have a substantially conical shape, a substantially frusto-conical shape, or a substantially linear cross-sectional profile or shape extending from the second end 714 of the first joint member 702 toward the intermediate portion 720 of the first joint member 702. As best seen in FIG. 12 and as a non-limiting example, the one or more second engagement portions 734 of the first joint member 702 may extend outward from the first joint member 702 toward the second joint member 304 at an angle θ11 relative to the axial centerline AC4 of the joint assembly 700. As a result, the outer diameter OD4 of the first joint member 702 at the one or more second engagement portions 734 may increase at a substantially constant rate as the one or more second engagement portions 734 extends from the second end 716 of the first joint member 702 toward the intermediate portion 720 of the first joint member 702. It is within the scope of this disclosure and as a non-limiting example that the angle θ11 of the one or more second engagement portions 734 may be substantially equal to or smaller than the angle θ10 of the one or more first engagement portions 732 of the first joint member 702.

According to an embodiment of the disclosure and as a non-limiting example, the intermediate portion 720 of the outer surface 710 of the first joint member 702 may include a substantially cylindrical portion 730. As best seen in FIGS. 12-14A and as a non-limiting example, the substantially cylindrical portion 730 may be interposed between the one or more first engagement portions 732 and the one or more second engagement portions 734 of the first joint member 702. It is within the scope of this disclosure and as a non-limiting example that the substantially cylindrical portion 730 of the first joint member 702 may be defined by a radius R8 from the theoretical center TC7 of the first joint member 702 defining an outermost diameter of the first joint member 702.

By altering the linear distance LD4, the one or more first engagement portions 547 of the cage member 504, the one or more second engagement portions 555 of the cage member 504, the diameter D3 of the first substantially cylindrical portion 548 and/or first opening 550 of the cage member 504, and/or the diameter D4 of the second substantially cylindrical portion 556 and/or second opening 558 of the cage member 504, the first and/or second plunging distances PD13 and/or PD14 may be selectively altered. Additionally, by altering the shape of the one or more first engagement portions 732, the location of the one or more first engagement portions 732, the outermost diameter of the one or more first engagement portions 732, the shape of the one or more second engagement portions 734, the location of the one or more second engagement portions 734, and/or the outermost diameter of the one or more second engagement portions 734 of the first joint member 702, the first and/or second plunging distances PD13 and/or PD14 may be selectively altered. As a result, one or more of the above-identified elements of the first joint member 702 and/or the cage member 504 may be selectively altered in order to achieve a pre-determined desired first plunging distance PD13 and/or a pre-determined desired second plunging distance PD14 for the joint assembly 700. This aids in providing a single joint assembly 700 that is more versatile, customizable and is able to be utilized in a wider array of applications.

According to the embodiment illustrated in FIGS. 12-14A and as a non-limiting example, the joint assembly 700 may have a first maximum plunging distance PD13 in the first direction 726 that is smaller than a second maximum plunging distance PD14 in the second direction 728. In accordance with this embodiment of the disclosure and as a non-limiting example, the first direction 726 may be an installation direction and the second direction 728 may be a vehicle suspension movement direction. As a result, the joint assembly 700 illustrated in FIGS. 12-14A may be utilized in a vehicle (not shown) requiring a large shaft installation tolerance in a slide-out direction but has a smaller amount of overall vehicle suspension movement when in operation. It is within the scope of this disclosure and as a non-limiting example that the second plunging distance PD14 may be approximately half of the first plunging distance PD13 of the joint assembly 700.

In accordance with an embodiment of the disclosure and as a non-limiting example, the first and/or second plunging distance PD13 and/or PD14 may be a distance needed to allow the joint assembly 700 to absorb a pre-determined amount of energy and/or to allow the joint assembly 700 to plunge a first and/or second pre-determined distance PD13 and/or PD14 when the vehicle (not shown) experiences a crash condition. It is within the scope of this disclosure and as a non-limiting example that the first and/or second pre-determined plunging distance PD13 and/or PD14 may be an amount of plunging distance required for the joint assembly 700 when the vehicle (not shown) experiences a crash condition. This allows the first shaft 336 and/or the first joint member 702 to travel a pre-determined distance during a crash condition without causing damage to one or more of the components of parts of the joint assembly 700.

By altering the linear distance LD4, the one or more first engagement portions 547 of the cage member 504, the one or more second engagement portions 555 of the cage member 504, the diameter D3 of the first substantially cylindrical portion 548 and/or first opening 550 of the cage member 504, and/or the diameter D4 of the second substantially cylindrical portion 556 and/or second opening 558 of the cage member 504, the first and/or second plunging distances PD13 and/or PD14 may be selectively altered allowing joint assembly 700 to achieve the desired plunging distances when the vehicle (not shown) experiences a crash condition. Additionally, by altering the shape of the one or more first engagement portions 732, the location of the one or more first engagement portions 732, the outermost diameter of the one or more first engagement portions 732, the shape of the one or more second engagement portions 734, the location of the one or more second engagement portions 734, and/or the outermost diameter of the one or more second engagement portions 734 of the first joint member 702, the first and/or second plunging distances PD13 and/or PD14 may be selectively altered allowing joint assembly 700 to achieve the desired plunging distances when the vehicle (not shown) experiences a crash condition. One or more of the above-identified elements of the first joint member 702 and/or the cage member 504 may be selectively altered in order to achieve a pre-determined desired first and/or second plunging distances PD13 and/or PD14 for the joint assembly 700. This aids in providing a single joint assembly 700 having customizable and improved overall safety and crash characteristics.

In accordance with an alternative embodiment of the disclosure and as a non-limiting example, the interaction between the first joint member 702 and the cage member 504 may be customized in order to allow the joint assembly 700 to absorb a pre-determined amount of energy when the vehicle (not shown) experiences a crash condition. When the vehicle (not shown) experiences a crash condition, the first shaft 336 and the first joint member 702 may translate the first and/or second plunging distance PD13 and/or PD14 until the one or more first or second engagement portions 732 or 734 of the first joint member 702 come into direct contact with the first substantially cylindrical portion 548, the first opening 550, the second substantially cylindrical portion 556, or the second opening 558 of the cage member 504. Once in contact, the first joint member 702 may drive the first substantially cylindrical portion 548 and/or first opening 550 of the cage member 504 or the second substantially cylindrical portion 556 and/or second opening 558 of the cage member 504 outward allowing the joint assembly 700 to collapse a pre-determined amount. Additionally, once the cage member 504 has been driven outward an amount needed to allow the first joint member 702 to translate beyond the cage member 504, the first shaft 336 and/or the first joint member 702 may be driven into direct contact with the first grease cover 392. As a result, it is therefore to be understood that the interaction between the first joint member 702, the cage member 504, and/or the first grease cover 392 allows the joint assembly 700 to absorb a pre-determined amount of energy when the vehicle (not shown) experiences a crash condition.

By altering the shape of the first grease cover 392, the material of the first grease cover 392, the linear distance LD4, the one or more first engagement portions 547 of the cage member 504, the one or more second engagement portions 555 of the cage member 504, the diameter D3 of the first substantially cylindrical portion 548 and/or first opening 550 of the cage member 504, and/or the diameter D4 of the second substantially cylindrical portion 556 and/or second opening 558 of the cage member 504, the amount of energy absorbed by the joint assembly 700 when the vehicle (not shown) experiences a crash condition may be selectively altered. Additionally, by altering the shape of the one or more first engagement portions 732, the location of the one or more first engagement portions 732, the contact point between the cage member 504 and the first joint member 702 along the one or more first engagement portions 732, the outermost diameter of the one or more first engagement portions 732, the shape of the one or more second engagement portions 734, the location of the one or more second engagement portions 734, the contact point between the cage member 504 and the first joint member 702 along the one or more second engagement portions 734, and/or the outermost diameter of the one or more second engagement portions 734 of the first joint member 702, the amount of energy absorbed by the joint assembly 700 when the vehicle (not shown) experiences a crash condition may be selectively altered. One or more of the above-identified elements of the first joint member 702, the cage member 504, and/or the first grease cover 392 may be selectively altered in order to allow the joint assembly 700 to absorb a pre-determined desired amount of force when the vehicle (not shown) experiences a crash condition. This aids in providing a single joint assembly 700 having customizable and improved overall safety and crash characteristics.

By providing the joint assembly 700 with a first joint member 702 and a cage member 504 as described and illustrated herein, the joint assembly 700 is more versatile and is able to be used in a wider array of applications by providing a different or customized first joint member 702, cage member 504, and/or first grease cover 392 needed to achieve the desired pre-determined first and/or second plunging distances PD13 and/or PD14. Additionally, by providing the joint assembly 700 with a first joint member 702 and a cage member 504 as described and illustrated herein, the joint assembly 700 is lighter, is customizable, has improved plunging distances, has an improved packaging size, has improved crash characteristics, has an improved overall amount of energy absorption, is more cost efficient and has an improved overall life and durability.

FIG. 15 is a flow chart illustrating the method 800 of utilizing a joint assembly 300, 500, 600 and/or 700 illustrated in FIGS. 3-14A of the disclosure. As illustrated in FIG. 15 of the disclosure and as a non-limiting example, the method 800 includes a providing step 802. Within the providing step 802 includes the step of providing the joint assembly 300, 500, 600 and/or 700 having a first joint member 302, 502, 602, and/or 702, a second joint member 304, one or more third joint members 306, and/or a cage member 362 and/or 504.

Once the joint assembly 300, 500, 600 and/or 700 has been provided 804, the step of providing 806 a first joint member 302, 502, 602, and/or 702 having one or more first engagement portions 408, 560, 632, or 732 and/or one or more second engagement portions 410, 562, 634, or 734 may be performed. Additionally, once the joint assembly 300, 500, 600 and/or 700 has been provided 804, the step of providing 808 a cage member 362 or 504 having one or more first engagement portions 385 or 547, one or more second engagement portions 389 or 555, a first substantially cylindrical portion 386 or 548, a first opening 387 or 550, a second substantially cylindrical portion 390 or 556, and/or a second opening 391 or 558 may be performed. As previously discussed herein the one or more first engagement portions 408, 560, 632, or 732 and/or the one or more second engagement portions 410, 562, 634, or 734 of the first joint member 302, 502, 602, and/or 702 may be selectively engagable with the one or more first engagement portions 385 or 547, the one or more second engagement portions 389 or 555, the first substantially cylindrical portion 386 or 548, the first opening 387 or 550, the second substantially cylindrical portion 390 or 556, and/or the second opening 391 or 558 of the cage member 362 or 504 when the joint assembly 300, 500, 600 and/or 700 is in operation.

After the providing step 802 has been performed a determination step 810 may be performed. As illustrated in FIG. 15 and as a non-limiting example, the determination step 810 may include determining 812 a first plunging distance PD1, PD5, PD9, and/or PD13 in a first direction 382, 544, 626, and/or 726 and/or a second plunging distance PD2, PD6, PD10, and/or PD14 in a second direction 382, 546, 628, and/or 728 opposite the first direction 382, 544, 626, and/or 726. Additionally, as illustrated in FIG. 15 and as a non-limiting example, the determination step 810 may include determining 816 an amount of energy to be absorbed by the joint assembly 300, 500, 600 and/or 700 when the vehicle (not shown) experiences a crash condition.

Once one or more of the steps 812, 814 and/or 816 of the determination step 810 have been completed, an altering step 818 may be performed. The altering step 818 may include the step of altering one or more aspects 820 of the first joint member 302, 502, 602, and/or 702 and/or the cage member 362 and/or 504 in order to achieve the first and/or second plunging distances PD1, PD2, PD5, PD6, PD9, PD10, PD13, and/or PD14 previously determined 812 and/or 814. It is within the scope of this disclosure and as a non-limiting example that the step of altering one or more aspects 820 of the first joint member 302, 502, 602, and/or 702 and/or the cage member 362 and/or 504 may include altering 820 the linear distance between the first opening and/or first substantially cylindrical portion of the cage member and the second opening and/or second substantially cylindrical portion of the cage member, the one or more first engagement portions of the cage member, the one or more second engagement portions of the cage member, the diameter of the first opening and/or first substantially cylindrical portion of the cage member, the diameter of the second opening and/or second substantially cylindrical portion of the cage member, the shape of the one or more first engagement portions, the location of the one or more first engagement portions of the first joint member, the outer diameter of the one or more first engagement portions of the first joint member, the angle defining the shape of the one or more first engagement portions of the first joint member, the radius defining the shape of the one or more first engagement portions of the first joint member, the shape of the one or more second engagement portions of the first joint member, the location of the one or more second engagement portions of the first joint member, the outer diameter of the one or more second engagement portions of the first joint member, the angle defining the shape of the one or more second engagement portions of the first joint member, and/or the radius defining the shape of the one or more second engagement portions of the first joint member.

Additionally, the altering step 818 may include the step of altering one or more aspects 822 of the first joint member 302, 502, 602, and/or 702, the first grease cover 392, and/or the cage member 362 or 504 in order to achieve the pre-determined amount of energy or force to be absorbed by the joint assembly 300, 500, 600 and/or 700 when the vehicle (not shown) experiences a crash condition. It is within the scope of this disclosure and as a non-limiting example that the step of altering one or more aspects 820 of the first joint member 302, 502, 602, and/or 702, the first grease cover 392, and/or the cage Member 362 and/or 504 may include altering 820 linear distance between the first opening and/or first substantially cylindrical portion of the cage member and the second opening and/or second substantially cylindrical portion of the cage member, the one or more first engagement portions of the cage member, the one or more second engagement portions of the cage member, the diameter of the first opening and/or first substantially cylindrical portion of the cage member, the diameter of the second opening and/or second substantially cylindrical portion of the cage member, the shape of the one or more first engagement portions of the first joint member, the location of the one or more first engagement portions of the first joint member, the outer diameter of the one or more first engagement portions of the first joint member, the angle defining the shape of the one or more first engagement portions of the first joint member, the radius defining the shape of the one or more first engagement portions of the first joint member, the shape of the one or more second engagement portions of the first joint member, the location of the one or more second engagement portions of the first joint member, the outer diameter of the one or more second engagement portions of the first joint member, the angle defining the shape of the one or more second engagement portions of the first joint member, the radius defining the shape of the one or more second engagement portions of the first joint member, a shape of a first grease cover of the joint assembly, a material of the first grease cover of the joint assembly, and/or the way in which the first grease cover is attached to the second joint member of the joint assembly.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. A joint assembly, comprising:
a first joint member drivingly connected to a second joint member by one or more third joint members;
wherein said first joint member has one or more first engagement portions and one or more second engagement portions on an outer surface thereof;
wherein said one or more first engagement portions and said one or more second engagement portions of said first joint member have a substantially conical or a substantially frusto-conical shape having an outer surface that extends toward said second joint member at an angle relative to an axial centerline of said joint assembly;
a cage member having an inner surface, an outer surface, a first end, a second end, a first end portion, and a second end portion;
wherein said inner surface of said cage member has one or more first engagement portions and one or more second engagement portions;
wherein when said first joint member is plunged in a first direction at least a portion of said one or more first engagement portions of said first joint member are in direct contact with at least a portion of said one or more first engagement portions of said cage member; and wherein when said second joint member is plunged in a second direction, opposite said first direction, at least a portion of said one or more second engagement portions of said first joint member are in direct contact with at least a portion of said one or more second engagement portions of said cage member.

2. The joint assembly of claim 1, wherein when said one or more first engagement portions of said first joint member are in direct contact with at least a portion of said one or more first engagement portions of said cage member, said first joint member has traveled a first plunging distance;
wherein when said one or more second engagement portions of said first joint member are in direct contact with at least a portion of said one or more second engagement portions of said cage member, said first joint member has traveled a second plunging distance; and wherein said first plunging distance and said second plunging distance is measured from a theoretical center of said first joint member to a theoretical center of said second joint member; and wherein said first plunging distance is greater than said second plunging distance.

3. The joint assembly of claim 2, further comprising a first grease cover;
wherein said first grease cover has a first receiving portion having a size and shape to receive and/or retain at least a portion of said first joint member, said one or more third joint members, and/or said cage member therein when said first joint member has traveled said first plunging distance.

4. The joint assembly of claim 1, wherein said first end portion of said inner surface of said cage member has a first substantially cylindrical portion and a first opening defining said one or more first engagement portions of said cage member; and
wherein said first substantially cylindrical portion and said first opening of said cage member have a diameter that is less than or equal to an outer diameter of said one or more first engagement portions of said first joint member.

5. The joint assembly of claim 1, wherein said second end portion of said inner surface of said cage member has a second substantially cylindrical portion and/or a second opening defining said one or more second engagement portions of said cage member; and
wherein said second substantially cylindrical portion and/or said second opening of said cage member have a diameter that is less than or equal to an outer diameter of said one or more second engagement portions of said first joint member.

6. The joint assembly of claim 1, wherein said first end portion of said inner surface of said cage member has a first substantially cylindrical portion and/or a first opening defining said one or more first engagement portions of said cage member;
wherein said second end portion of said inner surface of said cage member has a second substantially cylindrical portion and/or a second opening defining said one or more second engagement portions of said cage member; and wherein said first substantially cylindrical portion and/or said first opening of said cage member have a diameter that is greater than or equal to a diameter of said second substantially cylindrical portion and/or said second opening of said cage member.

7. The joint assembly of claim 1, wherein said one or more first or second engagement portions of said first joint member drive said cage member outward allowing said first joint member to translate outside said second joint member and absorb an amount of energy in a crash condition.

8. The joint assembly of claim 1, wherein said one or more first engagement portions of said cage member are disposed a linear distance from said one or more second engagement portions of said cage member.

* * * * *